United States Patent [19]
Andersen et al.

[11] Patent Number: 5,676,905
[45] Date of Patent: Oct. 14, 1997

[54] METHODS FOR MANUFACTURING ARTICLES OF MANUFACTURE FROM HYDRAULICALLY SETTABLE MIXTURES

[75] Inventors: Per Just Andersen; Simon K. Hodson, both of Santa Barbara, Calif.

[73] Assignee: E. Khashoggi Industries, Santa Barbara, Calif.

[21] Appl. No.: 105,352

[22] Filed: Aug. 10, 1993

Related U.S. Application Data

[63] Continuation-in-part of Ser. No. 95,662, Jul. 20, 1993, Pat. No. 5,385,764, which is a continuation-in-part of Ser. No. 929,898, Aug. 11, 1992, abandoned, and Ser. No. 19,151, Feb. 17, 1993, Pat. No. 5,453,310.

[51] Int. Cl.$^6$ .................... B29C 65/00; B29C 71/00; C04B 40/00; B28B 3/00

[52] U.S. Cl. .................... 264/426; 264/42; 264/54; 264/82; 264/102; 264/232; 264/234; 264/239; 264/299; 264/328.1; 264/328.2; 264/333; 264/340; 264/344

[58] Field of Search ................ 264/42, 82, 101, 264/102, 132, 294, 333, 319, 299, 234, 340, 41, 344, 426, 328.1, 328.2, 54, 232, 239

[56] References Cited

U.S. PATENT DOCUMENTS

| | | | |
|---|---|---|---|
| 109,669 | 11/1870 | Rowland . | |
| 128,980 | 7/1872 | Rowland . | |
| 591,168 | 10/1897 | Heinzerling . | |
| 882,538 | 3/1908 | Sargent . | |
| 1,223,834 | 4/1917 | Sanger . | |
| 1,234,692 | 7/1917 | Poznanski . | |
| 1,874,974 | 8/1932 | Hammenecker . | |
| 1,932,150 | 10/1933 | Tada . | |
| 1,954,117 | 4/1934 | Caldwell | 106/24 |
| 1,965,538 | 7/1934 | Stewart | 106/29 |

(List continued on next page.)

FOREIGN PATENT DOCUMENTS

| | | |
|---|---|---|
| 237557 | 8/1988 | Argentina . |
| 241781 | 12/1992 | Argentina . |
| 241782 A1 | 12/1992 | Argentina . |
| 0263723 A2 | 4/1988 | European Pat. Off. . |
| 0290007 A1 | 11/1988 | European Pat. Off. . |
| 89107882 | 4/1989 | European Pat. Off. . |
| 0340707 A2 | 11/1989 | European Pat. Off. . |
| 0340765 A2 | 11/1989 | European Pat. Off. . |
| 0497151 A1 | 8/1992 | European Pat. Off. . |

(List continued on next page.)

OTHER PUBLICATIONS

S. P. Shah, Recent Trends In the Science and Technology of Concrete, NSF Center for Adavanced Cement–Based Materials, Northwestern University, Evanston, Illinois, pp. 1–18.

Nakano et al. Cement Compositions Suitable for Extrusion Molding of High–Strength Building Materials, Chemical Abstracts, vol. 115, p. 314 (1991).

Shah, Recent Trends In The Science and Technology of Concrete, Trends in Science and Technology of Concrete.

(List continued on next page.)

Primary Examiner—Christopher A. Fiorilla
Attorney, Agent, or Firm—Workman, Nydegger & Seeley

[57] ABSTRACT

Methods and systems for readily and economically manufacturing hydraulically settable articles, particularly containers, from microstructurally engineered hydraulically settable mixtures. The mixture is pressed between a male die of a desired shape and a female die having a substantially complimentary configuration of the male die shape to immediately fashion a portion of the mixture into a form stable shape for the desired article. To assist in imparting form stability, the dies can be heated or cooled. Once the article has obtained form stability, the article is removed from the dies and dried under heated air to gain strength. The article can then receive printing or a coating, if desired, prior to packaging, shipping, and use.

140 Claims, 9 Drawing Sheets

U.S. PATENT DOCUMENTS

| | | | |
|---|---|---|---|
| 2,045,099 | 6/1936 | Pond . | |
| 2,170,102 | 8/1939 | Thompson | 106/19 |
| 2,205,735 | 6/1940 | Scherer, Jr. | 106/18 |
| 2,307,629 | 1/1943 | MacIldowie | 117/123 |
| 2,432,971 | 12/1947 | Ruthman et al. | 106/86 |
| 2,496,895 | 2/1950 | Staley . | |
| 2,549,507 | 4/1951 | Morgan et al. | 166/22 |
| 2,629,667 | 2/1953 | Kaveler | 106/93 |
| 2,700,615 | 1/1955 | Heismer | 106/93 |
| 2,793,957 | 5/1957 | Mangold et al. | 106/86 |
| 2,820,713 | 1/1958 | Wagner | 106/93 |
| 2,837,435 | 6/1958 | Miller et al. | 106/93 |
| 2,917,778 | 12/1959 | Lyon, Jr. et al. | 18/47.5 |
| 2,959,489 | 11/1960 | Wagner | 106/93 |
| 3,006,615 | 10/1961 | Mason, Jr. . | |
| 3,027,266 | 3/1962 | Wikne . | |
| 3,030,258 | 4/1962 | Wagner | 156/71 |
| 3,042,578 | 7/1962 | Denning . | |
| 3,149,986 | 9/1964 | Zelmanoff | 106/119 |
| 3,169,877 | 2/1965 | Bartoli et al. | 106/93 |
| 3,215,549 | 11/1965 | Ericson | 106/90 |
| 3,305,613 | 2/1967 | Spence | 264/82 |
| 3,306,961 | 2/1967 | Spence | 264/82 |
| 3,356,779 | 12/1967 | Schulze | 264/82 |
| 3,393,261 | 7/1968 | Herzig et al. | 264/82 |
| 3,432,317 | 3/1969 | Kelly et al. | 106/92 |
| 3,468,993 | 9/1969 | Bierlich | 264/82 |
| 3,470,005 | 9/1969 | Flachsenberg et al. | 106/87 |
| 3,492,385 | 1/1970 | Simunic | 264/82 |
| 3,520,707 | 7/1970 | Steinberg et al. | 106/93 |
| 3,526,172 | 9/1970 | Stuart | 94/25 |
| 3,579,366 | 5/1971 | Rehmar | 106/314 |
| 3,683,760 | 8/1972 | Silva . | |
| 3,689,294 | 9/1972 | Bramnauer | 106/90 |
| 3,697,366 | 10/1972 | Harlock et al. . | |
| 3,745,891 | 7/1973 | Bodendoerfer | 93/36.1 |
| 3,753,749 | 8/1973 | Nutt . | |
| 3,754,954 | 8/1973 | Gabriel et al. | 106/97 |
| 3,759,729 | 9/1973 | Fahn . | |
| 3,770,859 | 11/1973 | Bevan . | |
| 3,773,700 | 11/1973 | Eash et al. . | |
| 3,806,571 | 4/1974 | Ronnmark et al. | 264/82 |
| 3,819,389 | 6/1974 | Uchikawa et al. | 106/100 |
| 3,824,107 | 7/1974 | Welant | 106/93 |
| 3,827,895 | 8/1974 | Copeland . | |
| 3,841,885 | 10/1974 | Jakel . | |
| 3,855,908 | 12/1974 | Schmidt et al. | 93/36.5 R |
| 3,857,715 | 12/1974 | Humphrey | 106/92 |
| 3,902,912 | 9/1975 | Wolf | 106/99 |
| 3,904,341 | 9/1975 | Putti | 425/382 |
| 3,908,523 | 9/1975 | Shikaya | 93/36.01 |
| 3,914,359 | 10/1975 | Bevan . | |
| 3,917,781 | 11/1975 | Gabriel et al. | 264/71 |
| 3,927,163 | 12/1975 | Gabriel et al. . | |
| 3,954,490 | 5/1976 | Cockram | 106/99 |
| 3,979,217 | 9/1976 | Sutton . | |
| 3,989,534 | 11/1976 | Plunguian | 106/86 |
| 3,998,651 | 12/1976 | Baudouin et al. . | |
| 4,002,482 | 1/1977 | Coenen | 106/40 V |
| 4,017,321 | 4/1977 | Reighter | 106/98 |
| 4,017,324 | 4/1977 | Eggers | 106/288 B |
| 4,028,454 | 6/1977 | Davidovits | 264/82 |
| 4,040,851 | 8/1977 | Ziegler | 106/93 |
| 4,046,584 | 9/1977 | Snyder et al. | 106/90 |
| 4,053,346 | 10/1977 | Amberg et al. | 156/446 |
| 4,070,199 | 1/1978 | Downing et al. | 106/93 |
| 4,070,953 | 1/1978 | Richards et al. | 93/39.1 R |
| 4,072,549 | 2/1978 | Amberg et al. | 156/86 |
| 4,073,658 | 2/1978 | Ohtani et al. | 106/92 |
| 4,077,809 | 3/1978 | Plunguian et al. | 106/88 |
| 4,084,980 | 4/1978 | Motoki | 106/75 |
| 4,085,001 | 4/1978 | Fukuwatari et al. . | |
| 4,093,690 | 6/1978 | Murray | 264/82 |
| 4,115,135 | 9/1978 | Goeman . | |
| 4,117,059 | 9/1978 | Murray | 264/82 |
| 4,117,060 | 9/1978 | Murray | 264/82 |
| 4,121,402 | 10/1978 | Cress et al. | 53/452 |
| 4,132,555 | 1/1979 | Barrable . | |
| 4,133,619 | 1/1979 | Wise | 425/64 |
| 4,135,940 | 1/1979 | Peltier | 106/88 |
| 4,157,998 | 6/1979 | Berntsson et al. | 260/42.13 |
| 4,158,989 | 6/1979 | Barr | 93/44 |
| 4,159,302 | 6/1979 | Greve et al. . | |
| 4,185,923 | 1/1980 | Bouette et al. | 366/10 |
| 4,187,768 | 2/1980 | Suzuki | 93/39.1 R |
| 4,188,231 | 2/1980 | Valore | 106/90 |
| 4,190,454 | 2/1980 | Yamagisi et al. | 106/90 |
| 4,196,161 | 4/1980 | Toffolom et al. . | |
| 4,202,857 | 5/1980 | Lowe | 264/333 |
| 4,209,336 | 6/1980 | Previte | 106/90 |
| 4,225,247 | 9/1980 | Hodson | 366/40 |
| 4,225,357 | 9/1980 | Hodson | 106/86 |
| 4,229,225 | 10/1980 | Kraszewski et al. . | |
| 4,230,502 | 10/1980 | Lustig et al. | 106/314 |
| 4,233,080 | 11/1980 | Koeppel | 106/87 |
| 4,233,368 | 11/1980 | Baehr et al. | 428/538 |
| 4,234,344 | 11/1980 | Tinsley et al. . | |
| 4,239,716 | 12/1980 | Ishida et al. . | |
| 4,244,781 | 1/1981 | Heckman . | |
| 4,257,710 | 3/1981 | Delcoigne et al. | 366/8 |
| 4,257,814 | 3/1981 | Kellet et al. | 106/90 |
| 4,261,754 | 4/1981 | Krenchel et al. | 106/90 |
| 4,264,367 | 4/1981 | Schutz | 106/90 |
| 4,264,368 | 4/1981 | Schutz | 106/90 |
| 4,272,198 | 6/1981 | Velikov et al. | 366/65 |
| 4,279,695 | 7/1981 | Winterbottom . | |
| 4,287,247 | 9/1981 | Reil et al. | 428/129 |
| 4,299,790 | 11/1981 | Greenberg . | |
| 4,305,758 | 12/1981 | Powers et al. | 106/97 |
| 4,310,996 | 1/1982 | Mulvey et al. | 52/809 |
| 4,313,997 | 2/1982 | Ruff et al. . | |
| 4,326,891 | 4/1982 | Sadler | 106/99 |
| 4,353,748 | 10/1982 | Birchall et al. | 106/89 |
| 4,362,679 | 12/1982 | Malinowski | 264/82 |
| 4,370,166 | 1/1983 | Powers et al. | 106/97 |
| 4,373,957 | 2/1983 | Pedersen | 106/93 |
| 4,377,440 | 3/1983 | Gasland | 162/101 |
| 4,383,862 | 5/1983 | Dyson | 106/88 |
| 4,406,703 | 9/1983 | Guthrie et al. | 106/93 |
| 4,410,366 | 10/1983 | Birchall et al. . | |
| 4,415,366 | 11/1983 | Copening . | |
| 4,427,610 | 1/1984 | Murray | 264/82 |
| 4,428,741 | 1/1984 | Westphal | 493/103 |
| 4,428,775 | 1/1984 | Johnson et al. | 106/90 |
| 4,444,593 | 4/1984 | Schutz | 106/89 |
| 4,452,596 | 6/1984 | Clauss et al. | 493/107 |
| 4,460,348 | 7/1984 | Iioka et al. | 493/108 |
| 4,462,835 | 7/1984 | Car | 106/75 |
| 4,481,037 | 11/1984 | Beale et al. | 106/104 |
| 4,490,130 | 12/1984 | Konzal et al. | 493/106 |
| 4,497,662 | 2/1985 | Chisholm et al. | 106/92 |
| 4,504,315 | 3/1985 | Allemann et al. | 106/89 |
| 4,508,595 | 4/1985 | Gasland | 162/158 |
| 4,522,772 | 6/1985 | Bevan . | |
| 4,524,828 | 6/1985 | Sabins et al. | 166/293 |
| 4,529,663 | 7/1985 | Lancaster et al. . | |
| 4,533,393 | 8/1985 | Neuschaeffer et al. | 106/18.12 |
| 4,536,173 | 8/1985 | Puls | 493/149 |
| 4,552,463 | 11/1985 | Hodson | 366/295 |
| 4,562,218 | 12/1985 | Fornadel et al. . | |
| 4,571,233 | 2/1986 | Konzal | 493/109 |
| 4,581,003 | 4/1986 | Ito et al. | 493/153 |

| | | | |
|---|---|---|---|
| 4,585,486 | 4/1986 | Fujita et al. | 106/86 |
| 4,588,443 | 5/1986 | Bache | 106/97 |
| 4,613,627 | 9/1986 | Sherman et al. | |
| 4,619,636 | 10/1986 | Bogren | 493/109 |
| 4,621,763 | 11/1986 | Brauner | 229/5.5 |
| 4,622,026 | 11/1986 | Ito et al. | 493/104 |
| 4,623,150 | 11/1986 | Moehlman et al. | 273/362 |
| 4,636,345 | 1/1987 | Jensen et al. | 264/122 |
| 4,637,860 | 1/1987 | Harper et al. | 162/117 |
| 4,640,715 | 2/1987 | Heitzmann et al. | 106/85 |
| 4,642,137 | 2/1987 | Heitzman et al. | 106/85 |
| 4,650,523 | 3/1987 | Kikuchi et al. | 106/315 |
| 4,655,981 | 4/1987 | Nielsen | 264/162 |
| 4,680,023 | 7/1987 | Varano | 493/75 |
| 4,707,187 | 11/1987 | Tsuda et al. | 106/93 |
| 4,746,481 | 5/1988 | Schmidt | 264/82 |
| 4,754,589 | 7/1988 | Leth | 52/538 |
| 4,755,494 | 7/1988 | Ruben | 501/148 |
| 4,772,439 | 9/1988 | Trevino-Gonzalez | 264/40.6 |
| 4,784,693 | 11/1988 | Kirkland et al. | 106/93 |
| 4,786,670 | 11/1988 | Tracy et al. | |
| 4,789,244 | 12/1988 | Dunton et al. | 366/12 |
| 4,797,161 | 1/1989 | Kirchmayr et al. | |
| 4,799,961 | 1/1989 | Friberg | 106/93 |
| 4,836,940 | 6/1989 | Alexander | |
| 4,840,672 | 6/1989 | Baes et al. | |
| 4,842,649 | 6/1989 | Heitzman et al. | 106/89 |
| 4,872,913 | 10/1989 | Dunton et al. | 106/88 |
| 4,888,059 | 12/1989 | Yamaguchi et al. | 106/314 |
| 4,889,428 | 12/1989 | Hodson | 366/1 |
| 4,892,589 | 1/1990 | Kirkland et al. | 106/197.1 |
| 4,895,598 | 1/1990 | Hedberg et al. | 106/86 |
| 4,912,069 | 3/1990 | Ruben | 501/148 |
| 4,923,665 | 5/1990 | Andersen et al. | |
| 4,927,043 | 5/1990 | Vanderlaan | 220/67 |
| 4,927,573 | 5/1990 | Alpár et al. | 264/40.1 |
| 4,939,192 | 7/1990 | t'Sas | 524/44 |
| 4,944,595 | 7/1990 | Hodson | 366/65 |
| 4,948,429 | 8/1990 | Arfaei | 106/659 |
| 4,976,131 | 12/1990 | Grims et al. | 72/347 |
| 4,979,992 | 12/1990 | Bache | 106/644 |
| 4,985,119 | 1/1991 | Vinson et al. | 162/149 |
| 4,999,056 | 3/1991 | Rasmussen | 106/737 |
| 5,018,379 | 5/1991 | Shirai et al. | 72/354.6 |
| 5,021,093 | 6/1991 | Beshay | 106/731 |
| 5,030,282 | 7/1991 | Matsuhashi et al. | 106/692 |
| 5,037,600 | 8/1991 | Upchurch | |
| 5,039,003 | 8/1991 | Gordon et al. | 229/120.32 |
| 5,039,560 | 8/1991 | Durgin et al. | 427/240 |
| 5,047,086 | 9/1991 | Hayakawa et al. | 106/731 |
| 5,051,217 | 9/1991 | Alpár et al. | 264/40.1 |
| 5,076,986 | 12/1991 | Delvaux et al. | |
| 5,085,366 | 2/1992 | Durgin et al. | 229/1.5 B |
| 5,102,596 | 4/1992 | Lempfer et al. | 264/115 |
| 5,106,423 | 4/1992 | Clarke | 106/789 |
| 5,106,880 | 4/1992 | Miller et al. | |
| 5,108,677 | 4/1992 | Ayres | 264/112 |
| 5,108,679 | 4/1992 | Rirsch et al. | 264/118 |
| 5,141,983 | 8/1992 | Hasegawa et al. | |
| 5,154,771 | 10/1992 | Wada et al. | 106/730 |
| 5,167,894 | 12/1992 | Baumgarten | 264/175 |
| 5,184,995 | 2/1993 | Kuchenbecker | 493/79 |
| 5,232,496 | 8/1993 | Jennings et al. | |
| 5,269,845 | 12/1993 | Grunau et al. | 106/692 |
| 5,290,355 | 3/1994 | Jakel | |
| 5,316,624 | 5/1994 | Racine | |
| 5,338,349 | 8/1994 | Farrar | |
| 5,366,549 | 11/1994 | Imaizumi et al. | |

FOREIGN PATENT DOCUMENTS

| | | |
|---|---|---|
| 2841172 | 9/1978 | Germany . |
| 3011330 | 3/1980 | Germany . |
| 42-20190 | 9/1972 | Japan . |
| 51-2729 | 1/1976 | Japan . |
| 53-16730 | 2/1978 | Japan . |
| 54-31320 | 3/1979 | Japan . |
| 54-48821 | 4/1979 | Japan . |
| 55-37407 | 3/1980 | Japan . |
| 55-100256 | 7/1980 | Japan . |
| 56-17965 | 2/1981 | Japan . |
| 58-120555 | 7/1983 | Japan . |
| 62-36055 | 8/1985 | Japan . |
| 62-36056 | 8/1985 | Japan . |
| 60-260484 | 12/1985 | Japan . |
| 60-264375 | 12/1985 | Japan . |
| 62-39204 | 2/1987 | Japan . |
| 62-46941 | 2/1987 | Japan . |
| 62-151304 | 7/1987 | Japan . |
| 62-253407 | 11/1987 | Japan . |
| 63-00551 | 1/1988 | Japan . |
| 63-00552 | 1/1988 | Japan . |
| 63-551 | 1/1988 | Japan . |
| 63-552 | 1/1988 | Japan . |
| 63-109961 | 5/1988 | Japan . |
| 63-123851 | 5/1988 | Japan . |
| 63-210082 | 8/1988 | Japan . |
| 63-218589 | 9/1988 | Japan . |
| 63-248759 | 10/1988 | Japan . |
| 63-310780 | 12/1988 | Japan . |
| 64-37478 | 2/1989 | Japan . |
| 2-51460 | 2/1990 | Japan . |
| 2-141484 | 5/1990 | Japan . |
| 2-190304 | 7/1990 | Japan . |
| 3-80141 | 4/1991 | Japan . |
| 3-153551 | 7/1991 | Japan . |
| 3-187962 | 8/1991 | Japan . |
| 3-202310 | 9/1991 | Japan . |
| 3-202313 | 9/1991 | Japan . |
| 3-208847 | 9/1991 | Japan . |
| 4-70304 | 3/1992 | Japan . |
| 453555 | 1/1936 | United Kingdom . |
| 490820 | 8/1938 | United Kingdom . |
| 2086748 | 5/1982 | United Kingdom . |
| 2192392 | 1/1988 | United Kingdom . |
| 2220934 | 1/1990 | United Kingdom . |
| WO 87/00828 | 2/1987 | WIPO . |
| WO 91/12186 | 8/1991 | WIPO . |
| WO 93/20990 | 10/1993 | WIPO . |

OTHER PUBLICATIONS

Alexanderson, Self–Smoothing Floors Based on Polymer Cement Concrete, Concrete International (Jan. 1990).

Andersen, Control and Monitoring of Concrete Production—A Study of Particle Packing and Rheology, The Danish Academy of Technical Sciences (1990).

Andersen, Effects of W/C–Ratio and Dispersion on the Pore Size Distribution of Cement Paste and Concrete, Paper prepared for MRL by Per Just Anderson (Aug. 1988).

Andersen, Effect of Organic Superplasticizing Admixtures and Their components on Zeta Potential and Related Properties of Cement Materials, Pennsylvania State University (1987).

Andersen, *Rheology of Cement Paste, Mortar and Concrete.*

Bache, Densified Cement/Ultra–Fine Particle–Based Materials, Presented at the Second International Conference on Superplasticizers in Concrete, Ottawa, Canada (Jun. 10–12, 1981).

Benbow et al., The Extrusion Mechanics of Pastes—The Influence of Paste Formulation on Extrusion Parameters, Chemical Engineering Science, vol. 42, No. 9, pp. 2151–2162 (1987).

Blaha, Ideas in Concrete, Concrete Products (Sep. 1992).

Clauson–Kaas et al., *Ekstrudering af Fiberbeton–delrapport* (1987). English Translation—*Extrusion of Fiber Concrete—Interim Report*.

Clauson–Kaas, *Opsprojtet Glasfiberbeton i Byggeriet* (1987). (See Statement of Relevance as there is no English translation).

Collepardi et al., Influence of Polymerization of Sulfonated Naphthalene Condensate and its Interaction with Cement.

Eriksen and Andersen, Foam Stability Experiments on Solutions Containing Superplasticizing and Air–entraining Agents for Concrete, The Technological Institute, Department of Building Technology, Taastrup, Denmark.

Fordos, Natural or Modified Cellulose Fibres as Reinforcement in Cement Composites, Concrete Technology & Design vol. 5, Natural Fiber Reinforced Cement and Concrete (1988).

Greminger, Jr. and Krumel, Alkyl and Hydroxyalkylalkylcellulose, Dow Chemical U.S.A., Midland, Oregon.

Hewlett, Physico–Chemical Mechanisms of Admixtures Lecture, CGLI Advanced Concrete Technology Course, Cement and Concrete Association Training Center.

Litvan and Sereda, Particulate Admixture for Enhanced Freeze–Thaw Resistance of Concrete, Cement and Concrete Research, vol. 8, pp. 53–60, Pergamon Press, Inc.

Manson et al., Use of Polymers in Highway Concrete, National Cooperative Highway Research Program Report 190 (1978).

Maries, The Activation of Portland Cement by Carbon Dioxide.

Miyake et al., Superplasticized Concrete Using Refined Lignosulfate and its Action Mechanism, Cement and Concrete Research, vol. 15, pp. 295–302 (1985).

Purton, The Effect of Sand Grading on the Calcium Silicate Brick Reaction, Cement and Concrete Research vol. 4, pp. 13–29 (1974).

Robinson, Extrusion Defects.

Roy, New Strong Cement Materials: Chemically Bonded Ceramics, Science, vol. 235, 6(Feb. 1987).

Soroushian et al., Recycling of Wood and Paper in Cementitious Materials, Mat. Res. Soc. Sypm. Proc., vol. 266 (1992).

Studt, New Advances Revive Interest In Cement–Based Materials, R&D Magazine (Nov. 1992).

Sun et al, The Composition of Hydrated DSP Cement Pastes.

Wagner, Polymer Modification of Portland Cement Systems, Chemtech, (Feb. 1973).

Weiss et al, High Tensile Cement Pastes as a Low–Energy Substitute for Metals, Plastics, Ceramics, and Wood. Phase 1: Preliminary Technological Evaluation, CTL Project CR7851–4330, Final Report, Prepared for U.S. Dept. of Energy, (Nov. 1984).

Westman and Hugill, The Packing of Particles (1930).

Young, Macro–Defect–Free Cement: A Review, Mat. Res. Soc. Symp. Proc., vol. 179 (1991).

Cementing the Future: A New Extrusion Technology, ACBM, vol. 6, No. 1, (Spring 1994).

Zukowski and Struble, Rheology of Cementitious Systems, MRS Bulletin, Mar. 1993.

Lewis and Kriven, Microstructure–Property Relationships in Macro–Defect–Free Cement, MRS Bulletin, Mar. 1993.

Young and Berg, Introduction to MDF Cement Composites, ACBM vol. 1, No. 2, Fall 1989.

Zien In The Food Industry, Freeman Industries, Inc., P.O. Box 415, Tuckahoe, NY 10707–0415 USA.

Davidson and Marshall Sittig, Water–Soluble Resins, New York: Reinhold Publishing Corp., Chapman & Hall, Ltd., London.

Balaguru and Kendzulak, Flexural Behavior of Slurry Infiltrated Fiber Concrete (SIFCON) Made Using Condensed Silica Fume.

Naaman and Homrich, Tensile Stress–Strain Properties of SIFCON, ACI Materials Journal, May–Jun. 1989.

Stix, Concrete Solutions, Scientific American, Apr. 1993.

Strabo, Cementbuserede Hybrldkompositter, Byggeteknik Teknologisk Institut, 1987.

English Translation—Strabo, Andersen, and Clauson–Kaas, Cement–Based Hybrid Composites, 1987.

Strabo et al, Fiberbeton Teknology., Byggeteknik Teknologisk Institut, 1986.

English Translation—Strabo, Cluason–Kaas, Chatterji, and Thaulow, Fiber Concrete Technology TR–Project, 1986.

Nye Metoder I Beton Kan Betyde Teknisk Knock–Out for Plast.

English Translation—"New Method for Concrete May Mean technical Knock–Out for Plastic," The Engineer, No. 14, 1986.

Fiberbeton–nyt TyByageteknik.

English Translation—"Fiber Concrete News," The Technological Institute of Denmark, Pamphlet No. 1, Oct. 1987.

Andersen, Tailoring of Concrete Materials, R&H Annual Review, 1988.

Andersen, et al., Tailoring of Cement–Bound Materials By the Use of Packing and Rheological Models, American Ceramic Society (1988).

Ashby, Materials Selection in Engineering Design, Indian Journal of Technology, vol. 28, Jun.–Aug. 1990.

Ashby, Overview No. 80: On the Engineering Properties of Materials, Acta Metall, vol. 3, No. 5 pp. 1273–1293, 1989.

Johansen, Vagn and Andersen, Particle Packing and Concrete Properties, Materials Science of Concrete II, pp. 111–147.

Maycock and Skalny, Carbonation of Hydrated Calcium Silicates, Cement and Concrete Research, vol. 4, pp. 69–76, 1974.

Suzuki, Nishikawa, and Ito, Formation and Carbonation of C–S–H In Water, Cement and Concrete Research, vol. 15, pp. 213–224, 1985.

Bukowski and Berger, Reactivity and Strength Development of $CO_2$ Activated Non–Hydraulic Calcium Silicates, Cement and Concrete Research, vol. 9, pp. 57–68, 1979.

Berger, Young, and Leung, Acceleration of Hydration of Calcium Silicates by Carbon Dioxide Treatment, Nature Physical Science, vol. 240, Nov. 6, 1972.

Verbeck, Carbonation of Hydrated Portland Cement, Cement and Concrete Special Technical Publication No. 203, 1958.

Plastic–Forming Processes.

Strabo et al., *Nye Formgivningsmetoder Til Fiberbeton* English Translation—Strabo et al, "New Design Methods for Fiber Concrete," Technological Institute of Denmark, Dept. of Building Technology, Apr. 1987.

Finn, Strabo et al., Ekstrudering AF Fiberbeton. English Translation—Strabo, et al. "Extrusion of Fiber Concrete," Danish Technological Institute, Dept. of Building Technology, Oct. 1987.

Knab, Clifton, and Ings, Effects of Maximum Void Size and Aggregate Characteristics on the Strength of Mortar, Cement and Concrete Research. vol. 13 pp. 383–390, 1983.

Unwalla and Green, editors, Recycled Materials for Making Concrete, The Indian Concrete Journal, vol. 53, No. 9, Sep. 1979.

Rosenberg and Gaidis, A New Mineral Admixture for High-Strength Concrete-Proposed Mechanism for Strength Enhancement, Second International Conference on the Use of Fly Ash, Silica Fume, Slag and Natural Pozzolans in Concrete, Apr. 21–25, 1986.

Brown, Ledbetter, and Jennings, An Investigation of a High Speed Shear Mixer on Selected Pastes and Mortars, Mat. Res. Soc. Symp. Proc vol. 137, 1989.

The Colcrete Process, Undated Publication.

The Coating Process for Paper, 1993.

Niel, Supplementary Paper II–117. The Influence of Alkali–Carbonate on the Hydration of Cement, 1968.

Report of the Panel on Solids Processing.

Lawrence, The Properties of Cement Paste Compacted Under High Pressure: Research Report 19, Cement and Concrete Association Research Report 19, Jun. 1969.

Jones and Berard, Raw Materials Processing, Ceramics: Industrial Processing and Testing, Iowa State University Press, 1972.

Hlavac, The Technology of Ceramics, Glass Science and Technology, 4: The Technology of Glass and Ceramics, Elsevier Publishing, 1983.

Skalny and Bajza, Properties of Cement Pastes Prepared by High Pressure Compaction, ACI Journal, Mar. 1970.

Bach, Cement–Based Products Processed the Plastics Way.

Lecznar and Barnoff, Strength of Neat Cement Pastes Molded Under Pressure, Journal of the American Concrete Institute Concrete Briefs, Feb. 1961.

Roy, Gouda, and Bobrowsky, Very High Strength Cement Pastes Prepared by Hot Pressing and Other High Pressure Techniques, Cement and Concrete Research, vol. 2, pp. 349–366, 1972.

B. W. Attwood, Paperboard, *The Wiley Encyclopedia of Packaging Technology* 500–506 (Marilyn Bakker ed., 1986).

G. A. Baum, et al., Paper, *Kirk–Othmer Concise Encyclopedia of Chemical Technology* 834–836 (Martin Grayson ed., 1985).

George S. Brady & Henry R. Clauser, *Materials Handbook* 588–594 (1991).

James E. Kline, Paper and Paperboard Manufacturing and Converting Fundamentals 19–28 (2d ed. 1982).

Richard J. Lewis, Sr., *Condensed Chemical Dictionary* 870 (12th ed. 1993).

Stearns T. Putnam, et al., Papermaking Additives, *Kirk–Othmer Concise Encyclopedia of Chemical Technology* 836–837 (Martin Grayson ed., 1985).

M. Sikora, Paper, *The Wiley Encyclopedia of Packaging Technology* 497–500 (Marilyn Bakker ed., 1986).

Vrana, Khashoggi Kin Reported Planning Private Placement of Shares in New Container Firm, 1993.

Roy, et al., Processing of Optimized Cements and concretes via Particle Packing, Mrs. Bulletin (Mar. 1993).

Samuel Ferretti, MRS Distributed Reinforcement Concrete Pipes: An Innocative Product 44–48 (May 1993).

Dow Plastics, *Thermoforming Process Guide*.

Skalny, Phillips, and Cahn, Low Water to Cement Ratio Concretes, Cement, and Concrete Research, vol. 3, pp. 29–40, 1973.

Yudenfreund, Skalny, Mikahil, and Brunauer, Hardened Portland Cement Pastes of Low Porosity. II. Exploratory Studies. Dimensional Changes, Cement and Concrete Research, vol. 2, pp. 331–348, 1972.

Bajza, On The Factors Influencing the Strength of Cement Compacts, Cement and Concrete Research, vol. 2, pp. 67–78, 1972.

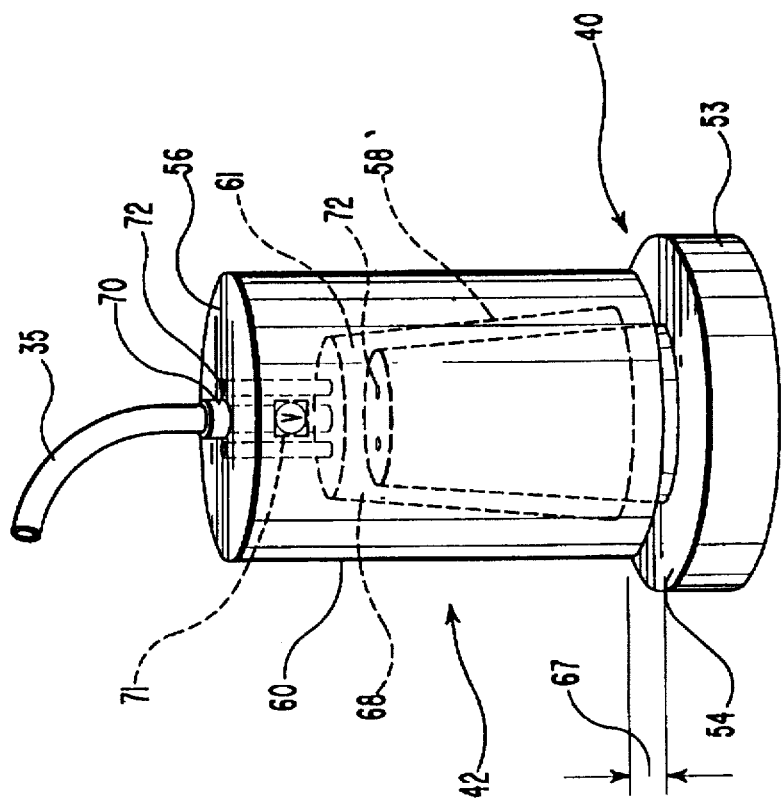
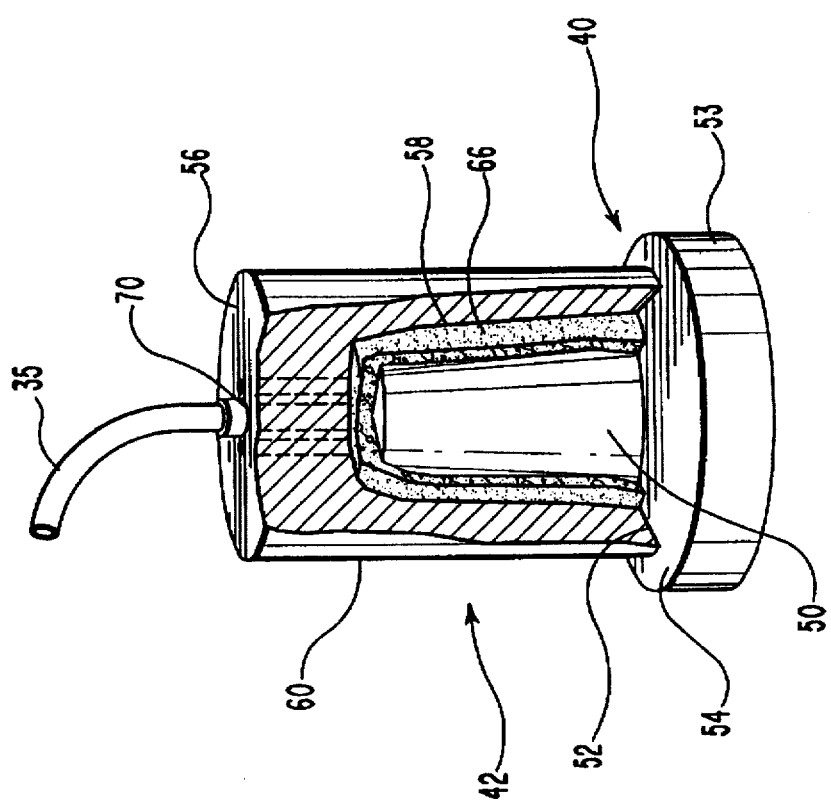

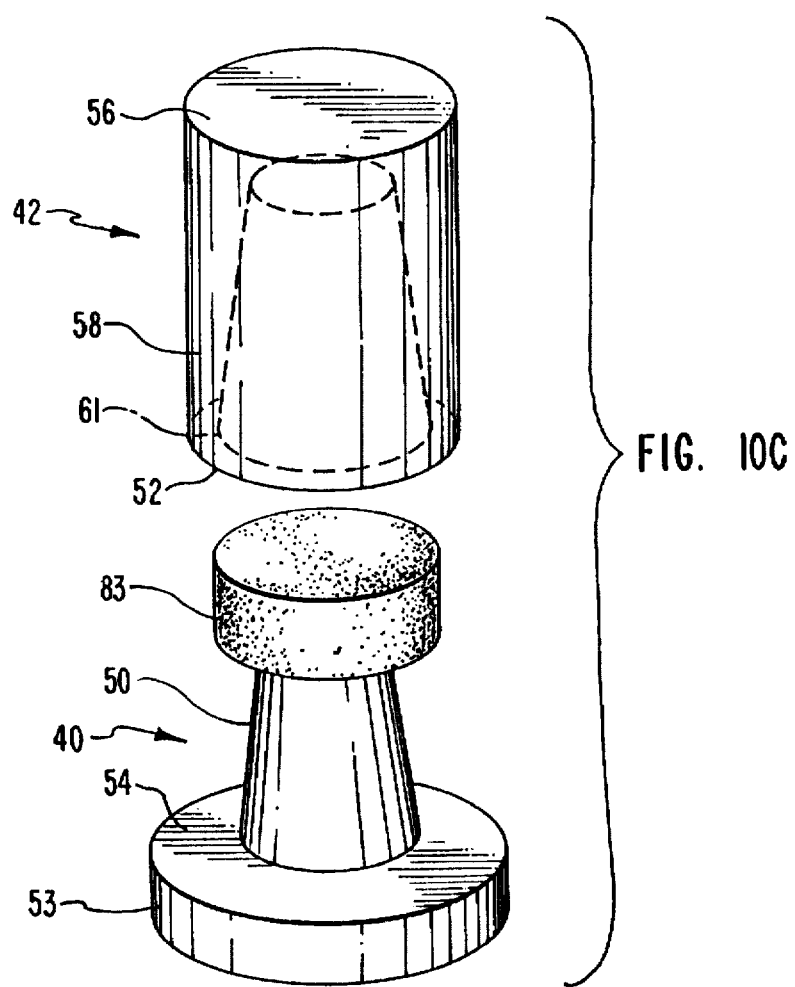
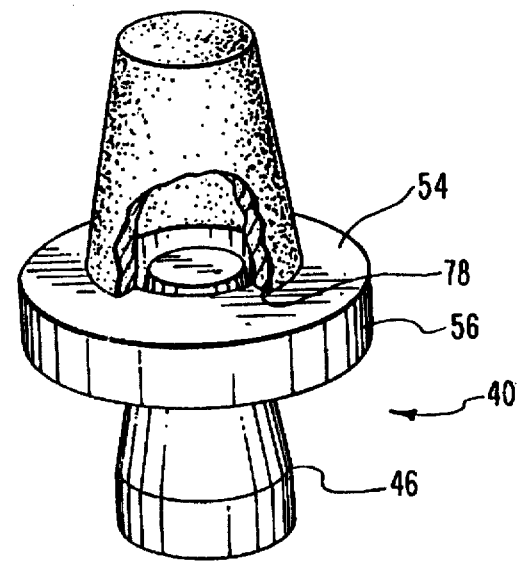
FIG. 11

METHODS FOR MANUFACTURING ARTICLES OF MANUFACTURE FROM HYDRAULICALLY SETTABLE MIXTURES

RELATED APPLICATIONS

This application is a continuation-in-part of application Ser. No. 08/095,662 entitled "Hydraulically Settable Containers and Other Articles for Storing, Dispensing, and Packaging Food and Beverages and Methods for Their Manufacture," filed Jul. 20, 1993, in the names of Per Just Andersen, Ph.D., and Simon K. Hodson (now issued U.S. Pat. No. 5,385,764); which is a continuation-in-part of application Ser. No. 07/929,898, entitled "Cementitious Food and Beverage Storage, Dispensing, and Packaging Containers and the Methods of Manufacturing Same," filed Aug. 11, 1992, in the names of Per Just Andersen, Ph.D., and Simon K. Hodson (now abandoned); that is also a continuation-in-part of application Ser. No. 08/019,151, entitled "Cementitious Materials For Use in Packaging Containers and Their Methods of Manufacture," and filed Feb. 17, 1993, in the names of Per Just Andersen, Ph.D., and Simon K. Hodson now U.S. Pat. No. 5,453,310. For purposes of disclosure, the above patent applications are incorporated herein by specific reference.

BACKGROUND

1. The Field of the Invention

The present invention relates to methods and systems for manufacturing containers and other articles of manufacture from hydraulically settable materials. More particularly, the present invention relates to methods and systems for readily and economically pressing or molding hydraulically settable mixtures into thin-walled, form-stable containers or articles of a desired shape which are easily removable from the pressing or molding apparatus for subsequent drying and curing in a self-supporting state. The cured containers and articles are economically competitive with and have properties substantially similar to articles made from traditional materials such as paper and plastic.

2. The Relevant Technology

A. Articles of Manufacture

A huge variety of objects such as containers, packaging materials, kitchen implements, structural components, and decorative items are presently mass-produced from paper (including cardboard), plastic (particularly polystyrene), metal, and glass. The vast majority of such items eventually wind up within our diminishing landfills, or worse, are scattered on the ground or dumped into bodies of water as litter. Because plastic is essentially nonbiodegradable it persists within the land and water as unsightly, value diminishing, and (in some cases) toxic foreign materials. Even paper, glass, and metal, believed by many to be biodegradable, can persist for years, even decades, within landfills where they are shielded from air, light, and water, all of which are required for normal biodegradable activities.

In spite of the more recent attention that has been given to reduce the use of such materials, they continue to be used because of their strength properties and mass productability. Moreover, for any given use for which they were designed, such materials are relatively inexpensive, lightweight, easy to mold, strong, durable, and resistant to degradation during use.

Although each of these materials may be comparably priced to any of the other materials presently available, they are usually far more expensive than typical cementitious materials. Because no rational business would ignore the economic benefit which would necessarily accrue from the substitution of radically cheaper cementitious materials from paper, cardboard, plastic, or polystyrene, the failure to do so can only be explained by a marked absence of available technology to make the substitution.

B. The Impact of Paper, Plastic, Glass and Metal

Recently there has been a debate as to which of these materials (e.g., paper, polystyrene, glass, or metal) is most damaging to the environment. Consciousness-raising organizations have convinced many people to substitute one material for another in order to be more environmentally "correct." The debate often misses the point that each of these materials has its own unique environmental weaknesses. One material may appear superior to another when viewed in light of a particular environmental problem, while ignoring different, often larger, problems associated with the supposedly preferred material. In fact, paper, cardboard, plastic, polystyrene, glass, and metal materials each have their own unique environmental weaknesses.

Polystyrene products, particularly containers and other packaging materials, have more recently attracted the ire of environmental groups. While polystyrene itself is a relatively inert substance, its manufacture involves the use of a variety of hazardous chemicals and starting materials. Unpolymerized styrene is very reactive and therefore presents a health problem to those who must handle it. Because styrene is manufactured from benzene (a known mutagen and probably a carcinogen), residual quantities of benzene can be found in styrene.

More potentially damaging has been the use of chlorofluorocarbons (or "CFCs") in the manufacture of "blown" or "expanded" polystyrene products. This is because CFCs have been linked to the destruction of the ozone layer. In the manufacture of foams, including blown polystyrene, CFCs (which are highly volatile liquids) have been used to "expand" or "blow" the polystyrene into a foamed material, which is then molded into the form of cups, plates, trays, boxes, "clamshell" containers, spacers, or packaging materials. Even the substitution of less "environmentally damaging" blowing agents (e.g., HCFC, $CO_2$, and pentanes) are still significantly harmful, and their elimination would be beneficial.

As a result, there has been widespread pressure for companies to stop using polystyrene products in favor of more environmentally safe materials. Some environmental groups have favored a temporary return to the use of natural products such as paper or wood, which are believed to be biodegradable. Nevertheless, other environmental groups have taken the opposite view in order to minimize cutting trees and depleting the forests.

Although paper products are ostensibly biodegradable and have not been linked to the destruction of the ozone layer, recent studies have shown that the manufacture of paper probably more strongly impacts the environment than does the manufacture of polystyrene. In fact, the wood pulp and paper industry has been identified as one of the five top polluters in the United States. For instance, products made from paper require ten times as much steam, fourteen to twenty times the electricity, and twice as much cooling water compared to an equivalent polystyrene product. Various studies have shown that the effluent from paper manufacturing contains ten to one hundred times the amount of contaminants produced in the manufacture of polystyrene foam.

In addition, a by-product of paper manufacturing is that the environment is impacted by dioxin, a harmful toxin. Dioxin, or more accurately, 2,3,7,8-tetrachlorodibenzo[b,e][1,4]dioxin, is a highly toxic, teragenic contaminant, and is extremely dangerous even in very low quantities. Toxic effects of dioxin in animals and humans include anorexia, severe weight loss, hepatoxicity, hematoporphyria, vascular lesions, chloracne, gastric ulcers, porphyrinuria, porphyria, cutanea tarda, and premature death. Most experts in the field believe that dioxin is a carcinogen.

The highest level of dioxin allowed in the discharge waters from paper mills is about 0.5 part per trillion. However, fish found downstream from paper pulp mills can contain nearly 200 parts per trillion of dioxin, with levels of 50 parts per trillion being not uncommon.

The manufacturing processes of metal cans (particularly those made of aluminum and tin), glass bottles, and ceramic containers utilize high amounts of energy because of the necessity to melt and then separately work and shape the raw metal into an intermediate or final product. These high energy and processing requirements not only utilize valuable energy resources, but they also result in significant air, water, and heat pollution to the environment.

With glass and ceramic materials, in addition to the high processing costs, the final product is brittle. Further, while glass can be recycled, that portion which ends up in landfills is essentially nonbiodegradable. (For purposes of convenience, since many of the problems of metal materials, when compared to the products of the present invention, are the same as with glass and ceramic materials, reference hereinafter will generally be made only to metal prior art materials and problems. However, it will be appreciated that many, if not most, of the same comments are applicable to containers and articles made from glass or ceramic materials.)

Some of these pollution problems are being addressed; however, the result is the use of more energy, as well as the significant addition to the capital requirements for the manufacturing facilities. Further, while significant efforts have been expended in recycling programs, only a portion of the raw material needs come from recycling—most of the raw material set comes from nonrenewable resources.

Another problem with paper, cardboard, polystyrene, and plastic is that each of these requires relatively expensive organic starting materials, some of which are nonrenewable, such as the use of petroleum in the manufacture of polystyrene and plastic. Although trees used in making paper and cardboard are renewable in the strict sense of the word, their large land requirements and rapid depletion in certain areas of the world undermines this notion. Hence, the use of huge amounts of essentially nonrenewable starting materials in making disposable containers cannot be sustained and is not wise from a long term perspective. Furthermore, the processes used to make the packaging stock raw materials (such as paper pulp, styrene, or metal sheets) are very energy intensive, cause major amounts of water and air pollution, and require significant capital requirements.

From a manufacturing perspective, paper has the additional frustration of requiring that the newly formed rolled paper be allowed to set for about three to five days before it can be formed into a desired product. Such a delay precludes the formation of a single production line that can continuously take raw paper components and form final paper products.

In light of the foregoing, the debate should not be directed to which of these materials is more or less harmful to the environment, but rather toward asking: Can we discover or develop an alternative material which will solve most, if not all, of the various environmental problems associated with each of these presently used materials?

C. Traditional Hydraulically Settable Materials

On the other hand, for millennia, man has made great use of nondepletable inorganic materials such as clay or stone. Similarly, hydraulically settable materials such as those that contain hydraulic cement or gypsum (hereinafter "hydraulically settable," "hydraulic," or "cementitious" compositions, materials, or mixtures) have been used for thousands of years to create useful, generally large, bulky structures that are durable, strong, and relatively inexpensive. For example, cement is a hydraulically settable binder derived from clay and limestone, and it is essentially nondepletable.

Those materials containing a hydraulic cement are generally formed by mixing hydraulic cement with water and usually some type of aggregate to form a cementitious mixture, which hardens into a solid material, commonly known as concrete. Ideally, a freshly mixed cementitious mixture is fairly nonviscous, semi-fluid, and capable of being mixed and formed by hand. Because of its fluid nature, concrete is generally shaped by being poured into a mold, worked to eliminate large air pockets, and allowed to harden. If the surface of the concrete structure is to be exposed, such as on a concrete sidewalk, additional efforts are made to finish the surface to make it more functional and to give it the desired surface characteristics.

Due to the high level of fluidity required for typical cementitious mixtures to have adequate workability, the uses of concrete and other hydraulically settable mixtures have been limited mainly to simple shapes which are generally large, heavy, and bulky, and which require mechanical forces to retain their shape for an extended period of time until sufficient hardening of the material has occurred. Another aspect of the limitations of traditional cementitious mixtures or slurries is that they have little or no form stability and are molded into the final form by pouring the mixture into a space having externally supported boundaries or walls.

It is precisely because of this lack of moldability (which is the result of poor workability and/or poor form stability), coupled with the low tensile strength per unit weight, that cementitious materials have traditionally been useful only for applications where size and weight are not limiting factors and where the forces or loads exerted on the concrete are generally limited to compressive forces or loads, as in, e.g., roads, foundations, sidewalks, and walls.

Moreover, cementitious materials have historically been brittle, rigid, unable to be folded or bent, and having low elasticity, deflection and flexural strength. The brittle nature and lack of tensile strength (about 1–4 MPa) in concrete is ubiquitously illustrated by the fact that concrete readily cracks or fractures upon the slightest amount of shrinkage or bending, unlike other materials such as metal, paper, plastic, or ceramic. Consequently, typical cementitious materials have not been suitable for making small, lightweight objects, such as containers, which are better if made from materials with much higher tensile and flexural strengths per unit weight compared to typical cementitious materials.

More recently, higher strength cementitious materials have been developed which might be capable of being formed into smaller, denser objects. One such material is known as "Macro-defect Free" or "MDF" concrete, such as is disclosed in U.S. Pat. No. 4,410,366 to Birchall et al. See also, S. J. Weiss, E. M. Gartner & S. W. Tresouthick, "High Tensile Cement Pastes as a Low Energy Substitute for Metals, Plastics, Ceramics, and Wood," U.S. Department of Energy CTL Project CR7851-4330 (Final Report, November 1984).

However, such high strength cementitious materials have been prohibitively expensive and would be unsuitable for making inexpensive containers where much cheaper materials better suited for such uses (e.g., paper and plastic) are readily available. Another drawback is that MDF concrete cannot be used to mass produce small lightweight objects due to the high amount of time and effort involved in forming and hardening the material and the fact that it is highly water soluble. Therefore, MDF concrete has been limited to expensive objects of simple shape.

Another problem with traditional and even more recently developed high strength concretes has been the lengthy curing times almost universally required for most concretes. Typical concrete products formed from a flowable mixture require a hardening period of 10–24 hours before the concrete is mechanically self-supporting, and upwards of a month before the concrete reaches a substantial amount of its maximum strength. Extreme care has had to be used to avoid moving the cementitious articles until they have obtained sufficient strength to be demolded. Movement or demolding prior to this time has usually resulted in cracks and flaws in the cementitious structural matrix. Once self-supporting, the object could be demolded, although it has not typically attained the majority of its ultimate strength until days or even weeks later.

Since the molds used in forming cementitious objects are generally reused in the production of concrete products and a substantial period of time is required for even minimal curing of the concrete, it has been difficult to economically and commercially mass produce cementitious objects. Although zero slump concrete has been used to produce large, bulky objects (such as molded slabs, large pipes, or bricks which are immediately self-supporting) on an economically commercial scale, such production is only useful in producing objects at a rate of a few thousand per day. Such compositions and methods cannot be used to mass produce small, thin-walled objects at a rate of thousands per hour.

Demolding a cementitious object can create further problems. As concrete cures, it tends to bond to the forms unless expensive releasing agents are used. It is often necessary to wedge the forms loose to remove them. Such wedging, if not done properly and carefully each time, often results in cracking or breakage around the edges of the structure. This problem further limits the ability to make thin-walled cementitious articles or shapes other than flat slabs, particularly in any type of a commercial mass production.

If the bond between the outer wall of the molded cementitious article and the mold is greater than the internal cohesive or tensile strengths of the molded article, removal of the mold will likely break the relatively weak walls or other structural features of the molded article. Hence, traditional cementitious objects must be large in volume, as well as extraordinarily simple in shape, in order to avoid breakage during demolding (unless expensive releasing agents and other precautions are used).

Typical processing techniques of concrete also require that it be properly consolidated after it is placed in order to ensure that no voids exist between the forms or in the structural matrix. This is usually accomplished through various methods of vibration or poking. The problem with consolidating, however, is that the more extensive the consolidation of the concrete after it has been placed, the greater the segregation or bleeding of the concrete.

"Bleeding" is the migration of water to the top surface of freshly placed concrete caused by the settling of the aggregate. Excessive bleeding increases the water to cement ratio near the top surface of the concrete slab, which correspondingly weakens and reduces the durability of the surface of the slab. The overworking of concrete during the finishing process not only brings an excess of water to the surface, but also some fine material, thereby resulting in inhomogeneity or nonuniformity which manifest themselves as subsequent surface defects.

For each of the foregoing reasons, as well as numerous others which cannot be listed here, cementitious materials have not generally had application outside of the formation of large, slab-like objects, such as in buildings, foundations, walk-ways, or highways, or as mortar to adhere bricks or cured concrete blocks. It is completely counterintuitive, as well as contrary to human experience, to even imagine the manufacture of small lightweight objects (such as containers comparable to the lightweight materials made from paper, plastic, or metal) from cementitious materials within the scope of the present invention.

Due to the more recent of the tremendous environmental impacts of using paper, cardboard, plastic, polystyrene, and metals for a variety of single-use, mainly disposable items such as containers (not to mention the ever mounting political pressures), there has been an acute need (long since recognized by those skilled in the art) to find environmentally sound substitute materials, such as cementitious materials, for these disposable items.

In spite of such pressures and long-felt need, the technology simply has not existed for the economic and feasible production of cementitious materials which could be substituted for paper, cardboard, plastic, polystyrene, or metal products such as containers. However, because cementitious materials essentially comprise such environmentally neutral components such as rock, sand, clay, and water, they would be ideally suited from an ecological standpoint to replace paper, cardboard, plastic, or polystyrene materials as the material of choice for such applications.

Such materials are not only made from nondepletable components, they do not impact the environment nearly as much as do paper, cardboard, plastic, and polystyrene. Another advantage of cementitious and other inorganic materials is that they are far less expensive than paper, cardboard, plastic, polystyrene, or metals.

While paper, cardboard, plastic, polystyrene, and metal products might be comparably priced to each other, they are far more expensive than typical cementitious materials. Because no rational business would ignore the economic benefit which would necessarily accrue from the substitution of radically cheaper cementitious materials for paper, cardboard, plastic, polystyrene, or metals, the failure to do so can only be explained by a marked absence of available technology to make such a substitution.

Based on the foregoing, what are needed are improved methods and systems for manufacturing containers and other objects which do not result in the generation of wastes involved in the manufacture of paper, cardboard, plastic, or polystyrene materials.

In addition, it would be a significant improvement over the prior art if such methods and systems of manufacturing containers and other objects did not yield materials which create essentially nondegradable garbage like paper or polystyrene containers or other objects.

It would be a completely novel and an important advancement if such methods and systems yielded containers and other objects having a chemical composition compatible with the earth into which they eventually might be discarded.

From a practical point of view, it would be a significant improvement if such methods and systems made possible the manufacture of containers and other objects at a cost comparable to existing paper or polystyrene products.

From a manufacturing perspective, it would be a significant advancement in the art of cement making to provide cementitious mixtures and methods for mass producing containers and other objects which can be molded and which will rapidly obtain form stability and maintain their shape without external support so that they can be handled quickly after formation.

Such methods and systems are disclosed and claimed herein

BRIEF SUMMARY AND OBJECTS OF THE INVENTION

The present invention involves novel methods and systems for readily and economically manufacturing containers or other articles of manufacture from hydraulically settable materials. More particularly, the present invention applies novel combinations of temperature and pressure to microstructurally engineered mixtures to produce thin-walled containers that have desired properties and are formstable in the green state shortly after formation. The result of these methods and systems is the ability to manufacture a wide variety of different containers heretofore manufactured from paper, cardboard, plastic, or polystyrene at a cost that is usually competitive with, and in most cases even superior to, the costs involved in using these other materials.

The materials science and microstructural engineering approaches of the present invention build into the microstructure of the hydraulically settable compositions of the present invention the desired physical characteristics and properties, while at the same time remaining cognizant of costs and other complications involved in the large scale manufacturing systems. In doing so, many of the problems have been overcome which have historically relegated the use of most hydraulically settable materials to bulky, massive structural objects.

As discussed in greater detail hereinafter, the materials science and microstructural engineering approaches, instead of the traditional trial-and-error, mix-and-test approach, specifically allow for the design of hydraulically settable materials with the properties of high yield stress with good flow (low viscosity) characteristics, high tensile and flexural strength, high insulation, low weight, low cost, and low environmental impact desired for disposable containers. Control of the design of the hydraulically settable compositions on the microstructural level has come, in part, from the discovery that during formation of an object either (a) the rheology of the composition should be chemically modified to give moldability and rapid form stability, or (b) the water to cement ratio of the composition should be reduced by processing or by the addition of energy.

The result is the ability to mass produce on a commercially viable scale a wide variety of containers and articles (including many which are disposable) from hydraulically settable materials at a cost that is usually competitive with, and in most cases even superior to, the cost involving using other materials. Moreover, because the hydraulically settable materials of the present invention comprise environmentally neutral components, the manufacture of containers and articles therefrom impacts the environment to a much lesser extent than does the manufacture of containers from these other materials. The hydraulically settable materials of the present invention preferably do not require the use of high concentrations of wood pulp or petroleum products as does the manufacture of containers from paper, cardboard, plastic, polystyrene, or metals.

The major components within the hydraulically settable materials of the present invention include mainly inorganic materials, such as a hydraulic binder (like cement or gypsum), aggregates (like perlite, sand, glass, silica, vermiculite, clay, mica, and even waste concrete products), and sufficient water to hydrate, or react with, the hydraulic binder.

Although certain embodiments may also include organic components, such as cellulose-based fibers and/or rheology-modifying agents, these represent a small fraction of the overall mass of the hydraulically settable materials used to manufacture containers. Together, the organic components will make up usually less than about 30% by volume of the unhardened hydraulically settable mixture; preferably, this fraction will be less than about 15% by volume.

However, due to the versatility of the hydraulically settable mixtures used in the manufacture of containers and other objects, a wide range of fibers, both organic and inorganic, can be used. Any abundant fiber, not just wood fiber, but preferably those that can be planted and harvested in an agribusiness setting, works well within the invention. The use of such fibrous materials would have the additional beneficial effect of preserving our dwindling forests.

In any event, natural fibers from, e.g., wood, flax abaca, hemp, cotton, and bagasse are preferred. Because they are held together with a hydraulic binder, they do not require the intense processing used to make most paper or cardboard products. Such processes are necessary in the paper industry in order to release the lignin within the wood pulp and to fray the fibers in order to achieve a web effect between the fibers in order to bind the fibers together. No such intense processing is necessary in the present invention, which to a major extent preserves the strength of the fibers and allows them to be included in far lesser amounts while still deriving a high level of strength therefrom.

Hence, the advantages of fibers can be incorporated into a hydraulic binder, with the addition of smaller concentration and without the extensive processing as in paper. Further, contaminated water is not a significant byproduct in the processing of the present invention as it is in the case of paper production.

Unlike the manufacture of plastic or polystyrene, the hydraulically settable materials of the present invention utilize little or no petroleum-based products or derivatives as starting materials. Thus, although some amount of fossil fuel is necessary to generate the energy used in manufacturing the hydraulically settable containers, only a fraction of the petroleum used in the manufacture of polystyrene or plastic products will be consumed overall. In addition, the energy requirements of the present invention are much less than the energy requirements of paper manufacturing; similarly, the initial capital investments can be less with the present invention.

Finally, another advantage of the hydraulically settable containers of the present invention is that their disposal impacts the environment less than paper and cardboard products, and much less than plastic or polystyrene products. The hydraulically settable materials of the present invention can be readily recycled. Nevertheless, even if not recycled, the hydraulically settable containers of the present invention can be discarded and reduced to a fine granular powder which has a composition complementary to the components of the earth into which it will be placed.

This disintegration process is not dependent on biodegradation forces but will occur as the result of various forces which may be present, such as moisture and/or pressure. For example, the rheology-modifying agent will dissolve over time through exposure to water, thereby creating voids within the matrix of the material. These voids make the material soft and easier to crush. In addition, both the rheology-modifying agent and the cellulose fibers are biodegradable (i.e., subject to breakdown by microorganisms, heat, light, and water).

If the hydraulically settable waste materials are discarded into a landfill, they will crumble into a fine granular powder under the weight of the other garbage present, thereby increasing the specific surface area available for further biodegradation and erosion. If discarded on the ground, the forces of water and wind, and even fortuitous compressive forces such as from cars running over them or people stepping on them, will cause the hydraulically settable waste materials to be reduced to a substantially inorganic, more innocuous granular powder in a short period of time relative to the time it usually takes for the typical disposable paper or polystyrene foam cup to decompose under the same circumstances.

A plastic or metal article thrown into a lake or stream will last for decades, perhaps even centuries, while a hydraulically settable article will dissolve in a short period of time into essentially a dirt-like sand or mud, the time of dissolution being dependent largely on the mix design of the hydraulically settable mixture used to manufacture the article.

The preferred structural matrix of the articles and containers manufactured according to the present invention is formed from the reaction products of a cementitious or other hydraulically settable mixture. A hydraulically settable mixture will at a minimum contain a hydraulic binder, such as hydraulic cement or gypsum hemihydrate, and water.

In order to design the desired specific functional properties into the hydraulically settable mixture and/or the hardened structural matrix for a specific container, a variety of other additives can be included within the hydraulic mixture, such as theology-modifying agents, dispersants, one or more aggregate materials, fibers, air entraining agents, blowing agents, or reactive metals. The identity and quantity of any additive will depend on the desired properties or performance criteria of both the hydraulically settable mixture as well as the final hardened container made therefrom.

Rheology-modifying agents can be added to increase the cohesive strength, "plastic-like" behavior, and the ability of the mixture to retain its shape when molded or extruded. They act as thickeners and increase the yield stress of the hydraulically settable mixture, which is the amount of force necessary to deform the mixture. This creates high "green strength" in the molded or extruded product. Suitable rheology-modifying agents include a variety of cellulose-, starch-, and protein-based materials (which are generally highly polar), all of which assist in bridging the individual particles together.

Dispersants, on the other hand, act to decrease the viscosity and the yield stress of the mixture by dispersing the individual hydraulic binder particles. This allows for the use of less water while maintaining adequate levels of workability. Suitable dispersants include any material which can be adsorbed onto the surface of the hydraulic binder particles and which act to disperse the particles, usually by creating a charged area on the particle surface or in the near colloid double layer.

In the case where both a rheology-modifying agent and a dispersant are used, it will usually be advantageous to add the dispersant first and the rheology-modifying agent second in order to obtain the beneficial effects of each. Otherwise, if the rheology-modifying agent is first adsorbed by the binder particles, it may create a protective colloid layer, which will prevent the dispersant from being adsorbed by the particles and imparting its beneficial effect to the hydraulically settable mixture.

It may be preferable to include one or more aggregate materials within the hydraulically settable mixture in order to add bulk and decrease the cost of the mixture. Aggregates often impart significant strength properties and improve workability. An example of one such aggregate is ordinary sand or clay, which is completely environmentally safe, extremely inexpensive, and essentially inexhaustible.

In other cases, lightweight aggregates can be added to yield a lighter, and often more insulating, final product. Examples of lightweight aggregates are perlite, vermiculite, hollow glass spheres, aerogel, xerogel, pumice, and other lightweight, rocklike materials. These aggregates are likewise environmentally neutral and relatively inexpensive.

Fibers may be added to the hydraulically settable mixture in order to increase the compressive, tensile, flexural, and cohesive strengths of the wet material as well as the hardened container made therefrom. Fiber should preferably have high tear and burst strengths (i.e., high tensile strength), examples of which include abaca, southern pine, flax, bagasse (sugar cane fiber), cotton, and hemp. Fibers with a high aspect ratio work best in imparting strength and toughness to the hydraulically settable material.

One significant aspect of the present invention is that the articles and containers can be economically and mass producibly manufactured. The products disclosed herein are not intended to be handmade at the rate of a few at a time, but are intended to be made at the rate of hundreds, thousands, or tens of thousands per hour. The creation of new materials that can be rapidly processed in such a manner (that is, similar to paper, plastic, or metals) comes from utilization of one of the following approaches during the manufacturing process: (a) chemically modifying the hydraulically settable mixture (such as by the addition of a rheology-modifying agent) in order to give the mixture workability and then rapid form stability, or (b) reducing the water to cement ratio during the formation process (such as by the addition of energy in the form of heat or pressure). The application of these principles will become readily apparent from the following methods of manufacture.

The hydraulically settable articles of the present invention are obtained by the following steps. First, a hydraulically settable mixture is prepared. The components of the mixture are selected by a microstructural engineering approach so that the resulting mixture has desired properties. The components are preferably combined in a mixer extruder but can also be combined through conventional high energy and normal mixers.

Second, the mixture having the desired properties is positioned between a male die of a desired shape and a female die having a shape substantially complementary to that of the male die. The mixture is typically positioned by partially mating the dies and then injecting, such as by an auger- or piston-type extruder, the mixture between the dies. Alternatively, a quantity of the mixture can be placed on a first die such that as the first die is mated with a second die the mixture is positioned between the dies.

Third, the mixture is then pressed between the dies so as to mold the mixture into the desired shape for the container. The types of dies that can be used include solid, split and progressive dies. The type of die selected depends on the size, shape and complexity of the container being manufactured.

Fourth, to economically produce the containers ant articles, the fashioned containers must quickly obtain form stability. In one embodiment, the dies are each heated to a predetermined temperature so as to rapidly dry the surface of the container, thereby creating a form-stable container. Heating the dies also functions to form a steam barrier the minimizes the adhering of the container to the dies. Additional methods such as cooling the dies or adding a non-hydrating liquid that rapidly evaporates can also be used to quickly impart form stability to the containers. Still other methods used to impart form stability include the addition of carbon sources, accelerators, methyl cellulose, starch, and fibers to the mixture or limiting the amount of water in the mixture.

Fifth, once the containers obtain form stability they can be removed from the dies. Removal of the dies is typically accomplished by airveying or sucking the containers off the mold. Alternatively, a template can be used to lift the containers off the mold.

Sixth, the containers are then passed through a drying tunnel to drive off significant amounts of water within the container, thereby increasing the strength and improving the form stability of the container. The heat imparted by the drying tunnel also increases the rate of hydration of the hydraulic cement and reduces the time in which the cementitious matrix ultimately cures.

When desired, additional steps may include applying a coating and fixing print on the container. Once the container has obtained sufficient strength, the container can be packaged and shipped.

In the preferred embodiment, the male die and the female die are each heated to a predetermined temperature prior to pressing the mixture. The mixture is then pressed between the heated dies under a selected combination of temperature, pressure, and time to produce a container that is form stable immediately after pressing. It is this ability to rapidly impart form stability to the containers that permits the economic mass production of the containers.

Additional embodiments of the present invention include the addition of air voids in order to add insulative properties to the containers. These air voids are created by the incorporation of gas through various techniques into the cementitious mixture—one method being the mechanical incorporation of air voids during the mixing process, and another being the incorporation of a gas which is chemically generated in situ within the cement paste.

The compositions of the present invention can be varied to yield products of substantially different character. For example, very lightweight products (similar to that of polystyrene foam) with rigid walls can be manufactured. For convenience, this first type of product is sometimes herein referred to as a "foam-like" product.

Alternatively, products that have an appearance more like that of a pottery or ceramic product can be made according to the present invention. However, the products of the present invention can be made much lighter, typically having a bulk specific gravity less than about 1.5, whereas pottery or ceramic products typically have a bulk specific gravity of 2.0 or greater. However, the mixtures of the present invention can be selectively designed to produce products having a bulk specific gravity of about 2 or even as high as 3. This second type of product of the present invention is sometimes herein referred to as a "clay-like" product, because it is a zero-slump, form stable hydraulically settable material that still has excellent workability properties.

A key feature of the microstructural engineering design of the present invention is the materials science optimization of each desired property (including minimization of cost). It is only because of the unique microstructural engineering of the present invention that the hydraulically settable mixtures can be molded into a thin-walled, complex, lightweight product such as a food and beverage container and still maintain its shape without external support during the green state until hardening can be accomplished.

Indeed, the economic viability of mass producing articles and containers from hydraulically settable materials is only possible because the hydraulically settable mixture is self-supporting during the green state and will maintain its molded state throughout the curing process. In addition, the compositions of the present invention importantly provide cementitious mixtures that rapidly reaches a sufficiently high tensile and compressive strengths so that the molded containers can be handled and manipulated using conventional means.

From the foregoing, it will be appreciated that an object of the present invention is to provide methods and systems for forming containers of a desired shape and other articles of manufacture from a hydraulically settable mixture.

Also, an object of the present invention is to provide methods and systems for manufacturing containers and articles that have properties similar to containers presently made of paper, plastic, styrofoam and the like.

It is a further object of the present invention to provide methods and systems for readily and economically mass producing the above containers and articles.

Another object of the present invention is to provide methods and systems for manufacturing containers and articles which can be molded from hydraulically settable materials which will rapidly gain form stability and maintain their shape without external support.

Yet another object of the present invention is to provide methods and systems for manufacturing containers and articles which do not result in the generation of wastes like those involved in the manufacture of paper, cardboard, plastic, or polystyrene.

Another object of the present invention is to provide methods and systems for manufacturing containers and articles that have a composition compatible with the earth into which they eventually might be discarded.

An additional object of the present invention is provide methods and systems for forming containers and articles that do not adhere to the forming apparatus.

Finally, it is yet another object of the present invention to provide methods and systems for forming containers and articles that have sufficient form stability to be handled without deformation directly after forming.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which:

FIGS. 8 is a cut away view of the mated male die and female die showing a molding area.

FIG. 9 is a schematic view of the male die and female die being partially mated to form a gap distance.

FIG. 10c is schematic view of positioning the template at the base of the male die for pressing the hydraulically settable material.

FIG. 11 is a schematic view of the template removing the container from the male die.

DETAILED DESCRIPTION OF THE PREFERRED EMBODIMENTS

Figure 1:
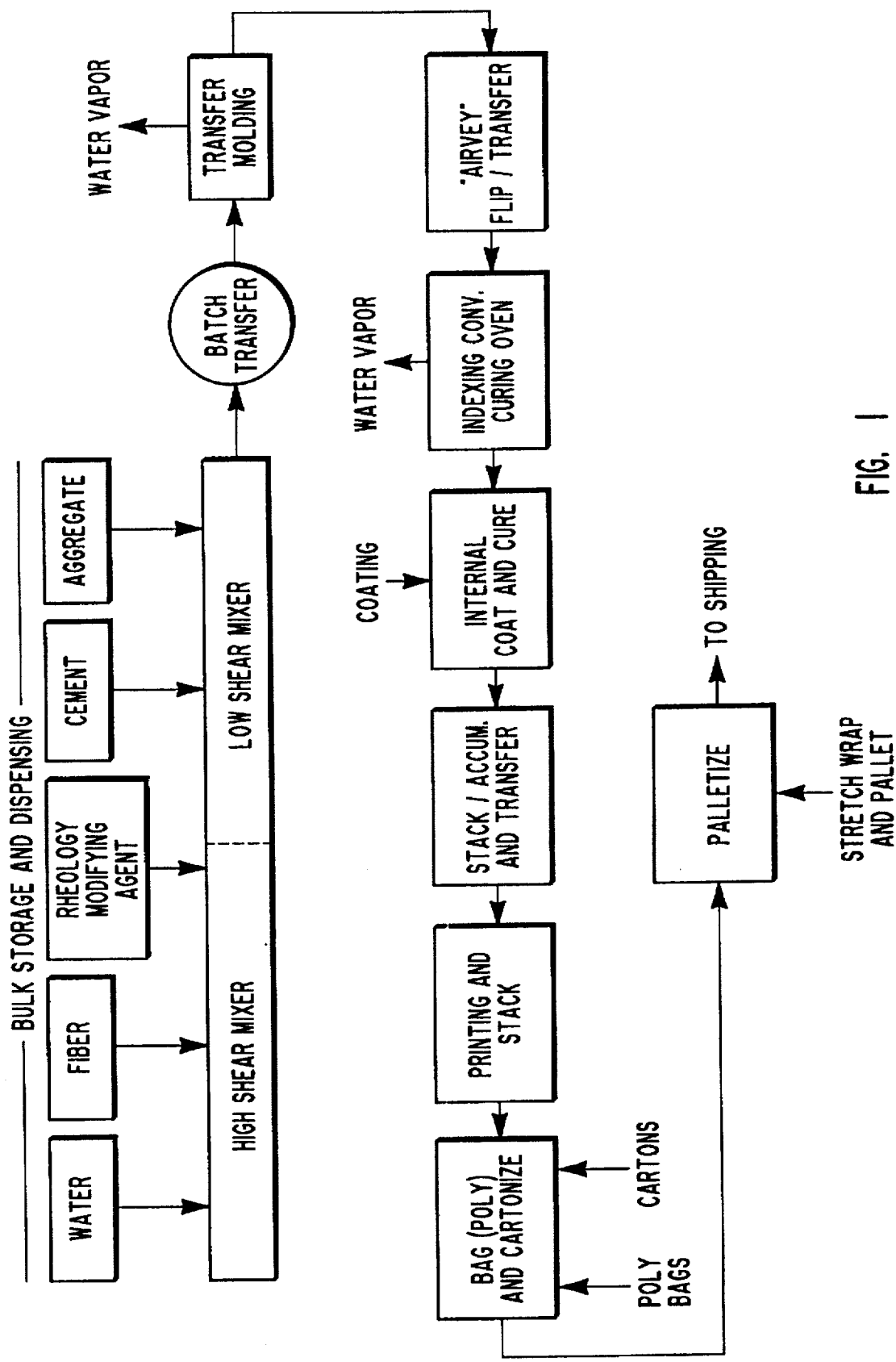
FIG. 1 is a flow diagram of an assembly system for mass producing hydraulically settable articles.

The present invention relates to manufacturing articles of manufacture, primarily containers for use in packaging, storing, shipping, or dispensing various types of products or objects (such as food and beverage products) for which materials such as paper, plastic, glass, metal, and polyurethane have previously been used. More particularly, the present invention includes novel methods and systems for forming a hydraulically settable mixture into form stable articles of a desired shape while the hydraulically settable mixture is still in the green state. The article is then dried and finished, such as by applying a coating or printing, in preparation for its intended use.

The hydraulically settable mixtures used in manufacturing the present articles are selectively designed using a microstructural engineering approach that permits the material to have a high yield stress while simultaneously having good flow or low viscosity characteristics. In turn, this material can be used to economically produce thin-walled, lightweight, insulative, and environmentally compatible articles and containers of the present invention.

I. General Discussion

Hydraulic cement products and the methods of utilizing various hydraulic cements have literally been known for millennia. The types of such cementitious products which have been made over the centuries are various and numerous. However, these products are similar in that they are extremely bulky and require significant size and mass in order to achieve the desired strength and other performance criteria.

While the types of cementitious products have varied over the years, the methods of manufacturing such products have not. Essentially all processes require pouring the cement mixture into forms and then allowing extensive time for the products to set and cure. Once the product has substantially cured, the forms can be removed, and the process repeated for the next product.

Accordingly, under traditional processing techniques of standard concrete, it is impossible, due to the required curing or "form stability" period, to rapidly and economically mass produce cementitious articles. More importantly, it is not even feasible using traditional processing techniques to produce lightweight, small capacity containers having sufficient strength and other properties necessary to make them functional for the uses disclosed herein.

As mentioned above, containers and articles of the present invention have been developed from the perspective of microstructural engineering in order to build into the microstructure of the hydraulically settable material certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design hydraulically settable materials with those properties of rheology (or the forming state) strength, weight, insulation, cost, and environmental neutrality (in the final state) that are necessary for the manufacturing and use of the articles and containers of the present invention in a significantly more efficient manner.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have a high modulus of elasticity, while polymers have a low modulus; metals can be shaped by casting and forging, while composites require lay-up or special molding techniques; hydraulically settable materials, including those made from hydraulic cements historically have low flexural strength, while elastomers have high flexural strength.

However, compartmentalization of material properties has its dangers; it can lead to specialization (the metallurgist who knows nothing of ceramics) and to conservative thinking ("we use steel because that is what we have always used"). Partially, it is this specialization and conservative thinking that has limited the consideration of using hydraulically settable materials for a variety of products, such as in connection with the food and beverage industry.

Nevertheless, once it is realized that hydraulically settable materials have such a wide utility and can be designed and microstructurally engineered, then their applicability to a variety of possible products becomes obvious. Hydraulically settable materials have an additional advantage over other conventional materials in that they gain their properties under relatively gentle and nondamaging conditions. (Other materials require high energy or severe heat or harsh chemical processing that significantly affects the material components.) Therefore, many non-hydraulically settable materials can be incorporated into hydraulically settable materials with surprising synergistic properties or results if properly designed and engineered.

The design of the compositions of the present invention has been developed and narrowed, first by primary constraints dictated by the design, and then by seeking the subset of materials which maximize the performance of the components. At all times during the process, however, it is important to realize the necessity of designing products which can be manufactured in a cost-competitive process.

Primary constraints in materials selection are imposed by characteristics of the design of a component which are critical to a successful product. With respect to a cup or container, those primary constraints include minimal weight, strength (both compressive and tensile), and toughness requirements, while simultaneously keeping the costs to those comparable to paper, plastic, glass and metal counterparts.

As discussed above, one of the problems with hydraulically settable materials in the past has been that they are typically poured into a form, worked, and then allowed to set, harden, and cure over a long period of time—even days or weeks. Experts generally agree that it takes at least one month for traditional concrete products to reach a substantial degree of their optimum strength. Even with expensive "set accelerators," this strength gain occurs over a period of days. Such time periods are certainly impractical for the economic mass production of disposable containers and similar products.

As a result, an important feature of the present invention is that when the hydraulically settable mixture is molded, it will maintain its shape (i.e., support its own weight subject to minor forces, such as gravity and movement through the processing equipment) in the green state without external support. Further, from a manufacturing perspective, in order for production to be economical, it is important that the molded container rapidly (in a matter of minutes, or even seconds) achieve sufficient strength so that it can be handled using ordinary manufacturing procedures, even though the hydraulically settable mixture may still be in a green state and not fully hardened.

Another advantage of the microstructural engineering approach of the present invention is the ability to develop compositions in which cross-sections of the structural matrix are more homogeneous than have been typically achieved in the prior art. Ideally, when any two given samples of a volume at about 0–5 $n^3$, where "n" is the cross-section of the object, of the hydraulically settable structural matrix are taken, they will have substantially similar amounts of voids, aggregates, fibers, any other additives, and properties of the matrix.

In its simplest form, the process of using materials science in microstructurally engineering and designing a hydraulically settable material comprises characterizing, analyzing, and modifying (if necessary): (a) the aggregates, (b) the predicted particle packing, (c) the system rheology, and (d) the processing and energy of the manufacturing system. In characterizing the aggregates, the average particle size is determined, the natural packing density of the particles (which is a function of the same of the particles) is determined, and the strength of the particles is ascertained.

With this information, the particle packing can be predicted according to mathematical models. It has been established that the particle packing is a primary factor for designing desired requirements of the ultimate product, such as workability, form stability, shrinkage, bulk density, insulative capabilities, tensile, compressive, and flexural strengths, elasticity, durability, and cost optimization. The particle packing is affected not only by the particle and aggregate characterization, but also by the amount of water and its relationship to the interstitial void volume of the packed aggregates.

System rheology is a function of both macro-rheology and micro-rheology. The macro-rheology is the relationship of the solid particles with respect to each other as defined by the particle packing. The micro-rheology is a function of the lubricant fraction of the system that fills or more than fills the spaces between the "macro" particles. By modification of the lubricants (which may be water, rheology-modifying agents, plasticizers, or other materials), the viscosity and yield stress can be chemically modified. The micro-rheology can also be modified physically by changing the shape and size of the particles, e.g., the use of chopped fibers, plate-like mica, round-shaped silica fume, or crushed rough cement particles will interact with the lubricants differently.

Finally, the manufacturing processing can be modified to manipulate the balance between workability and form stability. As applied to the present invention, this becomes important in significantly increasing the yield stress during formation of the article of manufacture by either chemical additive (such as by adding a rheology-modifying agent) or by adding energy to the system (such as by heating the molds). Indeed, it is this discovery of how to manipulate the hydraulically settable compositions in order to easily form and then quickly increase the form stability of the compositions during the formation process that make the present invention such a significant advancement in the art.

From the following discussion, it will be appreciated how each of the component materials within the hydraulically settable mixture, as well as the processing parameters, contributes to the primary design constraints of the article or container so that they can be economically mass produced. Specific compositions are set forth in the examples given later in order to demonstrate how the maximization of the performance of each component accomplishes the combination of desired properties.

II. Articles of Manufacture

The present invention is directed to the manufacturing of articles of manufacture, primarily containers. The term "article" or "article of manufacture" as used in the specification and appended claims, is intended to include all goods that can be fashioned, such as by injection molding or die pressing, from a hydraulically settable material as disclosed herein. Such articles include, but are not limited to, goods that are currently manufactured from paper, plastic, styrofoam, metal, glass and composites.

The terms "container" or "containers," as used in this specification and the appended claims, are intended to include any receptacle or vessel utilized for packaging, storing, shipping, serving or dispensing various types of products or objects (including but not limited to food and beverage products), whether such use is intended to be for a short-term or a long-term duration of time. Examples of such containers include boxes, hot and cold cups, vending plates, jars, clam shells, french fry containers, meat packaging platters, breakfast plates, spherical objects, bottles, cartons, cases, crates, dishes, egg cartons, lids, straws, cutlery or other types of objects. In short, the "container" should be capable of holding its contents, whether stationary or in movement, while maintaining the integrity of itself and the materials contained therein. This does not mean that the container is required to be used in shipping goods, or that it must be capable of withstanding the forces often encountered when goods are actually shipped from one location to another. The container should, however, be capable of containing the goods when lifted and placed in another location.

The container should also be capable of containing its goods and maintaining its integrity for a sufficient period of time to satisfy its intended use. It will be appreciated that, under certain circumstances, the container may seal the contents from the external atmosphere and in other circumstances may merely hold or retain the contents.

In addition to integrally formed containers, containment products used in conjunction with the containers are also intended to be included within the term "containers." Such products include, for example, lids, liners, partitions, wrappers, cushioning materials, and any other object used in packaging storing, shipping, portioning, serving, or dispensing an object within a container.

The containers within the purview of the present invention may or may not be classified as being disposable. In some cases, where a stronger, more durable construction is required, the container might be capable of repeated use. On the other hand, the container might be manufactured in such a way so as to be economical for it to be used only once and then discarded. The present containers have a composition such that they can be readily discarded or thrown away in conventional waste landfill areas as an environmentally neutral material (i.e., without causing significant extraordinary environmental hazards).

Containers are the preferred article of manufacture of the present invention and, as such, are referenced extensively throughout the specification. Furthermore, containers are used as an example in describing the steps and systems of manufacturing. It should be noted, however, that the term "container" is used only by way of example and not by limitation and that its use is intended to include any "article" of manufacture covered by the present invention.

III. Components of Hydraulically Settable Mixture

Terms such as "hydraulically settable material," "hydraulically settable composition," "hydraulically settable mixture" and "mixture" as used in the specification and appended claims are intended to broadly define compositions and materials that include a composition of a hydraulically settable binder and water to which may also be added various admixtures. Use of the above terms are independent of the extent of hydration or curing that has taken place. Hence, the materials can be either in a green or unhardened state, as well as a hardened or cured state. By way of example and not limitation, the admixtures combined in the above mixtures and materials included rheology-modifying agents, aggregates, fibers, air entraining agents, dispersants, and set accelerators. As previously discussed, the selection and quantity of each component incorporated into the hydraulically settable mixture is based on a microstructural analysis.

Terms such as "hydrated" or "cured" hydraulically settable mixture, material, or matrix refers to a level of substantial water-catalyzed reaction which is sufficient to produce a hydraulically settable product having a substantial amount of its potential or final maximum strength. Nevertheless, hydraulically settable materials may continue to hydrate long after they have attained significant hardness and a substantial amount of their final maximum strength.

Terms such as "green" or "green state" are used in conjunction with hydraulically settable mixtures which have not achieved a substantial amount of their final strength, regardless of whether such strength is derived from artificial drying, curing, or other means. Hydraulically settable mixtures are said to be "green" or in a "green state" just prior and subsequent to being molded into the desired shape. The moment when a hydraulically settable mixture is no longer "green" or in a "green state" is not necessarily a clear-cut line of demarcation, since such mixtures generally attain a substantial amount of their total strength only gradually over time. Hydraulically settable mixtures can, of course, show an increase in "green strength" and yet still be "green." For this reason, the discussion herein often refers to the form stability of the hydraulically settable material in the green state.

The term "form stable," as used in the specification and the appended claims, means that the container or article is mechanically self-supporting without significant deformation, i.e., can maintain its shape indefinitely against the force of gravity without any exterior support such as a mold.

Below is a discussion of the components which can be incorporated into the hydraulically settable mixture.

A. Hydraulically Settable Materials

The terms "hydraulically settable binder" or "hydraulic binder" as used in this specification and the appended claims are intended to include any inorganic binder such as hydraulic cement, gypsum hemihydrate, or calcium oxide which develops strength properties and hardness by chemically reacting with water and, in some cases, with carbon dioxide in the air and water. The hydraulically settable binders used in the present invention are to be distinguished from other cements or binders such as polymerizable, water insoluble organic cements, glues, or adhesives. The terms "hydraulic cement" or "cement" as used in this specification and the appended claims are intended to include clinker and crushed, ground, milled, and processed clinker in various stages of pulverization and in various particle sizes.

Examples of typical hydraulic cements known in the art include: the broad family of portland cements (including ordinary portland cement without gypsum), calcium aluminate cements (including calcium aluminate cements without set regulators), plasters, silicate cements (including β-dicalcium silicates, tricalcium silicates, and mixtures thereof), gypsum cements, phosphate cements, high alumina cements, microfine cements, slag cements, magnesium oxychloride cements, Pyrament, MDF, "densit-type" cements, and aggregates coated with microfine cement particles.

The term "hydraulic cement" is also intended to include other cements known in the art, such as α-dicalcium silicate, which can be made hydraulic under hydrating conditions within the scope of the present invention. The basic chemical components of the hydraulic cements within the scope of the present invention usually include CaO, $SiO_2$, $Al_2O_3$, $Fe_2O_3$, MgO, $SO_3$, in various combinations thereof. These react together in a series of complex reactions to form insoluble calcium silicate hydrates, carbonates (from $CO_2$ in the air and added water), sulfates, and other salts or products of calcium and magnesium, together with hydrates thereof. The aluminum and iron constituents are thought to be incorporated into elaborate complexes within the above mentioned insoluble salts. The cured cement product is a complex matrix of insoluble hydrates and salts which are complexed and linked together much like stone, and are similarly inert.

Hydraulically settable compositions are typically formed by mixing a hydraulic binder or combinations thereof (such as hydraulic cement) and water; the resulting mixture may be referred to as a "hydraulic paste" (or "cement paste"). The hydraulic binder and water can then be mixed either simultaneously or subsequently, with some sort of aggregate or other admixtures. Mortar and concrete are examples of hydraulically settable mixtures formed by mixing hydraulic cement, water, and some sort of aggregate, such as sand or rock.

Gypsum is also a hydraulically settable binder that can be hydrated to form a hardened binding agent. One hydratable form of gypsum is calcium sulfate hemihydrate, commonly known as "gypsum hemihydrate." The hydrated form of gypsum is calcium sulfate dihydrate, commonly known as "gypsum dihydrate." Calcium sulfate hemihydrate can also be mixed with calcium sulfate anhydride, commonly known as "gypsum anhydrite" or simply "anhydrite."

Although gypsum binders or other hydraulic binders such as calcium oxide are generally not as strong as hydraulic cement, high strength may not be as important as other characteristics (e.g., the rate of hardening) in some applications. In terms of cost, gypsum and calcium oxide have an advantage over hydraulic cement, because they are somewhat less expensive. Moreover, in the case where the hydraulically settable material contains a relatively high percentage of weak, lighter weight aggregates (such as perlite), the aggregates will often comprise a "weak link" within the structural matrix. At some point, adding a stronger binder may be inefficient because the binder no longer contributes its higher potential strength due to a high content of weaker aggregates.

In addition, gypsum hemihydrate is known to set up or harden in a much shorter time period than traditional cements. In fact, in use with the present invention, it will harden and attain most of its ultimate strength within about thirty minutes. Hence, gypsum hemihydrate can be used alone or in combination with other hydraulically settable materials within the scope of the present invention.

As mentioned above, preferable hydraulic binders include white cement, portland cement, microfine cement, high alumina cement, slag cement, gypsum hemihydrate, and calcium oxide, mainly because of their low cost and suitability for the manufacturing processes of the present invention. This list of cements is by no means exhaustive, nor in any way is it intended to limit the types of binders which would be useful in making the hydraulically settable containers within the scope of the claims appended hereto.

Although the hydraulic binder is understood as the component which allows the hydraulically settable material to set up, to harden, and to achieve much of the strengthened properties of the material, certain hydraulic binders also aid in the development of better early cohesion and green strength. For example, hydraulic cement particles are known to undergo early gelling reactions with water even before it becomes hard; this can contribute to the internal cohesion of the mixture.

It is believed that aluminates, such as those more prevalent in portland grey cement (in the form of tricalcium aluminates) are responsible for a colloidal interaction between the cement particles during the earlier stages of hydration. This in turn causes a level of flocculation/gelation to occur between the cement particles. The gelating, colloidal, and flocculating affects of such binders has been shown to increase the moldability (i.e., cohesion and plasticity) of hydraulically settable materials made therefrom. As set forth more fully below, additives such as fibers and rheology-modifying agents can make substantial contributions to the hydraulically settable materials in terms of tensile, flexural, and compressive strengths. Nevertheless, even where high concentrations of fibers and/or rheology-modifying agents are included and contribute substantially to the tensile and flexural strengths of the hardened material, it has been shown that the hydraulic binder nevertheless continues to add substantial amounts of compressive strength and other important properties to the final hardened material. In the case of hydraulic cement, it also substantially reduces the solubility of the hardened material in water.

The percentage of hydraulic binder within the overall mixture varies depending on the identity of the other added constituents. However, the hydraulic binder is preferably added in an amount ranging from between about 5% to about 90% as a percentage by weight of the wet hydraulically settable mixture. From the disclosure and examples set forth herein, it will be understood that this wide range of weights covers hydraulically settable materials used to manufacture foam-like or clay-like materials and containers.

It will be appreciated from the foregoing that embodiments within the scope of the present invention will vary from a very lightweight "foam-like" product to a somewhat higher density "clay-like" product. Within these broader categories will be other variations and differences which will require varying quantities and identities of the components. The components and their relative quantities may substantially vary depending upon the specific container or other product to be made.

Generally, when making a "foam-like" product, it will be preferable to include the hydraulic binder within the range from between about 10% to about 90% by weight of the wet hydraulically settable mixture, and more preferably within the range from between about 20% to about 50%.

When making a "clay-like" product, it will be preferable to include the hydraulic binder within the range from between about 5% to about 75% by weight of the wet hydraulically settable mixture, more preferably within the range from between about 8% to about 60%, and most preferably within the range from between about 10% to about 45%.

Despite the foregoing, it will be appreciated that all concentrations and amounts are critically dependent upon the qualities and characteristics that are desired in the final product. For example, in a very thin-walled structure (even as thin as 0.05 mm) where strength is needed, such as in a drinking straw, it may be more economical to have a very high percentage of hydraulic binder with little or no aggregate. In such a case, it may also be desirable to include a high amount of fiber to impart flexibility and toughness.

Conversely, in a product in which high amounts of air are incorporated (such as a low density, lightweight, insulating cup), there may be a greater percentage of the rheology-modifying agent, a smaller amount of cement, and larger amounts of lightweight aggregates. Such materials can have as high a percentage of air as do polystyrene foam products.

The present invention may include other types of cementitious compositions such as those discussed in patent application Ser. No. 07/981,615 now U.S. Pat. No. 5,358,676, entitled "Methods of Manufacture and Use For Hydraulically Bonded Cement" filed Nov. 25, 1992, in the names of Hamlin M. Jennings, Ph.D., Per Just Andersen, Ph.D., and Simon K. Hodson which is a continuation-in-part of patent application Ser. No. 07/856,257, filed Mar. 25, 1992, in the names of Hamlin M. Jennings, Ph.D. and Simon K. Hodson now abandoned, and entitled "Hydraulically Bonded Cement Compositions and Their Methods of Manufacture and Use" which is a file wrapper continuation of patent application Ser. No. 07/526,231 filed May 18, 1990, in the names of Hamlin M. Jennings, Ph.D. and Simon K. Hodson now abandoned, and entitled "Hydraulically Bonded Cement Compositions and Their Methods of Manufacture and Use" and now abandoned. In these applications, powdered hydraulic cement is placed in a near net final position and compacted prior to the addition of water for hydration. For purposes of disclosure, the forgoing patent applications are incorporated herein by specific reference.

Additional types of hydraulic cement compositions include those wherein carbon dioxide is mixed with hydraulic cement and water. Hydraulic cement compositions made by this method are known for their ability to more rapidly achieve green strength. This type of hydraulic cement composition is discussed in patent application Ser. No. 07/418,027 now U.S. Pat. No. 5,232,496 filed Oct. 10, 1989, in the names of Hamlin M. Jennings, Ph.D. and Simon K. Hodson, and entitled "Process for Producing Improved Building Material and Products Thereof," wherein water and hydraulic cement are mixed in the presence of a carbonate source selected from the group consisting of carbon dioxide, carbon monoxide, carbonate salts, and mixtures thereof. For purposes of disclosure, the foregoing patent is incorporated herein by specific reference.

In many situations, it may not be desirable for the container or article to be water soluble. Unfortunately, certain materials which might be desirable to incorporate into such containers dissolve in water. An important advantage of using a hydraulically settable mixture is that the resulting structural matrix is generally water insoluble (at least over the period of time during which use of the product is intended), which allows it to encapsulate the water soluble aggregates or other materials added to the hydraulically settable mixture. Hence, an otherwise water soluble component can be incorporated into the greatly insoluble hydraulically settable matrix and impart its advantageous properties and characteristics to the final product.

Nevertheless, in order to design a disposable container which will more readily decompose or disintegrate after it has fulfilled its intended use, it may be desirable for the container to break down in the presence of water or moisture. One of the advantages of the microstructural engineering approach of the present invention is the ability to design into the hydraulically settable structural matrix the desired properties of water resistance or solubility. In order to obtain a container that readily decomposes in the presence of water, it will generally be necessary to decrease the amount of hydraulic binder within the material. Hence, the degree of water solubility or insolubility is generally related to the concentration of hydraulic binder, particularly hydraulic cement, within the hydraulically settable mixture. In most cases, adding more hydraulic binder will make the container less soluble in water.

B. Water

By definition, water is an essential component of the hydraulically settable materials within the scope of the present invention. The hydration reaction between hydraulic binder and water yield reaction products which give the hydraulically settable materials the ability to set up and develop strength properties. The other components alter the properties of, e.g., strength, shrinkage, flexibility, insulating ability, color, porosity, surface finish, and texture.

In most applications of the present invention, it is important that the water to cement ratio be carefully controlled in order to obtain a hydraulically settable mixture which after molding, extrusion, and/or calendering is self-supporting in the green state. Nevertheless, the amount of water to be used is dependent upon a variety of factors, including the types and amounts of hydraulic binder, aggregates, fibrous materials, rheology-modifying agents, and other materials or additives within the hydraulically settable material, as well as the molding or forming process to be used, the specific product to be made, and its properties.

The preferred amount of added water within any given application is primarily dependent upon two key variables: (1) the amount of water which is required to react with and hydrate the binder; (2) the amount of water required to give the hydraulically settable mixture the necessary rheological properties and workability.

In order for the green hydraulically settable mixture to have adequate workability, water must generally be included in quantities sufficient to wet each of the particular components and also to at least partially fill the interstices or voids between the particles (including, e.g., binder particles, aggregates, and fibrous materials). If water soluble additives are included, enough water must be added to dissolve or otherwise react with the additive. In some cases, such as where a dispersant is added, workability can be increased while using less water.

The amount of water must be carefully balanced so that the hydraulically settable mixture is sufficiently workable, while at the same time recognizing that lowering the water content increases both the green strength and the final strength of the hardened product. Of course, if less water is initially included within the mixture, less water must be removed in order to allow the product to harden.

The appropriate rheology to meet these needs can be defined in terms of yield stress. The yield stress of the hydraulically settable mixture will usually be in the range from between about 5 kPa to about 5,000 kPa, with the more preferred mixtures having a yield stress within a range from about 100 kPa to about 1,000 kPa, and the most preferred mixtures having a yield stress in the range from about 200 kPa to about 700 kPa. The desired level of yield stress can be (and may necessarily have to be) adjusted and optimized to the particular molding process being used to form the article or container.

In each of the molding processes, it may be desirable to initially include a relatively high water to cement ratio in light of the fact that the excess water can be removed by heating the molded products during or shortly after the molding process. One of the important features of the present invention as compared to the manufacture of paper is that the amount of water in the initial mixture is much less; hence, the yield stress is greater for the hydraulically settable mixtures. The result is that the total amount of water that must be removed from the initial mixture to obtain a self-supporting material (i.e., a form stable material) is much less in the case of the present invention when compared to the manufacture of paper.

Nevertheless, one skilled in the art will understand that when more non-optimized packed aggregates or other water absorbing additives are included, a higher water to hydraulically settable binder ratio is necessary in order to provide the same level of workability and available water to hydrate the hydraulically settable binder. This is because a greater aggregate concentration provides a greater volume of interparticulate interstices or voids which must be filled by the water. Porous, lightweight aggregates can also internally absorb significant amounts of water due to their high void content.

Both of the competing goals of greater workability and high green strength can be accommodated by initially adding a relatively large amount of water and then driving off much of the water as steam during the molding process, usually by the use of heated dies or drying tunnels.

Based on the foregoing qualifications, typically hydraulically settable mixtures within the scope of the present invention will have a water-to-hydraulically settable binder ratio within a range from about 0.1 to about 10, preferably about 0.3 to about 3.5, and most preferably from about 0.5 to about 2. The total amount of water remaining after drying the material to remove excess water will range up to about 10% by weight with respect to the dry, hardened hydraulically settable container.

It should be understood that the hydraulic binder has an internal drying effect on the hydraulically settable mixture because binder particles chemically react with water and reduce the amount of free water within the interparticulate interstices. This internal drying effect can be enhanced by including faster reacting hydraulic binders such as gypsum hemihydrate along with slower reacting hydraulic cement.

According to a preferred embodiment of the present invention, it has been found desirable that the hydraulic binder and water be mixed in a high shear mixture such as that disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material." For purposes of disclosure, the forgoing patents are incorporated herein by specific reference.

The use of a high shear mixer has resulted in a more homogeneous hydraulically settable mixture, which has resulted in a product with higher strength. Furthermore, these high shear mixers can be utilized to entrain significant amounts of air into the hydraulically settable mixture to create "foam-like" products.

C. Rheology-modifying Agents

The inclusion of a rheology-modifying agent acts to increase the plastic or cohesive nature of the hydraulically settable mixture so that it behaves more like a moldable clay. The rheology-modifying agent tends to thicken the hydraulically settable mixture by increasing the yield stress without greatly increasing the viscosity of the mixture. Raising the yield stress in relation to the viscosity makes the material more plastic-like and moldable, while greatly increasing the subsequent form stability or green strength.

A variety of natural and synthetic organic rheology-modifying agents may be used which have a wide range of properties, including viscosity and solubility in water. For example, where it is desirable for the container to more quickly break down into environmentally benign components, it may be preferable to use a rheology-modifying agent which is more water soluble. Conversely, in order to design a material capable of withstanding prolonged exposure to water, it may be preferable to use a rheology-modifying agent which is less soluble in water or to use a high content of the hydraulic binder with respect to the rheology-modifying agent.

The various rheology-modifying agents contemplated by the present invention can be roughly organized into the following categories: (1) polysaccharides and derivatives thereof, (2) proteins and derivatives thereof, and (3) synthetic organic materials. Polysaccharide rheology-modifying agents can be further subdivided into (a) cellulose-based materials and derivatives thereof, (b) starch-based materials and derivatives thereof, and (c) other polysaccharides.

Suitable cellulose-based rheology-modifying agents include, for example, methylhydroxyethylcellulose, hydroxymethylethylcellulose, carboxymethylcellulose, methylcellulose ethylcellulose, hydroxyethylcellulose, hydroxyethylpropylcellulose, etc. The entire range of possible permutations is enormous and shall not be listed here, but other cellulose materials which have the same or similar properties as these would also work well.

Suitable starch-based materials include, for example, amylopectin, amylose, seagel, starch acetates, starch hydroxyethylethers, ionic starches, long-chain alkylstarches, dextrins, amine starches, phosphates starches, and dialdehyde starches.

Other natural polysaccharide-based rheology-modifying agents include, for example, alginic acid, phycocolloids, agar, gum arabic, guar gum, locust bean gum, gum karaya, and gum tragacanth.

Suitable protein-based rheology-modifying agents include, for example, Zein® (a prolamine derived from corn), collagen (derivatives extracted from animal connective tissue such as gelatin and glue), and casein (the principle protein in cow's milk).

Finally, suitable synthetic organic plasticizers include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylimides, ethylene oxide polymers, polylactic acid, and latex, which is a styrene-butadiene copolymer.

The rheology of polylactic acid is significantly modified by heat and could be used alone or in combination with any other of the foregoing rheology-modifying agents.

A currently preferred rheology-modifying agent is methyl hydroxyethylcellulose, examples of which are Tylose® FL 15002 and Tylose® 4000, both of which are available from Hoechst Aktiengesellschaft of Frankfurt, Germany. Lower molecular weight rheology-modifying agents such as Tylose® 4000 can act to plasticize the mixture rather than thicken it, which helps during extrusion or rolling procedures.

More particularly, lower molecular weight rheology-modifying agents improve the internal flow of the hydraulically settable mixture during molding processes by providing additional lubrication to the particles. This reduces the friction between the particles as well as between the mixture and the adjacent mold surfaces. Although a methylhydroxyethylcellulose rheology-modifying agent is preferred, almost any non-toxic rheology-modifying agent (including any listed above) which imparts the desired properties would be appropriate.

Another preferred rheology-modifying agent that can be used instead of, or in conjunction with, Tylose® is polyethylene glycol having a molecular weight of between 20,000 and 35,000. Polyethylene glycol works more as a lubricant and adds a smoother consistency to the mixture. For this reason, polyethylene glycol might be referred to more precisely as a "plasticizer." In addition, it gives the molded hydraulically settable material a smoother surface. Finally, polyethylene glycol can create a coating around soluble components of the mixture and thereby render the hardened product less water soluble.

Finally, starch-based rheology-modifying agents are of particular interest within the scope of the present invention because of their comparatively low cost compared to cellulose-based rheology-modifying agents such as Tylose®. Although starches typically require heat and/or pressure in order to gelate, starches may by modified and prereacted so that they can gel at room temperature. The fact that starches, as well as many of the other rheology-modifying agents listed above, have a variety of solubilities, viscosities, and rheologies allows for the careful tailoring of the desired properties of a mix design so that it will conform to the particular manufacturing and performance criteria of a particular food or beverage container.

The rheology-modifying agent within the hydraulically settable materials of the present invention can be included in an amount up to about 50% by weight of the mixture. Generally, however, the preferable concentration is up to about 20%, with less than about 10% being more preferable.

D. Aggregates

Aggregates common in the concrete industry may be used in the hydraulically settable mixtures of the present invention, except that they often must be more finely ground due to the size limitations imposed by the generally thin-walled structures of the present invention. The diameter of the aggregates used will most often be less than about 30% of the cross-section of structural matrix of the container.

Aggregates may be added to increase the strength, decrease the costs by acting as a filler, decrease the weight, and/or increase the insulation ability of the resultant hydraulically settable materials. Aggregates, particularly plate-like aggregates, are also useful for creating a smooth surface finish. Examples of useful aggregates include perlite, vermiculite, sand, gravel, rock, limestone, sandstone, glass beads, aerogels, xerogels, seagel, mica, clay, synthetic clay, alumina, silica, fly ash, silica fume, tabular alumina, kaolin, microspheres, hollow glass spheres, porous ceramic spheres, gypsum dihydrate, calcium carbonate, calcium aluminate, cork, seeds, lightweight polymers, xonotlite (a crystalline calcium silicate gel), lightweight expanded clays, unreacted cement particles, pumice, exfoliated rock, and other geologic materials.

Unreacted cement particles may also be considered to be "aggregates" in the broadest sense of the term. Even discarded hydraulically settable materials such as containers or other objects of the present invention can be employed as aggregate fillers and strengtheners. It will be appreciated that the containers of the present invention can be effectively recycled.

Both clay and gypsum are particularly important aggregate materials because of their ready availability, extreme low cost, workability, ease of formation, and because they can also provide a degree of binding and strength if added in high enough amounts. Clay is a general term used to identify essentially all earths that form a paste with water and harden when dried. The predominant clays include silica and alumina (used for making pottery, tiles, brick, and pipes) and kaolinite. The kaolinite clays are anauxite, which has the chemical formula $Al_2O_3.SiO_2.H_2O$, and montmorilonite which has the chemical formula $Al_2O_3.SiO_2.H_2O$. However, clays may contain a wide variety of other substances such as iron oxide, titanium oxide, calcium oxide, calcium oxide, zirconium oxide, and pyrite.

In addition, although clays have been used for millennia and can obtain hardness even without being fired, such unfired clays are vulnerable to water degradation and exposure, are extremely brittle, and have low strength. Nevertheless, clay makes a good, inexpensive aggregate within the hydraulically settable structural matrix.

Similarly, gypsum hemihydrate is also hydratable and forms the dihydrate of calcium sulfate in the presence of water. Thus, gypsum may exhibit the characteristics of both an aggregate and a binder depending on whether (and the concentration of) the hemihydrate or dihydrate form is added to a hydraulically settable mixture.

Examples of aggregates which can add a lightweight mixture characteristic to the cementitious mixture include perlite vermiculite, glass beads, hollow glass spheres, calcium carbonate, synthetic materials (e.g., porous ceramic spheres, tabular alumina, etc.), cork, lightweight expanded clays, sand, gravel, rock, limestone, sandstone, pumice, and other geological materials.

In addition to conventional aggregates used in the cement industry, a wide variety of other aggregates, including fillers, strengtheners, including metals and metal alloys (such as stainless steel, calcium aluminate, iron, copper, silver, and gold), balls or hollow spherical materials (such as glass, polymeric, and metals), filings, pellets, powders (such as microsilica), and fibers (such as graphite, silica, alumina, fiberglass, polymeric, organic fibers, and other such fibers typically used to prepare various types of composites), may be combined with the hydraulic cements within the scope of the present invention. Even materials such as seeds, starches, gelatins, and agar-type materials can be incorporated as aggregates in the present invention.

From the foregoing, it will be understood that the amount of a particular aggregate within a mixture will vary depending upon the desired performance criteria of a particular article or container. There are many situations when little or no aggregate will be used. However, in most situations, the aggregate will be included in an amount of up to about 80% by weight of the green or wet hydraulic settable mixture.

In the products contemplated by the present invention where high insulation is desired, the amount of lightweight aggregate will usually be within the range from between about 3% to about 50% by weight, and most preferably, within the range from about 20% to about 35% by weight of the green mixture. Heavier weight aggregates will also be included in roughly the same amounts, albeit in lower quantities per unit of mass.

Further, it will be appreciated that for any given product, certain of these aggregates may be preferable while others may not be usable. For example, certain of the aggregates may contain harmful materials that, for some uses, could leach from the hydraulically settable mixture; nevertheless, most of the preferred materials are not only nontoxic under most uses in the food and beverage industry, but they are also more environmentally neutral than the components in existing disposable products.

Fibrous aggregates are used in the present invention primarily to modify the weight characteristics of the cementitious mixture, to add form stability to the mixture, and to add strength and flexibility to the resulting cementitious matrix, although certain fibers may also impart some level of insulation to the final product. Therefore, the term "aggregates" will refer to all other filler materials, which are nonfibrous, and whose function is mainly to impart strength, rheological, textural, and insulative properties to the materials.

It is often preferable, according to the present invention, to include a plurality of differently sized and graded aggregates capable of more completely filling the interstices between the aggregate and hydraulic binder particles. Optimizing the particle packing density reduces the amount of water necessary to obtain adequate workability by eliminating spaces which would otherwise be filled with interstitial water, often referred to as "capillary water." In addition, using less water increases the strength of the final hardened product (according to the Feret Equation).

In order to optimize the packing density, differently sized aggregates with particle sizes ranging from as small as about 0.5 μm to as large as about 2 mm or more may be used. (Of course, the desired purpose and thickness of the resulting product will dictate the appropriate particle sizes of the various aggregates to be used.) It is within the skill of one in the art to know generally the identity and sizes of the aggregates to be used in order to achieve the desired characteristics in the final hydraulically settable article or container.

In certain preferred embodiments of the present invention, it may be desirable to maximize the amount of the aggregates within the hydraulically settable mixture in order to maximize the properties and characteristics of the aggregates (such as qualities of strength, low density, or high insulation). The use of particle packing techniques may be employed within the hydraulically settable material in order to maximize the amount of the aggregates.

A detailed discussion of particle packing can be found in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Anderson, P. J., "Control and Monitoring of Concrete Production—A Study of Particle Packing and Rheology," The Danish Academy of Technical Sciences. For purposes of disclosure, the foregoing article and doctoral dissertation are incorporated herein by specific reference. The advantages of such packing of the aggregates can be further understood by reference to the examples in the previously incorporated patent application "Hydraulically Settable Containers and Other Articles For Storing, Dispensing, and Packaging Food and Beverages and Methods For Their Manufacture" in which hollow glass spheres of varying sizes are mixed in order to maximize the amount of the glass balls in the hydraulically settable mixture.

In embodiments in which it is desirable to obtain an article or container with high insulation capability, it may be preferable to incorporate into the hydraulically settable matrix a lightweight aggregate which has a low thermal conductivity, or "k-factor" (defined as W/m·K). The k-factor is roughly the reciprocal of the expression commonly used in the United States to describe the overall thermal resistance of a given material, or "R-factor," which is generally defined as having units of hr·ft$^{2\circ}$ F./BTU. The term R-factor is most commonly used in the United States to describe the overall thermal resistance of a given material without regard to the thickness of the material. However, for purposes of comparison, it is common to normalize the R-factor to describe thermal resistance per inch of thickness of the material in question or hr·ft$^{2\circ}$ F./BTU·in.

For purposes of this specification, the insulation ability of a given material will here and after be expressed only in terms of the IUPAC method of describing thermal conductivity, i.e., "k-factor." (The conversion of thermal resistance expressed in British units (hr·ft$^{2\circ}$ F./BTU·in) to IUPAC units can be performed by multiplying the normalized number by 6.9335 and then taking the reciprocal of the product.) Generally, aggregates having a very low k-factor also contain large amounts of trapped interstitial space, air, mixtures of gases, or a partial vacuum which also tends to greatly reduce the strength of such aggregates. Therefore, concerns for insulation and strength tend to compete and should be carefully balanced when designing a particular mix design.

The preferred insulating, lightweight aggregates include expanded or exfoliated vermiculite, perlite, calcined diatomaceous earth, and hollow glass spheres—all of which tend to contain large amounts of incorporated interstitial space. However, this list is in no way intended to be exhaustive, these aggregates being chosen because of their low cost and ready availability. Nevertheless, any aggregate with a low k-factor, which is able to impart sufficient insulation properties into the container, is within the purview of the present invention.

E. Fibers

As used in the specification and the appended claims, the terms "fibers" and "fibrous materials" include both inorganic fibers and organic fibers. Fibers are a particular kind of aggregate which may be added to the hydraulically settable mixture to increase the cohesion, elongation ability, deflection ability, toughness, fracture energy, flexural, tensile and, on occasion, compressive strengths of the resulting hydraulically settable material. Fibrous materials reduce the likelihood that the hydraulically settable container will shatter when a strong cross-sectional force is applied.

Fibers which may be incorporated into the structural matrix are preferably naturally occurring fibers, such as cellulosic fibers extracted from hemp, cotton, plant leaves, wood or stems, or fibers made from glass, silica, ceramic, or metal. Glass fibers are preferably pretreated to be alkali resistant.

Preferred fibers of choice include glass fibers, abaca, bagasse, wood fibers (both hard wood or soft wood, such as southern pine), and cotton. Recycled paper fibers can be used, but they are somewhat less desirable because of the fiber disruption or degradation that occurs during the original paper manufacturing process. Any equivalent fiber, however, which imparts strength and flexibility is also within the scope of the present invention. Abaca fibers are available from Isarog Inc. in the Philippines. Glass fibers, such as Cemfill® are available from Pilkington Corp. in England.

These fibers are preferably used in the present invention due to their low cost, high strength, and ready availability. Nevertheless, any equivalent fiber which imparts compressive and tensile strength, as well as toughness and flexibility (if needed), is certainly within the scope of the present invention. The only limiting criteria is that the fibers impart the desired properties without adversely reacting with the other constituents of the hydraulic material and without contaminating foodstuffs stored or dispensed in the containers containing such fibers.

The fibers used to make the containers of the present invention preferably have a high length to width ratio (or "aspect ratio") because longer, narrower fibers can impart more strength to the structural matrix without significantly adding bulk and mass to the mixture. The fibers should have an aspect ratio of at least about 10:1, preferably at least about 100:1, and most preferably at least about 200:1.

Preferred fibers should also have a length that is several times the diameter of the hydraulic binder particles. Fibers having a length that is at least twice the length of the hydraulic binder particles will work; fibers having a length that is at least 10 times the diameter of the hydraulic binder particles is preferred, with at least 100 times being more preferred, and even 1000 times being very useful.

The amount of fibers added to the hydraulically settable matrix will vary depending upon the desired properties of the final product, with strength, toughness, flexibility, and cost being the principle criteria for determining the amount of fiber to be added in any mixed design. In most cases, fibers will be added in the amount within the range from about 0.2% to about 50% by volume of the hardened hydraulically settable mixture, more preferably within the range from about 1% to about 30% by volume, and most preferably within the range from about 5% to about 15% by volume.

It will be appreciated, however, that the strength of the fiber is a very important feature in determining the amount of the fiber to be used. The stronger the tensile strength of the fiber, the less the amount that must be used to obtain the same tensile strength in the resulting product. Of course, while some fibers have a high tensile strength, other types of fibers with a lower tensile strength may be more elastic. Hence, a combination of two or more fibers may be desirable in order to obtain a resulting product that maximizes multiple characteristics, such as high tensile strength and high elasticity.

It should be understood that the fibers used within the scope of the present invention differ from fibers typically employed in making paper or cardboard products, primarily in the way in which the fibers are processed. In the manufacture of paper, either a Kraft or a sulfite process is typically used to form the pulp sheet. In the Kraft process, the pulp fibers are "cooked" in a NaOH process to break up the fibers. In a sulfite process, acid is used in the fiber disintegration process.

In both of these processes, the fibers are first processed in order to release lignins locked within the fiber walls. However, in order to release the lignins from the fiber, some of the strength of the fiber is lost. Because the sulfite process is even more severe, the strength of the paper made by a sulfite process will generally have only about 70% of the strength of paper made by the Kraft process. (Hence, to the extent wood fibers are included, those processed using a Kraft process would be preferred.)

Once the wood has been made into wood pulp by either a Kraft or a sulfite process, it is further processed in a beater in order to further release lignins and hemicellulose within the fibers and also to fray the fibers. A slurry generally containing 99.5% water and 0.5% wood pulp is subjected to heavy beating in order to release enough hemicelulose and fray the fibers sufficiently to form a fibrous mixture that is essentially self-binding through an intertwining web effect between the fibers.

The fibers are essentially self-binding through a web effect of the frayed fiber ends and the adhesive ability of the released lignins and hemicellulose, as well as the hydrogen bonding between the fibers. Hence, "web physics" and hydrogen bonding governs the forces maintaining the integrity of the resultant paper or cardboard product. However, the cost of such harsh treatment is that the fibers develop major flaws along the entire length of the fiber, thereby resulting in a loss of much of their tensile, tear, and burst strengths.

In contrast, the fibers within the scope of the present invention undergo no such harsh treatment from the beater and, therefore, retain most of their initial strength. This is possible because they are bound together using a hydraulic binder. Hence, matrix to fiber adhesion rather than web physics forces are chiefly responsible for maintaining the integrity of the products of the present invention.

Consequently, far less fiber may be added to the hydraulically settable mixtures of the present invention while still deriving a high level of strength from the fibers. Employing less fiber while maintaining good strength properties allows a more economically produced container because (1) fiber is typically far more expensive than either the hydraulic binder or the aggregates, and (2) the capital investment for the processing equipment is much less.

It should also be understood that some fibers such as southern pine and abaca have high tear and burst strengths, while others such as cotton have lower strength but greater flexibility. In the case where both flexibility and high tear and burst strength is desired, a mixture of fibers having the various properties can be added to the mixture.

F. Dispersants

The term "dispersant" is used herein to refer to the class of materials which can be added to reduce the viscosity and yield stress of the hydraulically settable mixture. A more detailed description of the use of dispersants may be found in the Master's Thesis of Andersen, P. J., "Effects of Organic Superplasticizing Admixtures and their Components on Zeta Potential and Related Properties of Cement Materials" (1987). For purposes of disclosure, the foregoing Master's Thesis is incorporated herein by specific reference.

Dispersants generally work by being adsorbed onto the surface of the hydraulic binder particles and/or into the near colloid double layer of the binder particles. This creates a negative charge on or around the surfaces of the particles causing them to repel each other. This repulsion of the particles adds "lubrication" by reducing the friction or attractive forces that would otherwise cause the particles to have greater interaction. Hence, less water can be added initially while maintaining the workability of the hydraulically settable mixture.

Greatly reducing the viscosity and yield stress may be desirable where plastic-like properties, cohesivehess, and/or form stability are less important. Adding a dispersant aids in keeping the hydraulically settable mixture workable even when very little water is added, particularly where there is a "deficiency" of water. Hence, adding a dispersant allows for an even greater deficiency of water, although the molded container may have somewhat less form stability if too much dispersant is used. Nevertheless, including less water initially will theoretically yield a stronger final cured product according to the Feret Equation.

Whether or not there is a deficiency of water is both a function of the stoichiometric amount of water required to hydrate the binder and the amount of water to occupy the interstices between the particles in the hydraulically settable mixture, including the hydraulic binder particles themselves, the particles within the aggregate material, and/or the fibrous material. As stated above, particle packing reduces the volume of the interstices between the hydraulic binder and aggregate particles and, hence, the amount of water necessary to fully hydrate the binder and maintain the workability of the hydraulically settable mixture by filling the interstitial space.

However, due to the nature of the coating mechanism of the dispersant, the order in which the dispersant is added to the mixture is often critical. If a flocculating/gelating agent such as Tylose® is added, the dispersant must be added first and the flocculating agents second. Otherwise, the dispersant will not be able to become adsorbed on the surface of the hydraulic binder particles as the Tylose® will be irreversibly adsorbed to form a protective colloid on the surface, preventing the dispersant from being adsorbed.

A preferred dispersant is sulfonated naphthaleneformaldehyde condensate, an example of which is WRDA 19, which is available from W. R. Grace, Inc. located in Baltimore. Other dispersants which would work well include sulfonated melamine-formaldehyde condensate, lignosulfonate, and polyacrylic acid.

The amount of added dispersant will generally range up to about 5% by weight of the hydraulic binder, more preferably within the range of between about 0.2% to about 4%, and most preferably within a range of between about 0.5% to about 2%. However, it is important not to include too much dispersant as it tends to retard the hydration reactions between, e.g., hydraulic cement and water. Adding too much dispersant can, in fact, prevent hydration, thereby destroying the binding ability of the cement paste altogether.

The dispersants contemplated within the present invention have sometimes been referred to in the concrete industry as "superplasticizers." In order to better distinguish dispersants from rheology-modifying agents, which often act as plasticizers, the term "superplasticizer" will not be used in this specification.

G. Air Voids

Where insulation, not strength, is the overriding factor (i.e., whether it is desired to insulate hot or cold materials), it may be desirable to incorporate tiny air voids within the hydraulically settable structural matrix of the containers in addition to, or in place of, lightweight aggregates in order to increase the container's insulating properties. The incorporation of air voids into the cementitious mixture is carefully calculated to impart the requisite insulation characteristics without degrading the strength of the container to the point of nonutility. Generally, however, if insulation is not an important feature of a particular product, it is desirable to minimize any air voids in order to maximize strength and minimize volume.

In certain embodiments, nonagglomerated air voids may be introduced by high shear, high speed mixing of the hydraulically settable mixture, with a foaming or stabilizing agent added to the mixture to aid in the incorporation of air voids. The high shear, high energy mixers discussed above are particularly useful in achieving this desired goal. Suitable foaming and air entraining agents include commonly used surfactants. One currently preferred surfactant is a polypeptide alkylene polyol, such as Mearlcrete® Foam Liquid.

In conjunction with the surfactant, it will be necessary to stabilize the entrained air within the material using a stabilizing agent like Mearlcel 3532®, a synthetic liquid anionic biodegradable solution. Both Mearlcrete® and Mearlcel® are available from the Mearl Corporation in New Jersey. Another foaming and air-entraining agent is vinsol resin. In addition, the rheology-modifying agent can act to stabilize the entrained air. Different air-entraining agents and stabilizing agents impart different degrees of foam stability to the hydraulically settable mixture, and they should be chosen in order to impart the properties that are best suited for a particular manufacturing process.

During the entrainment of air, the atmosphere above the high speed mixer can be saturated with a gas such as carbon dioxide, which has been found to cause an early false setting and create form and foam stability of the hydraulically settable mixture. The early false setting and foam stability is thought to result from the reaction of $CO_2$ and hydroxide ions within the hydraulically settable mixture to form soluble sodium and potassium carbonate ions, which in turn can interact with the aluminate phases in the cement and accelerate the setting of the mixture.

Foam stability helps maintain the dispersion, and prevents the agglomeration, of the air voids within the uncured hydraulically settable mixture. Failure to prevent the coalescence of the air voids actually decreases the insulation effect, and it also greatly decreases the strength of the cured hydraulically settable mixture. Raising the pH, increasing the concentration of soluble alkali metals such as sodium or potassium, adding a stabilizing agent such as a polysaccharide rheology-modifying agent, and carefully adjusting the concentrations of surfactant and water within the hydraulically settable mixture all help to increase the foam stability of the mixture.

During the process of molding and/or hardening the hydraulically settable mixture, it is often desirable to heat up the hydraulically settable mixture in order to increase the volume of the air void system. Heating also aids in rapidly removing significant amounts of the water from the hydraulically settable mixture, thereby increasing the green strength of the molded product.

If a gas has been incorporated into the hydraulically settable mixture, heating the mixture to 250° C., for example, will result (according to the ideal gas equation) in the gas increasing its volume by about 85%. When heating is appropriate, it has been found desirable for the heating to be within a range from about 100° C. to about 250° C. More importantly, if properly controlled, heating will not result in the cracking of the structural matrix of the container or yield imperfections in the surface texture of the container.

In other applications, where viscosity of the hydraulically settable mixture is high, such as is required in certain molding processes, it is much more difficult to obtain adequate numbers of air voids through high shear mixing. In this case, air voids may alternatively be introduced into the hydraulically settable mixture by adding an easily oxidized metal, such as aluminum, magnesium, zinc, or tin into a hydraulic mixture that is either naturally alkaline (such as a hydraulic cement or calcium oxide containing mixture) or one that has been made alkaline (such as those containing gypsum or another alkaline hydraulic binder).

This reaction results in the evolution of tiny hydrogen bubbles throughout the hydraulically settable mixture. Adding a base such as sodium hydroxide to, and/or heating (as described below), the hydraulically settable mixture increases the rate of hydrogen bubble generation.

It may further be desirable to heat the mixture in order to initiate the chemical reaction and increase the rate of formation of hydrogen bubbles. It has been found that heating the molded product to temperatures in the range of from about 50° C. to about 100° C., and preferably about 75° C. to about 85° C., effectively controls the reaction and also drives off a significant amount of the water. Again, this heating process does not result in the introduction of cracks into the matrix of the molded product. This second method of introducing air voids into the structural matrix can be used in conjunction with, or in place of, the introduction of air through high speed, high shear mixing in the case of low viscosity hydraulic mixtures used in some molding processes.

Finally, air voids may be introduced into the hydraulically settable mixture during the molding process by adding a blowing agent to the mixture, which will expand when heat is added to the mixture. Blowing agents typically consist of a low boiling point liquid and finely divided calcium carbonate (talc). The talc and blowing agent are uniformly mixed into the hydraulically settable mixture and kept under pressure while heated. The liquid blowing agent penetrates into the pores of the individual talc particles, which act as points from which the blowing agent can then be vaporized upon thermal expansion of the blowing agent as the pressure is suddenly reduced.

During the molding or extrusion process, the mixture is heated while at the same time it is compressed. While the heat would normally cause the blowing agent to vaporize, the increase in pressure prevents the agent from vaporizing, thereby temporarily creating an equilibrium. When the pressure is released after the molding or extrusion of the material, the blowing agent vaporizes, thereby expanding or "blowing" the hydraulically settable material. The hydraulically settable material eventually hardens with very finely dispersed voids throughout the structural matrix. Water can also act as a blowing agent as long as the mixture is heated above the boiling point of water and kept under pressure of up to 50 bars.

Air voids increase the insulative properties of the hydraulically settable containers and also greatly decrease the bulk density and, hence, the weight of the final product. This reduces the overall mass of the resultant product, which reduces the amount of material that is required for the manufacture of the containers and which reduces the amount of material that will ultimately be discarded in the case of disposable containers.

It has also been discovered that, after the cementitious container has solidified, many of the compositional designs of the present invention result in a matrix that is slightly permeable, especially to tiny hydrogen gas molecules, which can diffuse out of the structural matrix. This breathability factor is highly desirable of certain types of food containers, such as the "claim-shell" containers used in the fast food industry, so that bread products do not become soggy.

H. Set Accelerators

In some cases it may be desirable to accelerate the initial set of the hydraulically settable mixture by adding to the mixture an appropriate set accelerator. These include $Na_2CO_3$, $KCO_3$, $KOH$, $NaOH$, $CaCl_2$, $CO_2$, triethanolamine, aluminates, and the inorganic alkali salts of strong acids, such as $HCl$, $HNO_3$, and $H_2SO_4$. In fact, any compound which increases the solubility of gypsum and calcium hydroxide will tend to accelerate the initial set of hydraulically settable mixtures, particularly cementitious mixtures.

The amount of set accelerator which may be added to a particular hydraulically settable mixture will depend upon the degree of set acceleration that is desired. This in turn will depend on a variety of factors, including the mix design, the time interval between the steps of mixing the components and molding the hydraulically settable mixture, the temperature of the mixture, and the identity of the accelerator. One of ordinary skill in the art will be able to adjust the amount of added set accelerator according to the parameters of a particular manufacturing process in order to optimize the setting time of the hydraulically settable mixture.

IV. Methods For Production of the Present Invention

The preferred methods for manufacturing containers and articles within the scope of the present invention include the steps of (1) preparing the hydraulically settable mixture including the components of hydraulically settable material, water, and selective additives such as a rheology-modifying agent, aggregates, and/or fibers; (2) positioning the mixture between a male die of a desired shape and a female having a shape substantially complementary to that of the male die; (3) pressing the mixture between the dies to mold the mixture into the shape desired for the container; (4) imparting form stability to the containers; (5) removing the shaped container from between the dies such that the container is self-supporting; (6) drying the mixture to harden in the desired shape of the container; and, when desirable, (7) applying a coating so as finish the surface of the container and make it water resistant; (8) accumulating and stacking the containers; (9) fixing printing to the container; (10) bagging, cartonizing, and pelletizing. Each of these steps are discussed below in detail.

Figure 2:
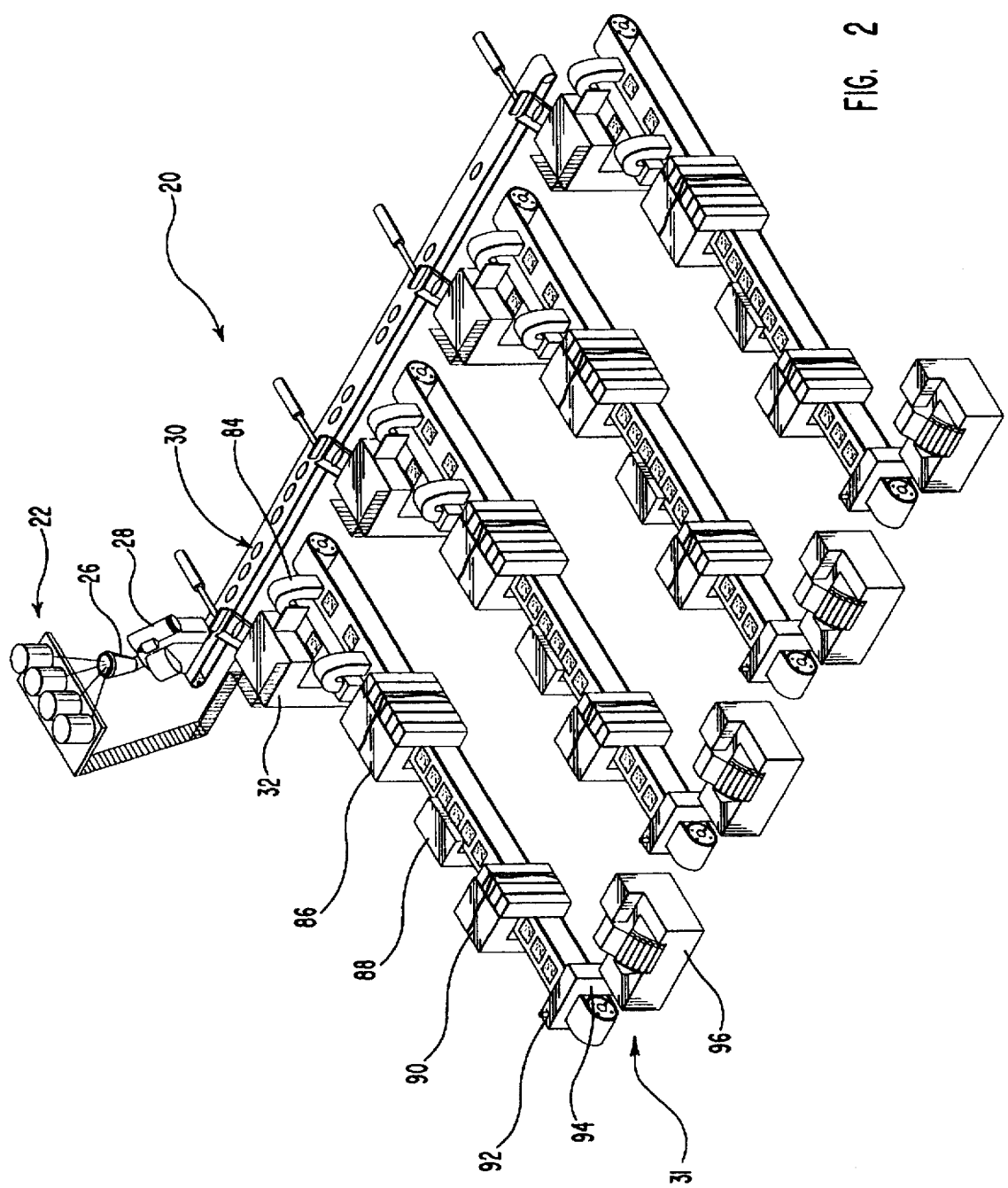
FIG. 2 is a schematic view of an assembly system for mass producing the hydraulically settable articles of FIG. 1.

A manufacturing system of the present invention is memorialized in the flow diagram of FIG. 1 and the schematic drawing of FIG. 2. The system disclosed is only one possible embodiment. The various stations or processes can be added, subtracted, or reorganized to fit specific design parameters.

Step One: Preparing the Hydraulically Settable Mixture

The first step in the method of manufacturing is preparing a hydraulically settable mixture. The composition of the mixture is preferably determined through a materials science and microstructural engineering approach. This approach is discussed in greater detail in U.S. patent applications entitled "Cementitious Food and Beverage Storage, Dispensing, and Packaging Containers and The Methods of Manufacturing Same," Ser. No. 07/929,898, filed Aug. 11, 1992, in the names of Per Just Andersen, Ph.D., and Simon K. Hodson now abandoned; "Cementitious Materials For Use in Packaging Containers and Their Methods of Manufacture," Ser. No. 08/019,151 now U.S. Pat. No. 5,453,310, filed Feb. 17, 1993, in the names of Per Just Andersen, Ph.D., and Simon K. Hodson; "Cementitious Materials for Use In Cushioning, Spacing, Partitioning, Portioning, Or Wrapping Objects And The Methods Of Manufacturing Such Materials," Ser. No. 08/018,773, filed Feb. 17, 1993, in the names of Per Just Andersen, Ph.D., and Simon K. Hodson now abandoned; and "Laminate Insulation Barriers Having A Cementitious Structural Matrix And Methods For Their Manufacture," Ser. No. 08/027,451, filed Mar. 8, 1993, in the names of Per Just Andersen, Ph.D., and Simon K. Hodson now abandoned, which applications are incorporated herein by specific reference. While reference to the foregoing applications will provide greater detail, the following summary is helpful and is believed to be satisfactory for the general understanding of the present invention.

As previously discussed, microstructural engineering is the process of building into the microstructure of composition certain desired, predetermined properties. In turn, these desired properties are exhibited in the final product. Such a process permits one skilled in the art to select components, as well as their relative concentrations, in order to obtain a hydraulically settable mixture having desired properties and minimum cost.

Some of the properties considered to be generally desirable with regard to the hydraulically settable mixtures are adequate workability, plastic-like qualities, and green strength for a given extrusion and/or molding process. As discussed below in greater detail, the level of water, rheology-modifying agent, and (optionally) dispersant will determine the level of workability and extrudability of the mixture, as will the other components within the mixture, such as aggregates, fibers, set accelerators, etc. Based on the teachings incorporated herein by specific reference, one skilled in the art will be able to adjust the identities and amounts of the various components in order to optimize the workability, plastic-like behavior, and green strength necessary to carry-out any die pressing process.

With regard to the final cured or hardened product, some of the properties considered generally desirable to design into the structural matrix of the container include high tensile strength (in general or along particular vectors), flexural strength, flexibility, and ability to elongate, deflect or bend. In some cases it may be desirable to obtain containers or articles which substantially incorporate the properties of existing paper, plastic, or cardboard products. However, in other cases it may be desirable to obtain a structural matrix having properties not obtainable using ordinary wood pulp or other traditional paper-making starting materials. These may include increased rigidity, toughness, higher modulus of elasticity, water resistance or lower bulk density.

The flexibility, tensile strength, flexural strength, or modulus of elasticity can be tailored to the particular performance criteria of the container or other object in question by adjusting the components and relative concentrations of the components within the hydraulically settable mixture. In some cases higher tensile strength may be an important feature. In others it may be less significant. Some containers should preferably be more flexible while others will be stiff. The important thing is to achieve a material which has properties adequate for a particular use, while remaining cognizant of cost and other practical production line parameters. While having "too much" or "too little" of a particular property may be inconsequential from the standpoint of performance, from a cost standpoint it may be wasteful or inefficient to provide for the particular property.

The hydraulically settable articles and containers formed using the compositions described above will preferably have a tensile strength within the range from about 0.05 MPa to about 75 MPa, and more preferably within the range from about 1 MPa to about 30 MPa and most preferably in a range from about 3 MPa to about 15 MPa. In addition, the containers will preferably have a bulk density within the range from about 0.1 g/cm$^3$ to about 3 g/cm$^3$ and more preferably in a range from about 0.5 g/cm$^3$ to about 2.0 g/cm$^3$. Whether a container will have a density at the lower, intermediate, or higher end of this range will generally depend on the desired performance criteria for a given usage. Finally, the hydraulically settable articles and containers of the present invention will preferably have a tensile strength to bulk density ratio within the range from between about 1 MPa-cm$^3$/g to about 150 MPa-cm$^3$/g, and more preferably within the range from between about 3 MPa-cm$^3$/g to about 50 MPa-cm$^3$/g.

In order to prepare a desired hydraulically settable mixture, the fiber, water, rheology-modifying agent and other additives are preferably blended together in a high shear mixer in order to form a well-dispersed, homogeneous mixture. In some cases it may be preferable to also add the hydraulic binder, as well as certain lower concentration aggregates such as mica, during the high shear mixing step. High shear mixing is used for the addition of fibrous material to insure that the fibrous materials are well dispersed throughout the mixture. This results in a more uniformly blended mixture, which improves the consistency and cohesion of the uncured mixture as well as increasing the strength of the final cured product.

The addition of fibers by normal cement-mixing techniques can result in the conglomeration of the fibers, leading to deformities in the resulting containers or articles. Standard mixers, such as drum mixers, combine the components of the desired mixture by applying low energy stirring or rotating to the components. In contrast, high-shear energy mixers, as previously disclosed, are comparable to heavy duty blenders that are capable of rapidly blending the mixture so as to apply high shearing forces on the particles of the hydraulically settable materials and the added fibers. As a result, the fibers and other additives are uniformly dispersed throughout the mixture, thereby permitting a homogenous structure for the subsequent containers. Mixers such as the Eirich Rv-11 are common in the art and are considered high-shear energy mixers.

It is also preferred that rheology-modifying agents be added to the mixture through high-shear energy mixing. The rheology-modifying agents tend to agglomerate into balls of gel as they are initially combined with the mixture. High-shear energy mixing is useful in dispersing the agents uniformly throughout the mixture such that the mixture has a consistent plasticity.

Thereafter, aggregates included in higher concentrations (and sometimes the hydraulic binder) are blended into the mixture using a conventional low shear mixer. This is particularly true where lightweight aggregates are added which cannot withstand high shear conditions without breaking, such as perlite or hollow glass spheres. One method for low shear mixing is using the auger associated with the extruding process to combine the hydraulic binder, aggregate, and previously mixed additives. Whether or not the hydraulic binder is added during the steps of high or low shear mixing depends on the nature of the hydraulic binder as well as how the mixture is handled.

In alternative embodiments, other additives such as air entraining agents and reactive metals can be incorporated into the mixture in order to obtain a final material with lower density and higher insulating ability. It is preferable that the size of the aggregates not exceed 25% of the final matrix since oversized aggregates could damage the dies and create flaws within the container surface.

The embodiment of the present invention as shown in FIG. 2 reveals a system 20 used to manufacture hydraulically settable containers. System 20 includes a bulk storage area 22 used to contain the components for the cementitious mixture. The components can include water, hydraulically settable materials, fiber, rheology-modifying agents, aggregates and other admixtures as previously discussed.

These materials are shipped and stored in bags, cartons, or bins which are moved with conventional manually operated transport equipment (fork lifts, 2-wheelers, etc.). Experience has shown that with minimal automation, one operator will, on average, be able to move 20–25 pounds of bulk material per minute over the course of a typical shift.

Once system 20 is in operation, the selected components are loaded into hopper 26 where they are metered by weight and fed into a mixer 28 for the creation of the hydraulically settable mixture. As previously discussed, the mixture is microstructurally engineered such that the metering of the components depends on the properties desired. In a typical mixture, the components are preferably added in the following order:

| Mix Conditions | Materials | Amounts (lb/10,000 containers) | Duration |
| --- | --- | --- | --- |
| High Shear | Water | 377 | 1 Minute |
| | Cellulose Fiber | 13.5 | |
| | "Tylose" Additive | 6.7 | |
| Low Shear | Cement | 134.5 | 5 Minutes |
| | Perlite | 201.8 | |
| TOTAL | | | 6 Minutes |

In the preferred embodiment, mixer 28 is capable of both high and low shear mixing. The internal components of the mixer can be made of stainless steel because the abrasion to the mixer is not great due to the lubrication as a result of the water. However, the internal components of mixer 28 can be carbide hard-coated for extended life, thereby resisting the abrasion expected from the aggregates and the cement. Such mixers are well known in the art and include the Eirich Rv-11 mixer. Alternative high-shear mixers are as previously discussed.

A single mixer can typically supply mixed material for the downstream container manufacturing lines 31. The mixer can handle up to 13 cubic feet of material per batch and assuming a 6 minute mix cycle, is capable of producing 4000 pounds of material per hour assuming thirty-one pounds per cubic foot. A total of about 1400 pounds per hour is required for desired production, representing an excess capacity of about 200%.

Referring again to FIG. 2, once the hydraulically settable mixture is formed, the mixture is positioned on an intermittent motion conveyor 30 which distributes the mixture to a downstream container manufacturing line 31. Under manufacturing conditions, several manufacturing lines may be fed by motion conveyor 30.

In the currently preferred embodiment for the industrial setting mixer 28 is equipment in which the materials incorporated into the hydraulically settable mixture are automatically and continuously metered, mixed, desired, and extruded or injected between the dies by a twin auger extruder apparatus. A twin auger extruder apparatus has sections with specific purposes such as low shear mixing, high shear mixing, vacuuming, and pumping. A twin auger extruder apparatus has different flight pitches and orientations which permits the sections to accomplish their specific purposes.

It is also possible to premix some of the components in a vessel, as needed, and pump the premixed components into the twin auger extruder apparatus. The preferable twin auger extruder apparatus utilizes uniform rotational augers wherein the augers rotate in the same direction. Counter-rotational twin augers extruders, wherein the augers rotate in the opposite directions, accomplish the same purposes. A pug mill may also be utilized for the same purposes. Equipment meeting these specifications are available from Buhler, Inc., located in Minneapolis, Minn.

Step Two: Positioning the Mixture Between the Dies

Figure 3:
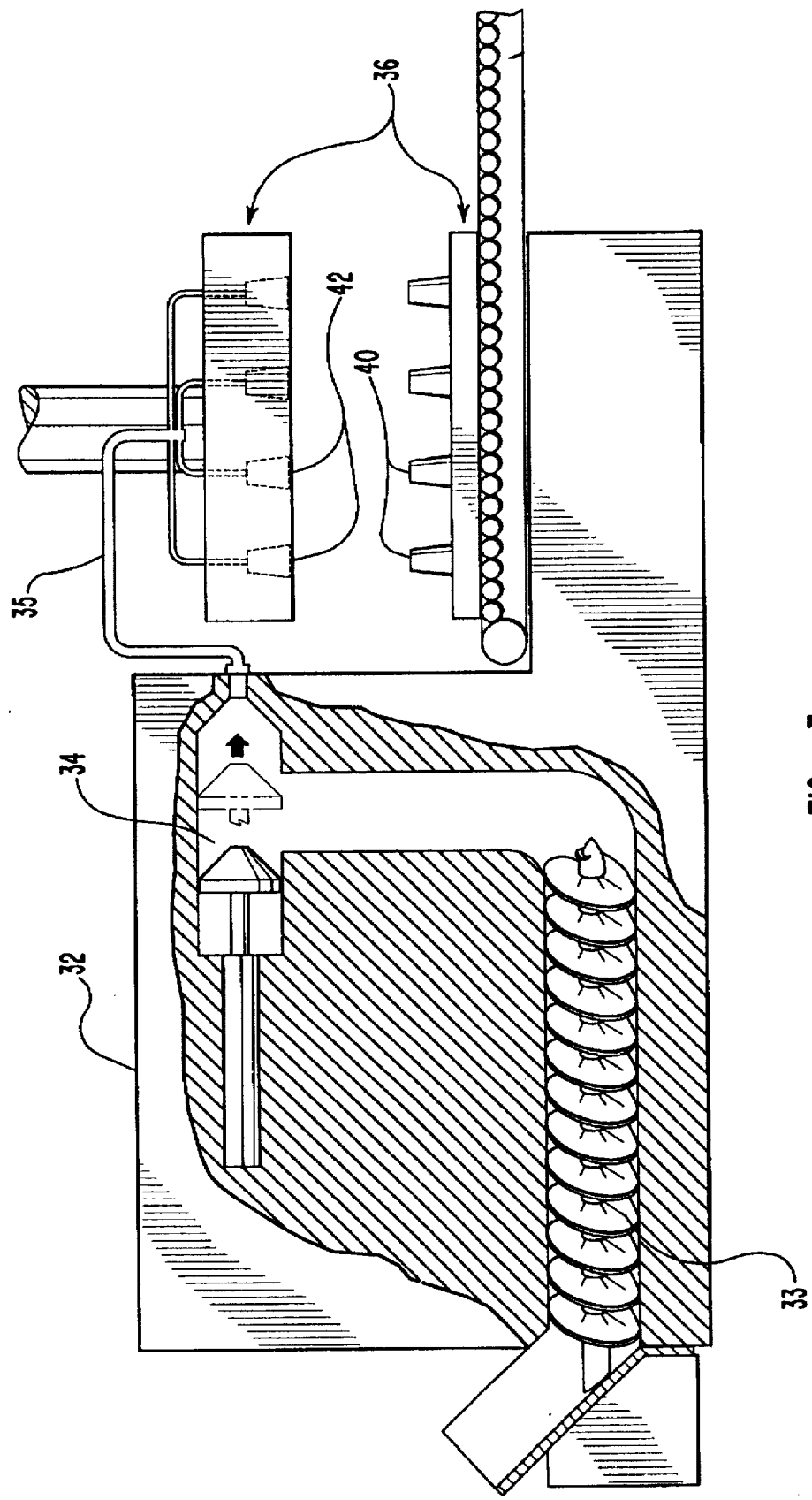
FIG. 3 is a cross sectional view of a transfer mold press with an attached die mold.

Once the hydraulically settable mixture is prepared, it must be positioned between the dies for subsequent formation of the desired containers or articles. As shown in FIG. 2, manufacturing line 31 transfers the mixture to a transfer molding press 32 for fashioning the mixture. In transfer molding press 32, as seen in FIG. 3, the mixture is fed by an auger 33 to a metering piston/cylinder 34. Metering piston 34 then strokes forward to dispense or inject enough material through feeding tubes 35 to fill a die mold 36. Die mold 36 comprises at least one male die 40 and at least one female die 42 which are partially mated as the mixture is dispensed between the dies. After the material is dispensed, female die 42 is "punched" the remaining distance to mute the dies and form the finished cup.

Under manufacturing conditions, it is envisioned that die mold 36 will be designed to form a plurality of containers or articles at a single pressing. For example, a thirty-six cup heated mold often referred to as a "hot runner" system may be incorporated. To further increase the speed of production, a plurality of molds can be used at a single station under a shuttle operation. By way of example and not limitation, once the containers are formed and the dies separated, the die on which the containers remain can be shuttled away from the press to allow another die set to enter the press, thereby initiating another cycle.

The amount of pressure applied to the hydraulically settable material during the auguring and injecting processes depends on several factors. High pressures can result in higher strength products. As pressure is applied to the mixture, particles within the mixture are pressed closer together, thereby making the water and other micro-rheology based lubricants within the mixture more effective in surrounding and lubricating the particles. As such, the mixture increases in flowability and workability. Accordingly, mixtures positioned under pressure require less water to obtain a desired workability and, as a result of less water, have increased form stability and subsequent strength.

Although high pressures are generally desirable, they also have a negative effect. To produce a lightweight or insulative container or article, low density aggregates (such as perlite or hollow glass spheres) are typically added to the mixture. As the pressure exerted by the auger extruder is increased, these aggregates are crushed, thereby increasing the density of the aggregate and the density of the resulting container. Crushing the aggregate also decreases the insulating effect of the aggregates since they no longer contain air pockets.

To optimize the pressures in light of these opposing factors, the pressure applied on the hydraulically settable mixture during auguring and injecting is in a range between about 20 psi to about 10,000 psi, with 50 psi to about 5,000 psi being preferred, and 75 psi and about 3,500 psi being most preferred.

Figure 4:
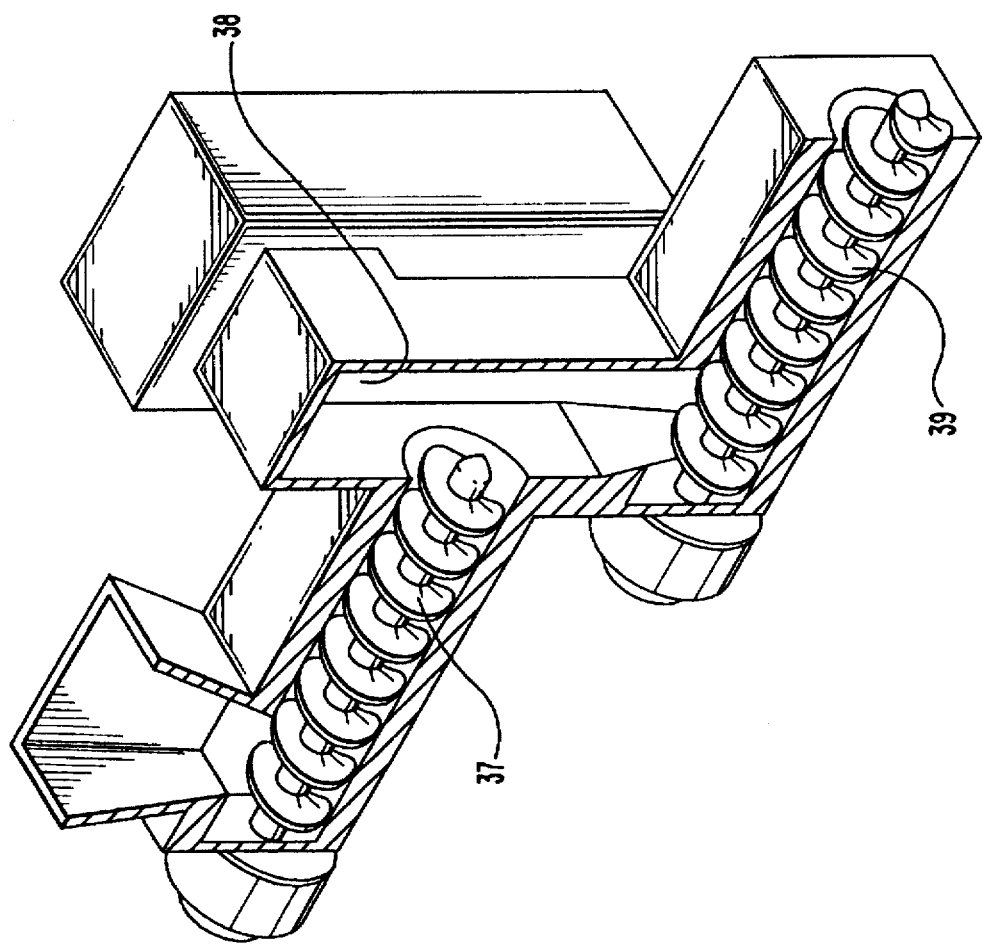
FIG. 4 is a cross sectional view of a double auger with vacuum chamber.

In one embodiment, a vacuum is applied to the mixture before it is injected between the dies. The vacuum removes air from the mixture which can form undesirable pockets or irregularities in the matrix of the container. In one embodiment shown in FIG. 4, the vacuum is applied by having a first auger 37 feed the mixture into a sealed vacuum chamber 38 wherein a vacuum is applied to the mixture to remove the unwanted air. The mixture is typically ground or cut up as it enters vacuum chamber 38 so as to maximize the surface area of the mixture and, thereby, maximize the amount of air withdrawn from the mixture. A second auger 39 then removes the mixture from vacuum chamber 38 for advancement to metering piston 34.

Alternatively, the unwanted air voids may by removed from the hydraulically settable mixture by a process known as "back venting" wherein during the auguring process, the excess air collects under pressure within the interior chamber of the auger and escapes then through the back of the auger screw while the mixture is compressed and moved forward by the auger screw.

At times, a uniform dispersion of small air voids in the mixture may be desirable; and, thus, removal of the air may not be necessary. Trapped air is an effective means of insulating. Accordingly, a container having trapped air pockets positioned within its walls can have a high K-factor. One method for forming and regulating the size, shape and concentration of air voids in a mixture is through the process of nucleation using blowing agents and adsorbing materials, as previously discussed.

Under alternative embodiments, the mixture can be fed to die mold 36 by equivalent means. By way of example and not by limitation, the mixture can be directly fed by conveyor 30 to metering piston 34. Alternatively, auger 33 can be used to directly feed the mixture to die mold 36 without the use of metering piston 34. Furthermore, apparatus such as a reciprocating screw machine having an auger that also functions as a piston can also be used. The above augers are known in the art and are available from Frecon Ceramics of Cincinnati, Ohio.

Figure 5:
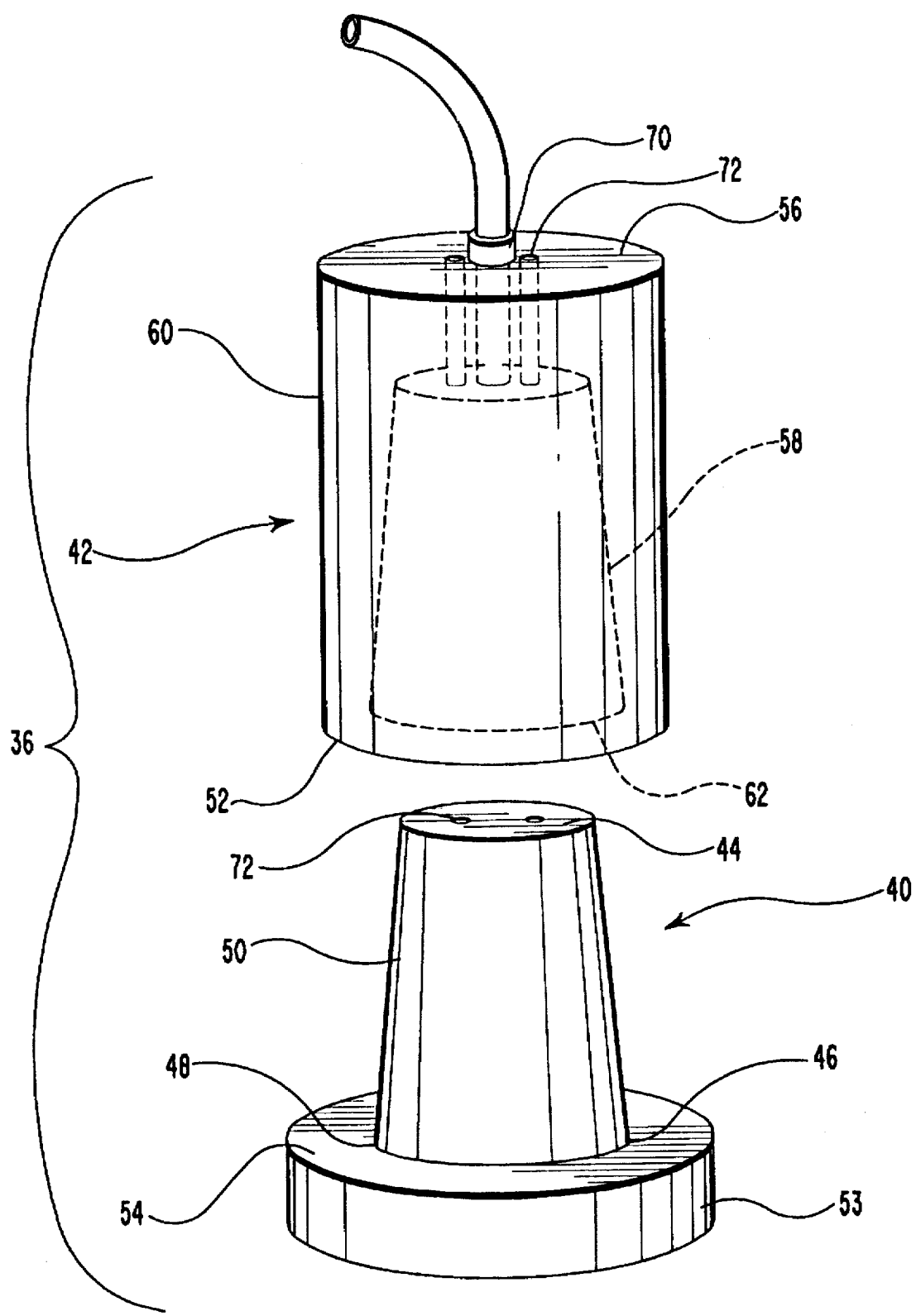
FIG. 5 is a schematic view of a male die and a female die.

As shown in FIG. 5, die mold 36 comprises a male die 40 having a desired shape and a female die 42 having a shape substantially complementary to that of male die 40. Accordingly, as the mixture is pressed between the dies, the mixture is formed into a container having the complementary shape of the dies.

Figure 6:
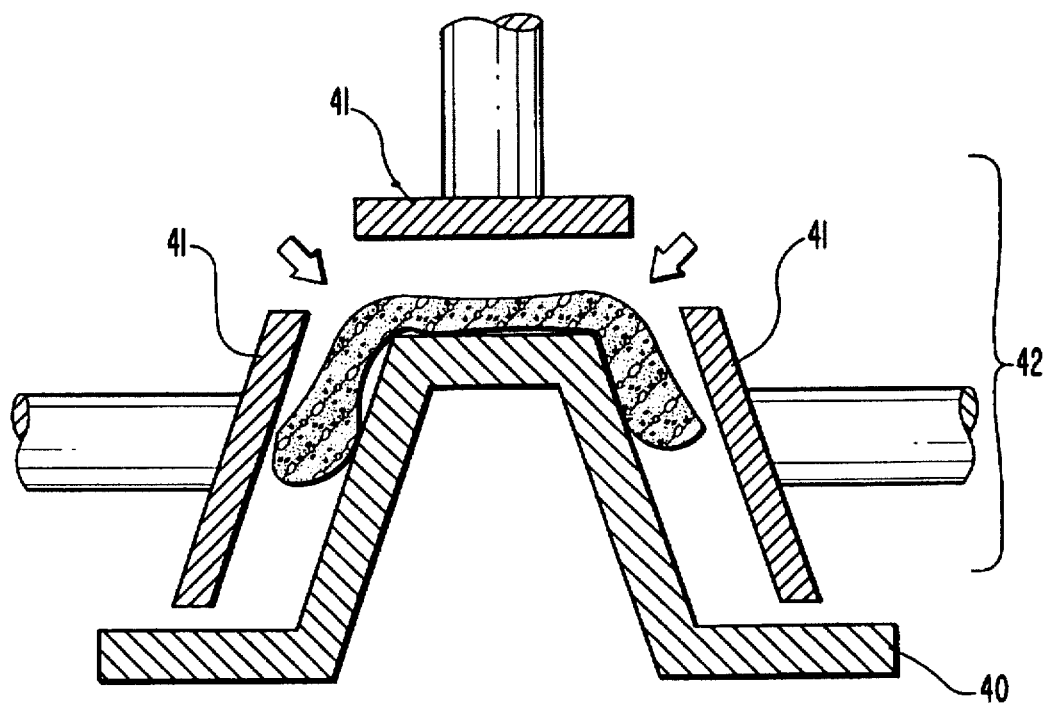
FIG. 6 is a cross sectional view of a split die.
Figure 7:
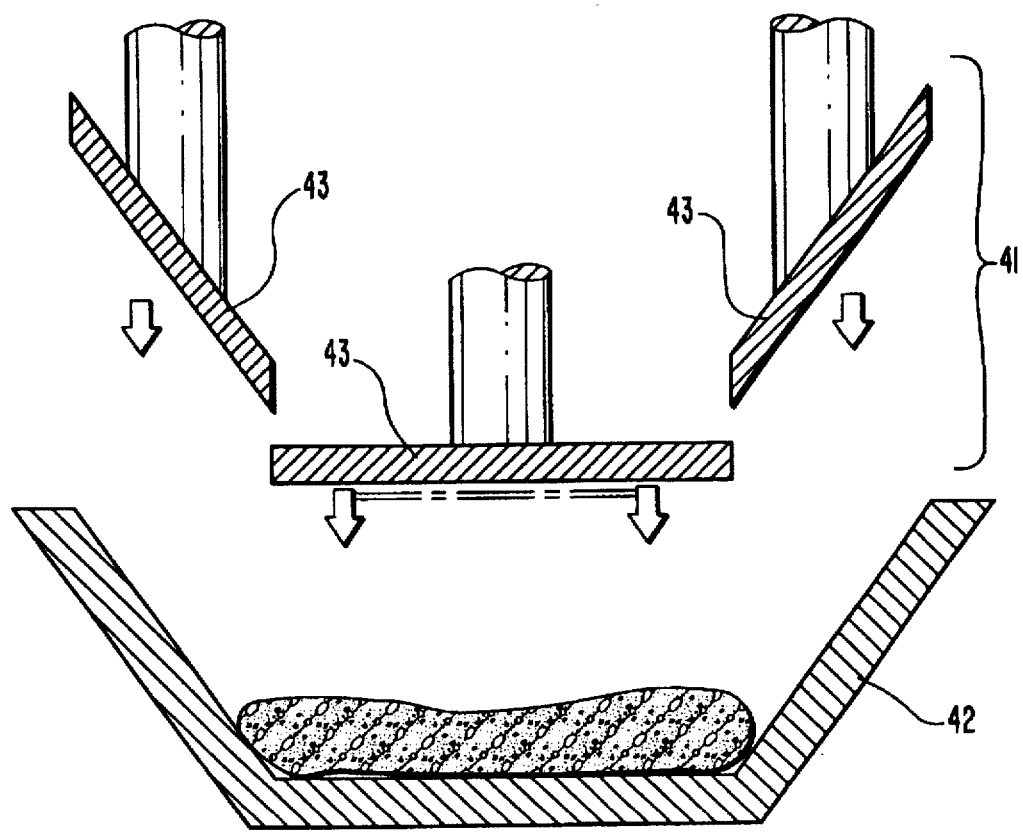
FIG. 7 is a cross sectional view of a progressive die.

Depending on the desired shape for the article, alternative types of dies may be used. A split die 41, as seen in FIG. 6, is a multi-component die whose components simultaneously press together at different angles to form complex shapes, especially those with negative angles, that can be easily separated from the die. In contrast, a progressive die 43, as seen in FIG. 7, is a multi-component die whose various components press together in a delayed sequential fashion, thereby forming the article in sections. The use of progressive die 43 helps eliminate air packets in articles with a deep draw or complex shape. Alternatively, a conventional collapsible die can also be used. The various dies can be used in combination to form a desired article.

The dies can be made of several different types of materials. Such materials, however, must be able to withstand the corrosive and abrasive effect of the mixture and be able to endure the pressures and temperatures of the manufacturing process as will later be discussed. By way of example and not by limitation, such materials may be ceramics, composites, plastics, and metals.

The preferred materials are metals (such as brass, steel, aluminum, and copper) due to their high durability and conductive properties. Metals which are most preferred are nickel and chrome which can be polished to a smooth surface which improves mold release. The dies can also be coated with any of a number of traditional nonstick coatings which would be useful in preventing adhesion of the mixture to the dies.

The dies shown in FIG. 5 have a frustoconic shape for manufacturing a container in the shape of a cup. However, as previously discussed, the dies can be in any one of a variety of shapes needed for manufacturing the desired container or article of manufacture. Male die 40 is depicted in FIG. 5 as having a top 44, a base 46 with a circumference 48, and a side surface 50 extending from top 44 to base 46. Attached to base 46 is a template 53 having a resting surface 54 on which female die 42 contacts when male die 40 and female die 42 are mated.

Female die 42 comprises a first end 52, a second end 56, an interior surface 58, an exterior surface 60, and a cavity 61 defined by interior surface 58. First end 52 defines a mouth 62 leading to cavity 61. Cavity 61 has a substantially complimentary configuration of male die 40. However, cavity 61 is slightly larger than male die 40. Hence, as shown in FIG. 8, when male die 40 is inserted into cavity 61 so that resting surface 54 of template 53 contacts first end 52 of female die 42, there is a molding area 66 in which the mixture is pressed into the desired shape for the article or container.

The present invention envisions two general methods for positioning the mixture between male die 40 and female die 42. In the preferred embodiment, as shown in FIG. 9, male die 40 is partially inserted into female die 42 such that a gap distance 67 is created between the dies. Gap distance 67 is defined as the distance one die must travel with respect to the other die for mating of the dies. The dies are "mated" when they are inserted into one another so as to form molding area 66 between the dies.

When the dies are positioned so as to have gap distance 67, a gap area 68 remains between the dies. This gap area 68 comprises mold area 66 between the dies and a second area also between the dies which corresponds to gap distance 67. Once gap area 68 is formed, the mixture can be positioned into gap area 68, and thus between the dies, by being injected through a hole positioned in either of the dies or through gap distance 67. In the preferred embodiment, female die 42 is positioned vertically above male die 40. The mixture is then injected between the dies through an injection port 70 extending through female die 42. The arrangement of having female die 42 above male die 40 is preferred since once the container is formed and the dies are separated, the force of gravity assists in insuring the container remains on the male die 40. This is beneficial as it is easier to subsequently remove the container from male die 40 without deforming the container. Of course, in an alternative embodiment male die 40 could be positioned vertically above the female die 42.

Male die 40 and female die 42 can then be pressed together such that first end 54 and template 52 are in contact, as previously shown in FIG. 8, thereby completely filling molding area 66 with the mixture. As a result of the pressing process, molding area 66 is completely filled with the mixture, thereby forming the container having a lip 78 contacting template 53 on resting surface 54.

Before positioning the mixture, it is preferable to minimize gap distance 67 between the dies so as to limit the movement of the mixture during the final pressing or mating of the dies. Minimizing the movement of the mixture decreases the chance of irregularities in the final container as a result of differential flow in the mixture. This concept of differential flow will be discussed later with regard to the step of imparting form stability to the container.

Gap distance 67 between male die 40 and the female die 42 is typically in a range of about 2 mm to about 5 cm, with 2 mm to about 3 cm being preferred and 2 mm to about 1 cm being most preferred. It should be noted, however, that for large objects, gap distance 67 may be much larger to facilitate positioning of the mixture. The hardened articles of the present invention will typically have a thickness in a range between about 0.05 mm to about 1 cm, with about 0.25 mm to about 2 mm being preferred and about 0.5 mm to about 2 mm being most preferred.

As the dies are pressed together, air between the dies typically escapes through gap distance 67. Failure to fully remove the air from between the dies can result in air pockets or deformities in the structural matrix of the container. In an alternative embodiment, the dies also comprise a plurality of vent holes 72 extending through the dies so as to make the dies permeable. As the dies are pressed together, the air between the dies is expelled through the vent holes, thereby preventing the formation of air pockets. The vent holes also prevent the creation of a vacuum within the molding area by allowing air to return into the molding area as the dies are separated. Such a vacuum could exert an undue force on the newly formed container, thereby disrupting its structural integrity.

Furthermore, vent holes also permit the escape of excess steam created during the heating process which will be discussed later. The vent holes can exist in either or both of the dies. The number of vent holes varies depending on speed of the dies and the amount of air that needs to escape. The diameter of the vent holes also varies. For relatively dry mixtures, the vent holes typically range from about 0.05 mm to about 5 mm, with 0.1 mm to about 2 mm being preferred, and 0.2 mm to about 0.5 mm being most preferred. It is also preferred that the vent holes be located at positions on the dies corresponding to unobtrusive locations on the containers, for example, the base of the container. For relatively wet and plastic mixtures, vent holes cannot be used as they will get plugged by the mixture.

A cutoff valve 71 can be attached at injection port 70. After the mixture is positioned between the dies, cutoff valve 71 can be closed so as to prevent the mixtures from being pushed back into feeding tube 35. Furthermore, in the embodiment where the dies are heated, as will be discussed later, closing cutoff valve 71 separates the mixture in feeding tube 35 from the heated dies, thereby helping to prevent the mixture in feeding tube 35 from setting and plugging tube 35 during the time required to press the mixture into the desired shape.

A second method for positioning the mixture between the dies is performed while the dies are still fully separated. The method simply comprises placing a portion of the mixture, sufficient to create the container, between the dies. Typically, by resting the mixture on the top of male die 40. Subsequently, as the dies are mated, the mixture is pressed between the dies.

Figure 10A:
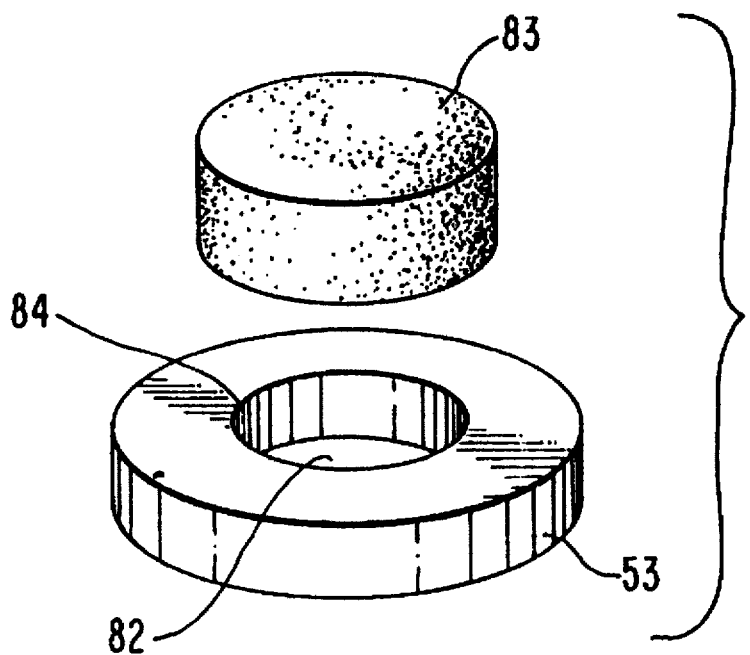
FIG. 10a is a schematic view of a template used for positioning the hydraulically settable material.
Figure 10B:
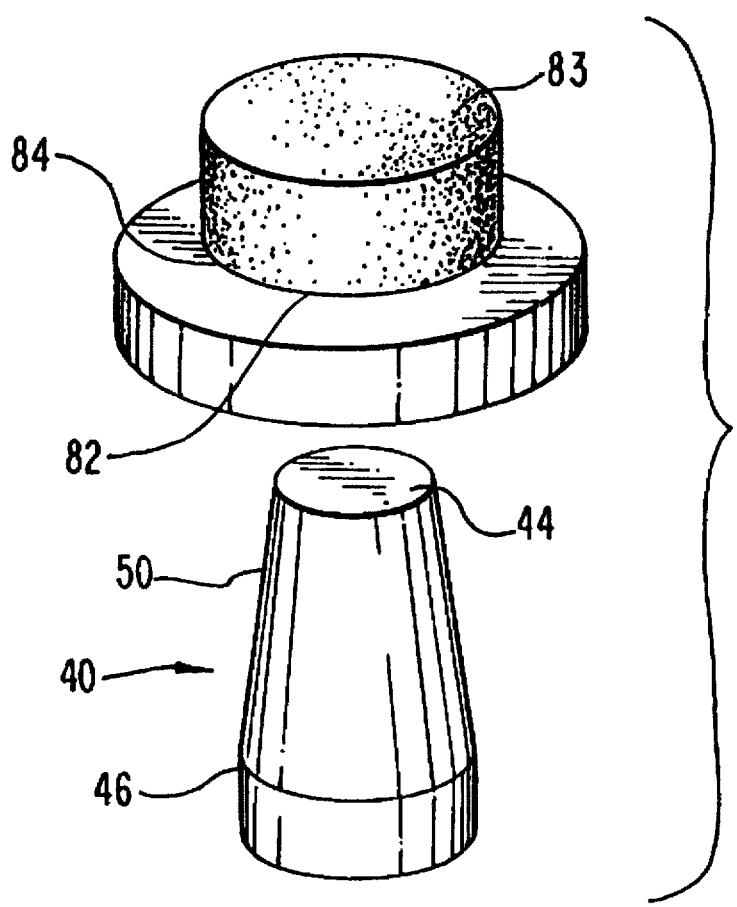
FIG. 10b is a schematic view of positioning the template between the male die and female die.

In an alternative embodiment, template 53 is used to position the mixture between the dies. As shown in FIG. 10a template 53 is shown having a passage 82 with a perimeter 84 which is substantially similar to circumference 48 of base 46 of male die 40. In this embodiment, the mixture is formed into a mass 83 having a diameter sufficient to span passage 82 of template 53. Mass 83, as shown in FIG. 10b, is then placed on template 53 so as to span the passage 82. Finally, template 53 is placed between male die 40 and female die 42 such that passage 82 is complementarily aligned with the dies. Thereby, as the dies are pressed together, male die 40 travels through the passage of the template in order to press the mixture between the dies.

The above method can further include the step of depositing template 53 onto male die 40 such that template 53 becomes positioned about base 46 of male die 40 while mass 83 independently rests on top 44 of male die 40 (See FIG. 10c). Subsequently, as the dies are pressed together, mass 83 is again pressed between the dies. Additional benefits relating to the use of template 53 will be discussed hereinafter with respect to the step relating to removing the container from the dies.

Step Three: Forming the container

The third step in the manufacturing process is pressing the mixture between the male die and the female die in order to mold or form the mixture into the desired shape of the container.

The amount of pressure exerted by the dies onto the mixture serves several functions which must be considered when determining how much pressure to apply. At a minimum, the pressure must be sufficient to actually mold the mixture between the dies so as to obtain the desired shape. It is preferable that this pressure be sufficient to produce a container with a uniform and smooth finished surface.

The amount of pressure applied to the hydraulically settable mixture also affects the strength of the resulting container. As previously discussed, the strength of the resultant product is increased for mixtures where the hydraulically settable particles are close together. The greater the pressure used to press the mixture between the dies, the closer the particles are pushed together, thereby increasing the strength of the resulting container.

Furthermore, the more pressure applied by the dies on the mixture, the more plastic or workable the mixture becomes. Accordingly, as the mixture is pressed between the dies, the hydraulically settable mixture flows into the desired shape of the article. The ability to flow is especially important in the production of complex shaped articles where the mixture must flow to obtain the desired shape. The process of flowing has the added benefit of limiting stresses on the structure of the article and providing an article with a more uniform thickness. In addition, the more pressure applied to the mixture, the less water that needs to be added to make the mixture flowable, thus, the stronger the resulting container.

One detriment of using high pressures on the mixture is that the light weight aggregates in the mixture can be crushed, inhibiting the production of light weight containers and minimizing their insulating capabilities. Accordingly, the pressure applied by the dies should be optimized so as to maximize the strength, structural integrity, and low density of the container.

Under the present invention, the pressure exerted by the male die and the female die on the hydraulically settable mixture is in the range from about 25 psi to about 10,000 psi, with 100 psi to about 5,000 psi being preferred, and 150 psi to about 1000 psi being most preferred. However, as discussed in the next step, the amount of pressure will vary depending upon the temperature and time of the molding process.

Step Four: Imparting Form Stability to the Container

One of the novel features of the present invention is the ability to create containers or articles that are form stable almost immediately upon formation. Form stable containers are capable of being removed from their molds and being free standing during curing without deformation. As such, the containers can be mass produced since the dies or molds can continue to produce the containers without the traditional delay of waiting for the mixture to cure before being removed from the molds. The preferred method for imparting form stability is to heat the mixture during formation of the article. In one embodiment, this is accomplished by heating the male die and the female die each to a respective temperature before pressing the hydraulically settable mixture.

Increasing the temperature of the dies prior to the pressing step serves several functions. An excess of water is usually added to light-weight mixtures for ease in molding the mixtures into the desired shape without crushing the aggregate. By applying heated dies to the mixture, a portion of the water on the surface of the container is evaporated in the form of steam, thereby decreasing percent volume of water and, thus, increasing the form stability and ultimate strength of the container.

As this water on the surface of the container evaporates, that portion of the mixture rapidly becomes dry. The compressed dry particles on the surface of the mixture form a strong thin shell on the surface of the container which provides the container with a majority of its form stability.

In mixtures where Tylose® or other rheology-modifying agents are used, evaporation of the water containing Tylose® results in a film of dry Tylose® bonding the cement and aggregate particles together. In turn, this bonding force increases the form stability of the containers.

The application of heat to the mixture also increases the rate of hydration and curing of the cement. As is discussed below, however, the dies remain pressed on the mixture for such a short period of time that only a portion of the mixture reacts to become cured. The majority of strength required for form stability is a result of the friction forces of the particles and the binding strength of the dried rheology-modifying agent. As a result, the container is still considered as being in the green state even after achieving form stability.

Another benefit of increasing the temperature of the dies is to minimize adherence of the mixture to the dies. As the steam is emitted from the mixture, it creates a boundary layer between the dies and the mixture. This boundary layer provides a substantially uniform force that pushes the mixture away from the die and, thus, prevents the mixture from sticking to the dies.

Furthermore, experiments have determined that if the male die and female die have a variance in temperature, the material will have a tendency to remain on the die with the lower temperature when the dies are separated. Accordingly, one can select the die on which the container is to remain on as the dies are separated, by having the desired die have a lower temperature.

The thickness of the desired container must also be taken into consideration in determining the temperature of the dies and their duration of pressing. The thinner the container, the faster the mixture dries and becomes hard. Accordingly, time and temperature for pressing is minimized as the container becomes thinner.

The respective temperatures of the dies is important to maximizing the speed of the manufacturing process and is dependent, in part, upon the duration that the dies are in contact with material. In general, it is desirable that the temperature be as high as possible—the higher the temperature, the faster the drying on the surface of the containers, the quicker the containers can be removed, and the more containers that can be made per unit time.

The problem with high temperatures, however, is that if the mixture becomes too hot, the water throughout the mixture, as opposed to just on the surface of the container, turns to steam. Once the dies are separated, relieving pressure on the container, the steam expands, thereby causing the container to crack or even explode.

Furthermore, the faster the material cures, the greater the likelihood of a deformity in the container as a result of differential flow. That is, as the dies are pressed together, the material flows and stretches into the desired shape. However, once the mixture on the surface of a container starts to dry, the dried cement has different flow properties than the remaining wet mixture. This differential in flow properties can result in deformities such as conglomerates, voids, cracks and other irregularities in the structural matrix of the container.

Studies have also found that excessively high temperatures can damage some of the admixtures. For example, although cellulose fibers are initially protected by steam from the evaporating water, once typically about 20% of the water of the mixture is removed, subjecting the fibers to temperatures over about 250° C. results in degradation of the cellulose fibers. If subjected to these conditions, the cellulose fibers are unable to impart the desired flexural and tensile strength to the container.

Finally, the temperature and speed of the dies are also affected by the draw of the article being formed. An article, such as a cup, which has deep draw requires the hydraulically settable mixture to flow over a greater distance than an article with a small draw, such as a plate. For deep draw articles, it is preferred that the dies press together under an increased velocity. By increasing the velocity of the dies, a relatively high pressure can be instantaneously applied to the hydraulically settable mixture. This pressure increases the flowability of the mixture, thereby allowing the mixture to more quickly and easily flow into the desired shape. Thereby, by applying an instantaneous pressure, the duration of time that the dies are in contact with the mixture is minimized, thereby avoiding the risk of overdrying the container while increasing production speed. At times, it may be desirable to repeatably impact the mixture between the dies having a velocity, thereby minimizing the time period that the heated dies are actually in contact with the material.

Accordingly, the interrelationship between time and temperature is as follows: the temperature of the dies can be increased as the time that the dies are in contact with the mixture is decreased. Furthermore, the temperature can be increased as the gap distance between the dies is decreased. However, there are limits to how high the temperature can go before the admixtures become damaged.

To achieve the above-desired objectives, it has been found that the temperature of the male die and the female die should be in a range from about 50° C. to about 300° C., with 75° C. to about 200° C. being preferred, and 120° C. to about 140° C. being most preferred. In an embodiment where it is preferred to have the container remain on one die after the dies are separated, the current invention envisions a temperature variance between the male die and the female die preferably in a range between about 10° C. to about 30° C.

The process of heating the die can be achieved through a variety of methods known in the art. In the preferred embodiment, heated oil is pumped through the body of the press which in turn transfers the heat to the dies. Oil is used as it provides a uniform heat that can be easily regulated. Other fluids, such as water, can also be used. Furthermore, the dies can be heated through the use of electrical heating filaments attached to the dies or press.

The duration of time in which the heated male die and the heated female die, either in conjunction or independently, are in contact with the mixture so as to impart form stability to the container, is preferably in a range from about 0.1 seconds to about 30.0 seconds, with about 0.1 seconds to about 10.0 seconds being preferred and 0.1 seconds to about 2.0 seconds being most preferred. By lowering the temperature of the dies, however, the process of imparting form stability to the containers can be slowed to minutes, hours, or even days.

In an alternative embodiment, form stability can be obtained and adhesion between the hydraulically settable mixture and dies reduced by cooling the dies to or below room temperature. By lowering the temperature of the dies below room temperature, the water on the surface of the formed containers thickens and becomes stiff, thereby imparting form stability to the container. Overcooling the material, however, can greatly retard the hydration reaction, although this may be desirable in some cases. Accordingly, it is preferable to cool the dies to a temperature within the range from between about −20° C. to about 40° C., more preferably to between about 0° C. to about 35° C., and most preferably to between about 5° C. to about 30° C.

To prevent the adhesion of the mixture to the dies, it may be necessary to first heat the mixture, such as in the auguring process, so that as the heated mixture comes in contact with the cooled dies, water condenses on the surface of the dies forming a boundary layer between the dies and the container. Accordingly, it will generally be preferable to heat the mixture to a temperature within the range from between about 20° C. to about 80° C. before pressing the mixture. The temperature of the mixture will correlate with the temperature of the dies.

In yet another embodiment, form stability can be established through rapid evaporation. By mixing the hydraulically settable material and other desired additives with the minimal amount of water needed for hydration and then adding a non-hydrating liquid having a low vapor point to the mixture, one is able to obtain a mixture that is easily moldable and that results in a high-strength article. Once the mixture has been positioned into the desired shape, the non-hydrating liquid can be allowed to quickly evaporate, thereby producing a form stable container that can be removed from the mold for subsequent curing. The non-hydrating liquids must be highly soluble in water and uniformly dispersed in the mixture. By way of example and not by limitation, the non-hydrating liquids include alcohols e.g. methanol, ethanol, n-propanol, n-butanol, and n-pentanol. Such non-hydrating liquids are typically added in a range between about 2% and about 50% by percent volume of water.

Other additives which assist in rapidly producing a form stable container include various carbon sources and accelerators. As previously incorporated by reference, the patent application "Process for Producing Improved Building Material And Product Thereof" discloses the addition of various sources of carbon, such as $CO_2$ and CO, to a hydraulically settable mixture. The result of the addition of carbon is, in part, a mixture that obtains early strength or form stability. Sodium carbonate and potassium carbonate can also be added to the mixture so as to obtain early form stability of the desired container. Typically, the carbonates are added to the mixture in a range between about 0.002% by molarity of the water to about 0.5%, with 0.01% to about 0.15% being preferred, and 0.1% to about 0.15% being most preferred. Similarly, citric acid can also be incorporated into the mixture for obtaining early form stability. The citric acid is typically added by weight of cement in a range between about 0.01% to about 5%, with 0.05% to about 1% being preferred, and 0.1% to about 0.2% being most preferred.

Various cellulose admixtures and starch also function to increase form stability of the container. Cellulose admixtures such as methylethylcellulose, methylcellulose, and ethylcellulose form a stiff gel upon being heated to temperatures above about 60° C. Accordingly, by combining cellulose with the hydraulic mixture and then heating the mixture, the resulting gel can assist in imparting form stability to the container. To be effective in creating form stability, the methyl cellulose should be combined to the mixture in a range between about 0.1% by weight of the wet mixture to about 10%.

Starch can also be combined with the cellulose admixture or can be combined separately with the mixture to impart form stability to the container. Heating a mixture containing starch to a temperature above 100° C. melts or dissolves the starch. Allowing the mixture to then cool, permits the starch to solidify which binds the cement particles and aggregate into an increased form stable condition. To be effective as a binding agent, the starch should be combined with the mixture in a range between about 0.1% by weight of the wet mixture to about 10%. The combination of starch and methyl cellulose thus increases form stability during heating and cooling of the mixture.

As previously discussed in the application, there are also a number of well-known accelerators used in the art of concrete that can be added to hydraulically settable mixtures to limit the time necessary for a formed article to obtain form stability. Such accelerators are typically added to the mixture in a range between about 0.05% to about 1% by weight of the cement.

Finally, it should be noted that under conditions where only a minimal amount of water is added to a mixture or a water deficiency exists, it is possible to obtain a container that is form stable using dies having an ambient temperature. On the other hand, mixtures having high water concentration may require the container to remain momentarily supported on one die after the dies are separated before form stability is reached. To assist such containers in reaching form stability, various forms of heat transfer such as blowing heated air or applying microwaves can be used to dry the exposed surface of the container. When applying heated air, the temperature of the air should be in a range from about 50° C. to about 400° C., with 100° C. to about 350° C. being preferred and 150° C. to about 250° C. being most preferred.

Step Five: Removing the Shaped Container From the Dies

The fifth step in the manufacturing process is removing the newly formed container from the dies. Once the dies are separated, heated air can be blown over the container or article for a few seconds (as previously discussed) to further increase form stability. The container can then be removed from the male die without deformation. In the preferred embodiment, as shown in FIG. 2, an airvey flip transfer 84 can be used to remove the container from the male die. Airveying is a process in which a vacuum is applied to the container for sucking the container from off the die. The container then travels through a "U" shaped tube that deposits the container right side up.

The airveying process is preferable due to its gentle handling of the form stable containers and its low operating and capital costs. Heating air which is present to dry containers may be used to provide the bulk air transport carrying the containers through the length of the tubes. To assist in the airveying process, air can be injected through vent holes 72, previously discussed, to provide a uniform force to push the container off the die.

In an alternative embodiment, the container can be mechanically removed from the male die by simply picking up the container. Such a process, however, requires exceptional care so as not to deform the container. The preferred method for mechanically removing the container incorporates using template 53 as previously discussed in the positioning step.

As shown in FIG. 11, template 53 is circumferentially located at base 46 of male die 40 and is removable therefrom. The container is loaded onto template 53 via lip 78 of the container by either lifting template 53 or lowering the male die 40. Although the container will be form stable when removed from the dies, it will not yet be cured and thus not have obtained its optimal strength. Since the container is strongest in compression along its vertical axis, the benefit of using the template is that the force applied for removing the container is applied along the strongest axis of the container, thereby minimizing possible deformation to the container.

Through use of the template, it is possible that both the male die and the female die can simultaneously be separated from the container, thereby leaving the container resting on the template. In another embodiment, the container is first left on the male die and then subsequently removed by the template. Accordingly, with regard to the specification and claim language, the term "support structure" is intended to include both the template and the male die.

Step Six: Drying the Container

The sixth step in the manufacturing process is allowing the hydraulically settable mixture to harden in the desired shape of the container or article. To economically produce the inventive container, the container must be rapidly dried to a point where it has sufficient strength to proceed through the remaining manufacturing processes, i.e., printing, coating, and packaging, without deformation. Furthermore, the container must gain sufficient strength for its intended use. Of course, the required strength will vary depending on the type of article manufactured.

In the preferred embodiment, drying the container is accomplished by exposing the container to heated air, such as in a conventional tunnel oven 86 shown in FIG. 2. The oven can be configured either for batch mode drying or for a continuous conveyor process. The application of the heated air drives off a portion of the water in the hydraulically settable mixture, thereby increasing the friction forces between the particles and creating a bonding film of Tylose®, thereby, increasing the strength of the resulting container.

Furthermore, the application of heated air to the containers increases the hydraulic reaction rate of the hydraulically settable material which, in turn, provides early strength to the container. Accordingly, as the container is dried, the container obtains its strength from friction forces between the particles, Tylose® bonding, and curing of the hydraulically settable mixture.

To increase the rate at which water is removed from the hydraulically settable mixture, the heated air is blown over the container. Studies have found that the higher the air speed, the shorter the drying time. The air speed, however, must not be so great as to disrupt the production process.

Ideally, the container is dried only to the extent that it has sufficient strength for production and transport without deformation. By permitting the container to retain a small amount of unreacted water, the container continues to cure, and, thus, increase in strength, during the time period it is transported and stored prior to use.

It is the ability to rapidly harden the containers that makes it possible to economically complete their mass production. Drying of the containers is influenced by five different parameters: time, temperature, air speed, surface area, and thickness of the material. Empirical studies have made the following conclusions with regard to these parameters:

1) The higher the temperature, the shorter the drying time.

2) The higher the air speed, the shorter the drying time.

3) Once a majority of the water is removed from a container, exposing the container to temperatures above 250° C. will burn the fibers in the mixture, thereby decreasing tensile strength of the fibers and containers.

4) The thinner the material wall of the container, the shorter the drying time.

5) The higher the temperature, the lower the tensile strength of the container.

6) Air speed and total time in the oven have no effect on the tensile strength of the container.

Based on the above observations, the recommended drying conditions for a conventional cup having a thickness in a range from about 1 mm to about 2 mm includes the air in the oven having a temperature in a range of about 100° C. to about 300° C., with about 140° C. to about 250° C. being preferred, and from about 150° C. to about 200° C. being most preferred. The time period during which the container is exposed to the heated air can range up to about 1 hour, with less than 15 minutes being preferred, and less than 1 minute being most preferred. The above values, however, change depending on the size, shape, and thickness of the article and the water content of the mixture.

In an alternative embodiment, since the fibers do not burn in the mixture at temperatures above 250° C. until a majority of the water is removed, the drying process can also be accomplished in two stages. First the containers can be exposed to temperatures above 250° C., typically in the range between about 250° C. and about 500° C., so as to rapidly remove a portion of the water. Once between about 60% to about 80% of the water is removed, the temperature is decreased to below 250° C. for removal of the remainder of the water. This process increases the rate at which the containers are dried but must be regulated with greater care so as not to burn the fibers. Conventional tunnel ovens as used in the present invention can be purchased from OAL & Associates of Rancho Bernardo, Calif.

Step Seven: Coating

If necessary, the seventh step in the manufacturing process is applying a coating to the container by a coating machine 88. It is envisioned that some articles or containers, especially those used for dispensing beverages, may require the application of a coating. Coatings are desirable in providing a surface that is aesthetically pleasing to the consumer and inhibits liquids from absorbing into the dried hydraulically settable container.

The preferred method for the application of the coating comprises spraying the coating on to the surface. Both the inside and outside surfaces of the container can receive the coating. Alternative methods for application of the coating include dipping or painting the coating on the surface. The step of applying the coating may further include running the containers through a container curing oven 90 so as to apply heated air, as previously discussed in the drying step, to dry the coating.

There are numerous types of coatings that can be applied. In one embodiment, the containers are coated and sealed with a layer of calcium carbonate to ensure that they are impermeable to liquids. Besides calcium carbonate, any FDA approved coating material would work depending on the application involved. Other coatings include clay and mica, which have good printing capability.

For example, a coating comprised of sodium silicate, which is acid resistant, is a particularly useful coating where the container is exposed to goods having a high acid content.

Where it is desirable to protect the container from basic substances, the containers can be coated with an appropriate polymer or wax, such as bee's wax, mineral wax, or starches, which have been used to coat paper containers.

In some applications, such as in the products which tend to emit water vapor, it is important that the coating allow the container to "breathe," or be permeable to water molecules, while still maintaining its ability to be waterproof. In other words, in a "breathable" container, water cannot pass through the wall of the container, but water vapor can. This can be an important quality of a "clam shell" used by the fast food industry to dispense hamburgers and sandwiches.

Another type of coating that may be placed on the surface of the cementitious containers of the present invention is a reflective coating for reflecting heat into or out of the container. Such reflective coatings are known in the art, although their applicability to containers is novel.

While the specific coating which may be used will depend upon the desired features for the final products, most coatings will be applied in a solvent. Upon evaporation of the solvent, the coating remains on the surface of the article of manufacture. Examples of suitable coatings include melamine, polyvinyl chloride, polyvinyl alcohol, polyvinyl acetate, sodium silicates, calcium carbonates, polyacrylates, acrylic acrylate, polyurethanes, polylatic acid, biopolylatic acid, other biodegradable polymers, and Opadry Type F® which contains hydroxypropyle methylcellulose and polyethylene glycol and is manufactured by Colorcon of West Point, Pa.

Step Eight: Stacker/Accumulator

A custom automatic stacker 92 can be installed at the end of manufacturing line 30 to create sets of stacks. The stacks are loaded onto a rotary table 94 which allows a manual removal of the stack cups and placement into the downstream printing step.

Step Nine: Printing

Another optional step in the manufacturing process is applying print or designs to the container through the use of a conventional printer 96 such as a Van Dam printer. It is envisioned that a conventional transfer printer will be used to apply ink or other printing indicia in the desired design. However, any hand or mechanical means can be used. Transfer printers can be obtained from Hiedelberg West of Domingas Hills, Calif. Of course, hydraulically settable products such as those disclosed herein are particularly well suited for such a use. Furthermore, as mentioned above, it is within the scope of the present invention to coat the containers with a government approved coating, most of which are currently used and well adapted for placing indicia thereon.

Step Ten: Bagging/Cartonizing/Pelletizing

Prior to shipping the containers they must be properly packaged. Accordingly, the finished stacks of cups are taken off the printer and manually loaded into poly bags and then loaded into cartons. This last manual step provides a QC check on the cups. The finished cartons are then collected, sealed, marked, stacked and wrapped in standard carton handling/pelletizing equipment for subsequent shipment.

V. SUMMARY

From the foregoing, it will be appreciated that the present invention provides novel methods and systems for manufacturing articles, and containers that have properties similar to articles presently made from paper, plastic, metal, and glass.

The present invention also provides novel methods and systems for manufacturing containers and articles which are more environmentally neutral than presently made containers. Specifically, the present invention does not require the use of, or emit, chemicals which have been implicated as causing depletion of the ozone layer, nor does it create unsightly garbage which does not degrade, or which only very slowly degrades over time in landfills.

In addition, the present invention also provides novel methods and systems for manufacturing containers and articles which can be produced at a cost that is comparable to and even less expensive than existing articles.

Further, the present invention provides novel methods and systems for manufacturing containers and articles which are flexible and disposable, but which are much more environmentally sound in their disposal than other disposable containers, such as paper, plastic and styrofoam.

The present invention also provides novel methods and systems for manufacturing containers and articles which are essentially comprised of the same compounds as the earth, and are similar to dirt and rock, and therefore pose little or no risk to the environment when discarded.

The present invention further provides novel methods and systems for achieving lightweight containers which still give sufficient structural support for the food or packaging products.

The present invention further provides novel articles and containers which will maintain their shape without external support during the green state and rapidly achieve sufficient strength so that the molded containers can be handled without deformation using ordinary manufacturing methods.

The present invention may be embodied in other specific forms without departing from its spirit or essential characteristics. The described embodiments are to be considered in all respects as illustrative only and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A method for manufacturing an article having a hydraulically settable matrix, the method comprising the steps of:

(a) mixing together a hydraulically settable binder, a nonfibrous inorganic aggregate filler, a rheology-modifying agent, water, and optionally fibers to form a hydraulically settable mixture, the optional fibers being included in an amount less than about 50% by volume of the hydraulically settable mixture;

(b) molding the hydraulically settable mixture into a desired shape of the article, the article being form stable in less than about 10 seconds after the hydraulically settable mixture is first molded into the desired shape, wherein water removed from the hydraulically settable mixture is in a vapor state; and (c) allowing the molded hydraulically settable mixture to harden in the desired shape of the article, the hydraulically settable matrix of the hardened article including greater than about 50% by volume of combined amounts of at least partially hydrated hydraulically settable binder and the nonfibrous inorganic aggregate filler.

2. A method for manufacturing an article as defined in claim 1, wherein the hydraulically settable mixture has a yield stress in a range from about 5 kPa to about 5,000 kPa.

3. A method for manufacturing an article as defined in claim 1, wherein the hydraulically settable mixture has a yield stress in a range from about 100 kPa to about 1,000 kPa.

4. A method for manufacturing an article as defined in claim 1, wherein the hydraulically settable mixture has a yield stress in a range from about 200 kPa to about 700 kPa.

5. A method for manufacturing an article as defined in claim 1, wherein step (a) is carried out using a high shear mixer.

6. A method for manufacturing an article as defined in claim 1, wherein step (a) is carried out using a pug mill.

7. A method for manufacturing an article as defined in claim 1, wherein step (a) is carried out using a twin auger extruder.

8. A method of manufacturing an article as defined in claim 1, wherein the hydraulically settable binder comprises hydraulic cement.

9. A method of manufacturing an article as defined in claim 8, wherein the hydraulic cement comprises portland cement.

10. A method of manufacturing an article as defined in claim 9, wherein the portland cement comprises portland grey cement.

11. A method for manufacturing an article as defined in claim 1, wherein the article has a thermal conductivity and wherein the inorganic aggregate filler decreases the thermal conductivity of the article.

12. A method for manufacturing an article as defined in claim 1, wherein the inorganic aggregate filler is combined in an amount up to about 80% by weight of the hydraulically settable mixture.

13. A method for manufacturing an article as defined in claim 1, wherein the inorganic aggregate filler is combined in an amount in a range from about 3% to about 50% by weight of the hydraulically settable mixture.

14. A method for manufacturing an article as defined in claim 1, wherein the inorganic aggregate filler is combined in an amount in a range from about 20% to about 30% by weight of the hydraulically settable mixture.

15. A method for manufacturing an article as defined in claim 1, wherein step (a) includes blending fibers into the hydraulically settable mixture.

16. A method for manufacturing an article as defined in claim 15, wherein the fibers are selected from the group consisting of glass fibers, abaca, bagasse, wood fibers, ceramic fibers, and cotton.

17. A method of manufacturing an article as defined in claim 15, wherein the fibers are blended in an amount in a range from about 0.2% to about 50% by volume of the hydraulically settable mixture.

18. A method of manufacturing an article as defined in claim 17, wherein the fibers are blended in an amount in a range from about 5% to about 15% by volume of the hydraulically settable mixture.

19. A method of manufacturing an article as defined in claim 15, wherein the fibers are blended in an amount in a range from about 1% to about 30% by volume of the hydraulically settable mixture.

20. A method for manufacturing an article as defined in claim 1, wherein the rheology-modifying agent increases the form stability of the molded article.

21. A method for manufacturing an article as defined in claim 1, wherein the rheology-modifying agent is added in an amount in a range from about 0.1% to about 20% by weight of the hydraulically settable mixture.

22. A method for manufacturing an article as defined in claim 1, wherein the rheology-modifying agent is added in an amount in a range from about 0.5% to about 3% by weight of the hydraulically settable mixture.

23. A method for manufacturing an article as defined in claim 1, wherein the rheology-modifying agent is added in an amount in a range from about 0.1% to about 2% by weight of the hydraulically settable mixture.

24. A method for manufacturing an article as defined in claim 1, wherein the rheology-modifying agent comprises a cellulose-based material.

25. A method for manufacturing an article as defined in claim 24, wherein the cellulose-based material is selected from the group consisting of methylhydroxyethylcellulose, hydroxymethylethylcellulose, carboxymethylcellulose, methylcellulose, ethylcellulose, hydroxyethylcellulose, hydroxyethylpropylcellulose, and mixtures or derivatives thereof.

26. A method for manufacturing an article as defined in claim 1, wherein the rheology-modifying agent comprises a starch-based material.

27. A method for manufacturing an article as defined in claim 26, wherein the starch-based material is selected from the group consisting of amylopectin, amylose, seagel, starch acetates, starch hydroxyethyl ethers, ionic starches, long-chained alkyl starches, dextrins, amine starches, phosphate starches, dialdehyde starches, and mixtures or derivatives thereof.

28. A method for manufacturing an article as defined in claim 1, wherein the rheology-modifying agent comprises a protein-based material.

29. A method for manufacturing an article as defined in claim 28, wherein the protein-based material is selected from the group consisting of a prolamine, collagen, gelatin, glue, casein, and mixtures or derivatives thereof.

30. A method for manufacturing an article as defined in claim 1, wherein the rheology-modifying agent comprises a synthetic organic material.

31. A method for manufacturing an article as defined in claim 30, wherein the synthetic organic material is selected from the group consisting of polyvinyl pyrrolidone, polyethylene glycol, polyvinyl alcohol, polyvinylmethyl ether, polyacrylic acids, polyacrylic acid salts, polyvinylacrylic acids, polyvinylacrylic acid salts, polyacrylimides, ethylene oxide polymers, synthetic clay, latex, and mixtures or derivatives thereof.

32. A method for manufacturing an article as defined in claim 1, wherein the rheology-modifying agent comprises polylactic acid.

33. A method for manufacturing an article as defined in claim 1, wherein the rheology-modifying agent is selected from the group consisting of alginic acid, phycocolloids, agar, gum arabic, guar gum, locust bean gum, gum karaya, gum tragacanth, and mixtures or derivatives thereof.

34. A method for manufacturing an article as defined in claim 1, wherein step (a) includes incorporating a dispersant into the hydraulically settable mixture.

35. A method for manufacturing an articles as defined in claim 34, wherein the dispersant is selected from the group consisting of sulfonated naphthalene-formaldehyde condensate, sulfonated melamine-formaldehyde condensate, ligno-sulfonate, acrylic acid, and mixtures or derivatives thereof.

36. A method for manufacturing an article as defined in claim 34, wherein the dispersant is incorporated in an amount in a range from about 0.25% to about 5% by weight of the hydraulically settable mixture.

37. A method for manufacturing an article as defined in claim 34, wherein the dispersant is incorporated in an amount in a range from about 0.5% to about 2% by weight of the hydraulically settable mixture.

38. A method for manufacturing an article as defined in claim 1, wherein step (a) includes exposing the hydraulically settable mixture to a carbon dioxide source.

39. A method for manufacturing an article as defined in claim 1, wherein step (a) includes assimilating a non-hydrating liquid into the hydraulically settable mixture.

40. A method for manufacturing an article as defined in claim 1, wherein step (a) includes mingling an air entraining agent into the hydraulically settable mixture.

41. A method for manufacturing an article as defined in claim 1, wherein step (a) includes adding a set accelerator to the hydraulically settable mixture.

42. A method for manufacturing an article as defined in claim 1, wherein step (a) includes:
   (i) blending cellulose fibers into the hydraulically settable mixture under high shear energy mixing for a period of time sufficient to disperse the cellulose fibers throughout the mixture;
   (ii) adding the rheology-modifying agent to the hydraulically settable mixture under high shear energy mixing to substantially uniformly disperse the rheology-modifying agent and cellulose fibers throughout the mixture; and
   (iii) combining a light weight aggregate with the hydraulically settable mixture under low shear energy mixing.

43. A method for manufacturing an article as defined in claim 1, wherein step (a) includes combining the water and the hydraulically settable binder in concentrations to yield a hydraulically settable mixture having a water-to-hydraulically settable binder ratio in a range from about 0.1 to about 10.

44. A method for manufacturing an article as defined in claim 1, wherein step (a) includes combining the water and the hydraulically settable binder in concentrations to yield a hydraulically settable mixture having a water-to-hydraulically settable binder ratio in a range from about 0.3 to about 3.5.

45. A method for manufacturing an article as defined in claim 1, further comprising the step of applying a vacuum to the hydraulically settable mixture before step (b), thereby removing air from the mixture and minimizing voids in the hydraulically settable matrix of the article.

46. A method for manufacturing an article as defined in claim 1, wherein steps (a) and (b) further include the steps of:
   (i) combining an adsorbing material with the hydraulically settable mixture;
   (ii) exposing a blowing agent to the hydraulically settable mixture under pressure so that the blowing agent is adsorbed into the adsorbing material; and
   (ii) releasing the pressure on the hydraulically settable mixture so that the blowing agent expands in order to form bubbles in the mixture.

47. A method for manufacturing an article as defined in claim 1, wherein. (the) step (b) includes:
   (i) positioning the hydraulically settable mixture between a male die of a desired shape and female die having a configuration substantially complimentary to the shape of the male die, the male die having a top and a base, the base having a circumference;
   (ii) pressing the hydraulically settable mixture between the male die and the female die to mold the mixture into the desired shape of the article; and
   (iii) removing the male die and the female die from the article when the molded article has achieved form stability so as to be self-supporting independent of the male die and the female die.

48. A method for manufacturing an article as defined in claim 47, wherein (the) step (i) further includes:
   (A) inserting the male die partially into the female die in a complimentary fashion until a gap distance between the male die and female die is formed; and
   (B) injecting the hydraulically settable mixture between the male die and female die.

49. A method for manufacturing an article as defined in claim 48, wherein the mixture is injected between the male die and the female die through an inlet port on the female die.

50. A method for manufacturing an article as defined in claim 48, wherein the mixture is injected between the male die and the female die through an inlet port on the male die.

51. A method for manufacturing an article as defined in claim 48, when the gap distance is in a range from about 2 mm and about 5 cm.

52. A method for manufacturing an article as defined in claim 48, when the gap distance is in a range from about 2 mm and about 3 cm.

53. A method for manufacturing an article as defined in claim 47, wherein step (i) further comprises the steps of:
   (A) forming the hydraulically settable mixture into a mass having a diameter; and
   (B) suspending the mass between the male die and the female die before the male die and the female die are pressed together.

54. A method for manufacturing an article defined in claim 53, wherein step (B) further comprises:
   (1) placing the mass on a template, the template having a passage with an inside perimeter larger than the circumference of the base of the male die, the mass being placed on the template so as to span the passage; and
   (2) aligning the passage of the template between the male die and female die, thereby enabling the male die to travel through the passage of the template when the male die and female die are pressed together.

55. A method for manufacturing an article as defined in claim 54, further comprising the step sliding the template over the male die such that the mass rests on the top of the male die, the inside perimeter of the template being substantially complimentary to the circumference of the male die such that the template rests at the base of the male die.

56. A method for manufacturing an article as defined in claim 54, wherein the male die and the female die are removed such that the article remains on the template.

57. A method for manufacturing an article as defined in claim 47, wherein step (ii) further includes expelling air from between the male die and the female die through at least one vent hole in the female die.

58. A method for manufacturing an article as defined in claim 47, wherein step (ii) further includes expelling air from between the male die and the female die through at least one vent hole in the male die.

59. A method for manufacturing an article as defined in claim 47, wherein step (ii) is repeated.

60. A method for manufacturing an article as defined in claim 47, wherein the method further comprises coating the male die and female die with a releasing agent before step (i) to aid in removing the article from the male die and female die.

61. A method for manufacturing an article as defined in claim 47, further comprising the step of heating the male die and the female die to respective temperatures prior to step (ii).

62. A method for manufacturing an article as defined in claim 61, wherein the respective temperatures of the male die and the female die are sufficient to minimize adhesion of the article to the male die and the female die.

63. A method for manufacturing an article as defined in claim 61, wherein the respective temperatures of the male die and female die are each in a range from about 50° C. to about 300° C.

64. A method for manufacturing an article as defined in claim 61, wherein the respective temperatures of the male die and female die are each in a range from about 75° C. to about 200° C.

65. A method for manufacturing an article as defined in claim 61, wherein the respective temperatures of the male die and female die are each in a range from about 120° C. to about 140° C.

66. A method for manufacturing an article as defined in claim 61, wherein there is a temperature variance between the respective temperatures of the female die and the male die.

67. A method for manufacturing an article as defined in claim 66, wherein the temperature variance between the male die and female die is in a range from about 10° C. to about 30° C.

68. A method for manufacturing an article as defined in claim 47, wherein the mixture is first heated to a temperature and the male die and the female die are then each cooled to respective temperatures below the temperature of the mixture, the cooled respective temperatures of the male and female dies being sufficient to minimize adhesion of the article to the male die and female die.

69. A method for manufacturing an article as defined in claim 68, wherein the respective temperatures of the male die and female die are each in a range from about −20° C. to about 40° C.

70. A method for manufacturing an article as defined in claim 68, wherein the respective temperatures of the male die and female die are each in a range from about 0° C. to about 35° C.

71. A method for manufacturing an article as defined in claim 68, wherein the respective temperatures of the male die and female die are each in a range from about 5° C. to about 30° C.

72. A method for manufacturing an article as defined in claim 47, wherein the desired shape of the male die is configured to form the mixture into a "clam shell-shaped" article when the male die and the female die are pressed together.

73. A method for manufacturing an article as defined in claim 47, wherein the desired shape of the male die is configured to form the mixture into a cup shaped article when the male die and the female die are pressed together.

74. A method for manufacturing an article as defined in claim 47, wherein the desired shape of the male die is is configured to form the mixture into a plate when the male die and the female die are pressed together.

75. A method for manufacturing an article as defined in claim 47, wherein the male die and the female die apply a pressure to the mixture in a range from about 25 psi to about 10,000 psi.

76. A method for manufacturing an article as defined in claim 47, wherein the male die and the female die apply a pressure to the mixture in a range from about 100 psi to about 5,000 psi.

77. A method for manufacturing an article as defined in claim 47, wherein the male die and the female die apply a pressure to the mixture in a range from about 150 psi to about 1,000 psi.

78. A method for manufacturing an article as defined in claim 47, wherein the male die and the female die are simultaneously removed from the article.

79. A method for manufacturing an article as defined in claim 47, wherein the male die and the female die are removed separately from the article.

80. A method for manufacturing an article as defined in claim 47, wherein the male die and the female die are removed from the article in a time period less than about 30 seconds, the molded article having achieved from stability in less than about 10 seconds after first being positioned into the desired shape.

81. A method for manufacturing an article as defined in claim 47, wherein the male die and the female die are removed from the article in a time period less than about 10 seconds, the molded article having achieved form stability within the time period.

82. A method for manufacturing an article as defined in claim 47, wherein the male die and the female die are removed from the article in a time period less than about 2 seconds, the molded article having achieved from stability within the time period.

83. A method for manufacturing an article as defined in claim 47, wherein step (iii) further comprises rotating the male die and the female die relative to each other as the male die and the female die are being separated.

84. A method for manufacturing an article as defined in claim 47, further comprising the step of applying heated air to the article in order to dry the article into a form stable condition before removing either the male die or the female die.

85. A method for manufacturing an article as defined in claim 84, wherein the heated air has a temperature in a range from about 100° C. to about 300° C.

86. A method for manufacturing an article as defined in claim 47, further comprising the step of directing microwaves onto the article in order to dry the article into a form stable condition before removing either the male die or the female die.

87. A method for manufacturing an article as defined in claim 47, wherein step (iii) comprises removing the article off the male die by means of moving air.

88. A method for manufacturing an article as defined in claim 47, wherein step (iii) further comprises blowing air through vent holes in the male die to assist removing the article from the male die.

89. A method for manufacturing an article as defined in claim 47, wherein the method further comprises raising a template positioned about the base of the male die relative to the male such that the article remains on the template separate from the male die and the female die.

90. A method for manufacturing an article as defined in claim 47, wherein the method further includes applying heated air to the article after removing both the male die and the female die from the article.

91. A method for manufacturing an article as defined in claim 1, wherein step (b) includes the use of at least one split die.

92. A method for manufacturing an article as defined in claim 1, wherein step (b) includes the use of at least one progressive die.

93. A method for manufacturing an article as defined in claim 1, wherein step (b) includes the use of at least one collapsible die.

94. A method for manufacturing an article as defined in claim 1, wherein step (c) includes applying heated air to the article.

95. A method for manufacturing an article as defined in claim 94, wherein the heated air has a temperature in a range from about 100° C. to about 300° C.

96. A method for manufacturing an article as defined in claim 94, wherein the heated air has a temperature in a range from about 150° C. to about 250° C.

97. A method for manufacturing an article as defined in claim 94, wherein the heated air has a temperature in a range from about 150° C. to about 200° C.

98. A method for manufacturing an article as defined in claim 94, wherein applying the heated air comprises blowing the heated air over the article.

99. A method for manufacturing an article as defined in claim 1, further comprising the step of fixing print to the dried article.

100. A method for manufacturing an article as defined in claim 1, further comprising the step of applying a coating to the hardened article, the coating functioning to seal the mixture from liquids.

101. A method for manufacturing an article as defined in claim 1, wherein the article has a thickness in a range from about 0.05 mm to about 1 cm.

102. A method for manufacturing an article as defined in claim 1, wherein the article has a thickness in a range from about 0.25 mm to about 3 mm.

103. A method for manufacturing an article as defined in claim 1, wherein the article has a thickness in a range from about 0.5 mm to about 2 mm.

104. A method for manufacturing an article as defined in claim 1, wherein the fashioned article obtains form stability in a time period sufficiently short for the article to be mass produced.

105. A method for manufacturing an article as defined in claim 1, wherein the hardened article has a density in a range from about 0.1 g/cm$^3$ to about 3 g/cm$^3$.

106. A method for manufacturing an article as defined in claim 1, wherein the hardened article has a density in a range from about 0.5 g/cm$^3$ to about 12 g/cm$^3$.

107. A method for manufacturing an article as defined in claim 1, wherein the hardened article has a tensile strength in a range from about 0.05 MPa to about 75 MPa.

108. A method for manufacturing an article as defined in claim 1, wherein the hardened article has a tensile strength in a range from about 1 MPa to about 30 MPa.

109. A method for manufacturing an article as defined in claim 1, wherein the hardened article has a tensile strength in a range from about 3 MPa to about 15 MPa.

110. A method for manufacturing an article having a hydraulically settable matrix, the method comprising the steps of:
(a) mixing together a hydraulically settable binder, a nonfibrous inorganic aggregate filler, a rheology-modifying agent, optionally fibers, and water to form a hydraulically settable mixture, the optional fibers being included in an amount in a range from about 0.2% to about 50% by volume of the hydraulically settable mixture;
(b) pressing the hydraulically settable mixture into a desired shape of the article, wherein water removed from the hydraulically settable mixture is in a vapor state;
(c) heating the hydraulically settable mixture so as to yield an article that is form stable in less than about 10 seconds after the mixture is first pressed into the desired shape of the article; and
(d) allowing the hydraulically settable mixture to harden into the desired shape of the article, the hydraulically settable matrix of the hardened article including greater than about 50% by volume of combined amounts of at least partially hydrated hydraulically settable binder and the nonfibrous inorganic aggregate filler.

111. A method for manufacturing an article as defined in claim 110, wherein step (a) includes adding a fibrous material to the hydraulically settable mixture.

112. A method for manufacturing an article as defined in claim 110, further comprising the step of applying a vacuum to the mixture before forming the sheet, thereby removing air from the mixture and minimizing voids in the structural matrix of the article.

113. A method for manufacturing an article as defined in claim 110, wherein step (a) includes combining the water and the hydraulically settable binder in concentrations to yield a hydraulically settable mixture having a water to hydraulically settable binder ratio in a range from about 0.1 to about 10.

114. A method for manufacturing an article as defined in claim 113, wherein steps (b) and (c) include:
(i) positioning at least a portion of the hydraulically settable mixture between a male die of a desired shape and female die having a configuration substantially complimentary to the shape of the male die, the male die having a base with a circumference;
(ii) pressing the hydraulically settable mixture between the male die and the female die to mold the mixture into the desired shape of the article; and
(iii) removing the male die and the female die from the article when the molded article has achieved form stability so as to be self-supporting independent of the male die and the female die.

115. A method for manufacturing an article as defined in claim 114, wherein (the) step (i) further includes:
(A) inserting the male die partially into the female die in a complimentary fashion until a gap distance between the male die and female die is formed; and
(B) injecting the hydraulically settable mixture between the male die and female die.

116. A method for manufacturing an article as defined in claim 114, wherein step (i) further comprises the steps of:
(A) forming the hydraulically settable mixture into a mass having a diameter; and
(B) suspending the mass between the male die and the female die before the male die and the female die are pressed together.

117. A method for manufacturing an article as defined in claim 116, wherein step (B) further comprises:
(1) placing the mass on a template, the template having a passage with an inside perimeter that is substantially complementary to the circumference of the base of the male die, the mass being placed on the template so as to span the passage; and
(2) aligning the passage of the template between the male die and female die, thereby enabling the male die to travel through the passage of the template when the male die and female die are pressed together.

118. A method for manufacturing an article as defined in claim 114, wherein the hydraulically settable mixture is pressed between the male die and the female die under a pressure in a range from about 25 psi to about 10,000 psi.

119. A method for manufacturing an article as defined in claim 114, wherein the male die and the female die are simultaneously removed from the article.

120. A method for manufacturing an article as defined in claim 14, wherein the male die and the female die are removed separately from the article.

121. A method for manufacturing an article as defined in claim 114, wherein the male die and the female die are removed from the article in a time period less than about 30 seconds, the molded article having achieved form stability in less than about 10 seconds after first being positioned into the desired shape.

122. A method for manufacturing an article as defined in claim 114, wherein the male die and the female die are removed from the article in a time period less than about 2 seconds, the molded article having achieved from stability within the time period.

123. A method for manufacturing an article as defined in claim 14, wherein the step of heating the mixture to impart form stability includes heating the male die and the female die each to a respective temperature before pressing the mixture between the male die and the female die.

124. A method for manufacturing an article as defined in claim 123, wherein the respective temperature of the male die and the female die are in a range from about 50° C. to about 300° C.

125. A method for manufacturing an article as defined in claim 114, wherein the step of heating the mixture to impart form stability includes applying heated air to the article before removing both the male die and the female die from the article.

126. A method for manufacturing an article as defined in claim 114, wherein step (d) includes blowing heated air onto the article.

127. A method for manufacturing a cementitious container having a cementitious structural matrix, the method comprising the steps of:
(a) mixing together a hydraulic cement, a rheology-modifying agent, a nonfibrous inorganic aggregate filler, water, and optionally fibers to form a cementitious mixture, the optional fibers being included in an amount less than about 30% by volume of the cementitious mixture;
(b) positioning the cementitious mixture between a heated male die and a heated female die;
(c) pressing the cementitious mixture between the heated male die and the heated female die into a desired shape of the container wherein water removed from the cementitious mixture is in a vapor state, the cementitious mixture being form stable in less than about 10 seconds after first being pressed into the desired shape of a container;
(d) removing the male die and the female die from the container after the molded container has achieved form stability; and
(e) allowing the cementitious mixture to harden in the desired shape of the container, the cementitious matrix of the hardened container including greater than about 70% by volume of combined amounts of at least partially hydrated hydraulic cement and the nonfibrous inorganic aggregate filler.

128. A method for manufacturing a cementitious container as defined in claim 127, wherein step (a) includes adding a fibrous material to the cementitious mixture.

129. A method for manufacturing a cementitious container as defined in claim 127, further comprising the step of applying a vacuum to the cementitious mixture before step (b), thereby removing air from the mixture and minimizing voids in the cementitious structural matrix of the article.

130. A method for manufacturing a cementitious container as defined in claim 127, wherein step (a) includes combining the water and the hydraulic cement in concentrations to yield a cementitious mixture having a water to cement ratio in a range from about 0.1 to about 10.

131. A method for manufacturing a cementitious container as defined in claim 127, wherein step (a) further includes:
(i) adding cellulose fibers to the cementitious mixture under high shear energy mixing for a period of time sufficient to initially disperse the cellulose fiber throughout the mixture;
(ii) blending the rheology-modifying agent into the cementitious mixture under high shear energy mixing to substantially uniformly disperse the rheology-modifying agent and cellulose fibers throughout the mixture; and
(iii) combining a light weight aggregate with the cementitious mixture under low shear energy mixing.

132. A method for manufacturing a cementitious container as defined in claim 127, wherein the male die and the female die are each heated to a respective temperature in a range from about 50° C. to about 300° C.

133. A method for manufacturing a cementitious container as defined in claim 127, wherein step (b) further comprises:
(i) inserting the male die partially into the female die in a complimentary fashion until a gap distance between the male die and female die is formed; and
(ii) injecting the cementitious mixture between the male die and female die.

134. A method for manufacturing a cementitious container as defined in claim 127, wherein the cementitious mixture is pressed between the male die and the female die under a pressure in a range from about 25 psi to about 10,000 psi.

135. A method for manufacturing a cementitious container as defined in claim 127, wherein the male die and the female die are removed separately from the container.

136. A method for manufacturing a cementitious container as defined in claim 127, wherein the male die and the female die are both removed from the container in a period of time less than 10 seconds, the container obtaining form stability within the time period.

137. A method for manufacturing a cementitious container as defined in claim 127, wherein step (e) includes applying heated air to the container after the container is removed from the male die and female die.

138. A method for manufacturing a cementitious container as defined in claim 127, further comprising the step of applying a coating to the container after drying the container.

139. A method for manufacturing a cementitious container as defined in claim 127, further comprising the step of applying print to the container after drying the container.

140. A method for manufacturing an article having a hydraulically settable matrix, the method comprising the steps of:

(a) mixing together a hydraulically settable binder, a nonfibrous inorganic aggregate filler, water, a rheology-modifying agent, and optionally fibers to form a hydraulically settable mixture, the optional fibers being included an amount in a range from about 1% to about 30% by volume of the hydraulically settable mixture;

(b) molding the hydraulically settable mixture into a desired shape of the article, the article being form stable in less than about 10 seconds after the hydraulically settable mixture is first molded into the desired shape, wherein the water within the hydraulically settable mixture remains bound within the hydraulically settable matrix of the article or is removed in a vapor state from the mixture; and (c) allowing the molded hydraulically settable mixture to harden in the desired shape of the article, the hydraulically settable matrix of the hardened article including greater than about 70% by volume of combined amounts of at least partially hydrated hydraulically settable binder and the nonfibrous inorganic aggregate filler, the hardened article including a base and at least one sidewall.

* * * * *

UNITED STATES PATENT AND TRADEMARK OFFICE
CERTIFICATE OF CORRECTION

PATENT NO. : 5,676,905

DATED : October 14, 1997

INVENTOR(S) : Per Just Andersen; Simon K. Hodson

It is certified that error appears in the above-identified patent and that said Letters Patent is hereby corrected as shown below:

Page 3, Other Publications, Right Column, line 3, after "Just" change "Anderson" to --Andersen--

Page 5, Other Publications, Right Column, line 20, after "and" change "concretes" to --Concretes--

Figure 11, change Reference Numeral "56" to --53--

Col. 7, line 20, after "herein" insert a period.

Col. 7, line 31, after "are" change "formstable" to --form stable--

Col. 7, line 59, change "theology" to --rheology--

Col. 9, line 49, after "as" change "theology" to --rheology--

Col. 11, line 13, after "containers" change "ant" to --and--

Col. 11, line 18, after "barrier" change "the" to --that--

Col. 25, line 61, after "formula" change "$Al_2O_3.SiO_2.H_2O$" to --$Al_2O_3 \cdot SiO_2 \cdot H_2O$--

Col. 25, line 62, after "formula" change "$Al_2O_3.SiO_2.H_2O$" to --$Al_2O_3 \cdot SiO_2 \cdot H_2O$--

Col. 27, line 33, after "of" change "Anderson" to --Andersen--

UNITED STATES PATENT AND TRADEMARK OFFICE
CERTIFICATE OF CORRECTION

PATENT NO. : 5,676,905

DATED : October 14, 1997

INVENTOR(S) : Per Just Andersen; Simon K. Hodson

It is certified that error appears in the above-identified patent and that said Letters Patent is hereby corrected as shown below:

Col. 28, line 2, after "a" change "vary" to --very--

Col. 29, line 52, after "enough" change "hemicelulose" to --hemicellulose--

Col. 33, line 39, after "the" change "claim-shell" to --clam-shell--

Col. 40, line 38, after "end" change "54" to --52--

Col. 40, line 38, after "template" change "52" to --53--

Col. 53, line 62, change "wherein. (the) to --wherein--

Col. 54, line 9, after "wherein" delete "(the)"

Col. 55, line 57, delete the second occurance of "is"

Col. 56, line 14, after "achieved" change "from" to --form--

Col. 56, line 24, after "achieved" change "from" to --form--

Col. 58, line 36, after "wherein" delete "(the)"

Col. 59, line 7, after "achieved" change "from" to --form--

Col. 59, line 13, after "achieved" change "from" to --form--

Col. 61, line 5, after "included" insert --in--

UNITED STATES PATENT AND TRADEMARK OFFICE
CERTIFICATE OF CORRECTION

PATENT NO. : 5,676,905
DATED : October 14, 1997
INVENTOR(S) : Per Just Andersen; Simon K. Hodson It is certified that error appears in the above-indentified patent and that said Letters Patent is hereby corrected as shown below:

Col. 55, line 57, delete the second occurance of "is"

Col. 56, line 14, after "achieved" change "from" to --form--

Col. 56, line 24, after "achieved" change "from" to --form--

Col. 58, line 36, after "wherein" delete "(the)"

Col. 59, line 7, after "achieved" change "from" to --form--

Col. 59, line 13, after "achieved" change "from" to --form--

Col. 61, line 5, after "included" insert --in--

Signed and Sealed this

Twenty-first Day of July, 1998

Attest:

BRUCE LEHMAN

*Attesting Officer*    Commissioner of Patents and Trademarks